(12) United States Patent
Zhang et al.

(10) Patent No.: US 11,989,618 B2
(45) Date of Patent: May 21, 2024

(54) TWO-DIMENSIONAL CODE PROCESSING METHOD AND DEVICE

(71) Applicant: HUAWEI TECHNOLOGIES CO., LTD., Shenzhen (CN)

(72) Inventors: Zhangkai Zhang, Beijing (CN); Jianxin Peng, Beijing (CN); Peng Zhang, Shenzhen (CN); Lian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/846,199

(22) Filed: Jun. 22, 2022

(65) Prior Publication Data
US 2022/0318538 A1 Oct. 6, 2022

Related U.S. Application Data

(63) Continuation of application No. PCT/CN2020/139990, filed on Dec. 28, 2020.

(30) Foreign Application Priority Data

Dec. 26, 2019 (CN) .......................... 201911368922.7

(51) Int. Cl.
*G06K 7/14* (2006.01)
(52) U.S. Cl.
CPC .................................. *G06K 7/1417* (2013.01)
(58) Field of Classification Search
CPC ........... G06K 7/1417; G06K 19/06112; G06K 7/1095; G06F 9/54; G06F 21/36; G06F 9/546
See application file for complete search history.

(56) References Cited

U.S. PATENT DOCUMENTS

2011/0296508 A1 12/2011 Os et al.
2015/0227946 A1* 8/2015 Huang ............... G06Q 30/0185
235/494
(Continued)

FOREIGN PATENT DOCUMENTS

CN 104834839 A 8/2015
CN 106228360 A 12/2016
(Continued)

*Primary Examiner* — Matthew Mikels
(74) *Attorney, Agent, or Firm* — Maier & Maier, PLLC

(57) ABSTRACT

A two-dimensional code processing method and a device. The method includes: obtaining, by a first electronic device, two-dimensional code information displayed by a second electronic device; obtaining first scenario information, where the first scenario information is scenario information related to the first electronic device; determining two-dimensional code data and second scenario information based on the two-dimensional code information, where the second scenario information is scenario information related to the second electronic device; and when determining that the first scenario information and the second scenario information meet a preset condition, performing, by the first electronic device, preset processing on the two-dimensional code data. The scenario information of the two electronic devices that need to perform two-dimensional code interaction is compared, and further, two-dimensional code verification is completed.

20 Claims, 29 Drawing Sheets

(56) References Cited

U.S. PATENT DOCUMENTS

2017/0337542 A1\* 11/2017 Kim ................ G06Q 20/02
2017/0352053 A1\* 12/2017 Heeter ............. G06Q 30/018
2021/0073810 A1    3/2021 Gramling

FOREIGN PATENT DOCUMENTS

| CN | 107632758 A  | 1/2018  |
|----|--------------|---------|
| CN | 207182396 U  | 4/2018  |
| CN | 107992729 A  | 5/2018  |
| CN | 109102280 A  | 12/2018 |
| CN | 109493023 A  | 3/2019  |
| CN | 109871722 A  | 6/2019  |
| CN | 109918168 A  | 6/2019  |
| WO | 2016150028 A1 | 9/2016 |
| WO | 2019024542 A1 | 2/2019 |

\* cited by examiner

TWO-DIMENSIONAL CODE PROCESSING METHOD AND DEVICE

CROSS-REFERENCE TO RELATED APPLICATIONS

This application is a continuation of International Application No. PCT/CN2020/139990, filed on Dec. 28, 2020, which claims priority to Chinese Patent Application No. 201911368922.7, filed on Dec. 26, 2019. The disclosures of the aforementioned applications are hereby incorporated by reference in their entireties.

TECHNICAL FIELD

The embodiments relate to terminal technologies, a two-dimensional code processing method and a device.

BACKGROUND

With development of terminal technologies, electronic devices have become indispensable tools in people's life and work. Among the electronic devices, terminal devices are particularly widely used. To enhance convenience of a user's life, an electronic device may provide a two-dimensional code, and further, the user completes a payment action or the like by using the two-dimensional code.

In the conventional technology, an electronic device may generate and display a two-dimensional code, and another electronic device scans the two-dimensional code. Further, the another electronic device performs a payment action, for example, deduction, based on the obtained two-dimensional code.

However, in the conventional technology, when the electronic device generates the two-dimensional code, the electronic device may receive an attack from malware or the like. Further, the two-dimensional code that needs to be displayed by the electronic device is replaced with a two-dimensional code generated by the malware. Consequently, the electronic device displays the replaced two-dimensional code, and further, property of the user is stolen. Further, the malicious replacement of the two-dimensional code in the conventional technology causes a loss to the property of the user.

SUMMARY

A two-dimensional code processing method and a device, may resolve a problem in the conventional technology that a two-dimensional code is maliciously replaced.

According to a first aspect, a two-dimensional code processing method may be applied to a first electronic device, and the method includes:
obtaining two-dimensional code information displayed by a second electronic device;
obtaining first scenario information, and determining two-dimensional code data and second scenario information based on the two-dimensional code information, where the first scenario information is scenario information related to the first electronic device, and the second scenario information is scenario information related to the second electronic device; and
when determining that the first scenario information and the second scenario information meet a preset condition, performing preset processing on the two-dimensional code data.

The scenario information of the electronic device is added to a two-dimensional code, so that the scenario information in the two-dimensional code displayed by the second electronic device is related to the second electronic device; then the first electronic device may obtain, from the two-dimensional code, the second scenario information related to the second electronic device; in addition, the first electronic device may obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The scenario information of the two electronic devices that need to perform two-dimensional code interaction is compared, and further, two-dimensional code verification is completed. In this way, it can be effectively ensured that the scanned two-dimensional code is not a malicious attack two-dimensional code, and especially in a face-to-face code scanning scenario (for example, scanning the code for payment or entering a subway), a malicious two-dimensional code can be identified. Therefore, security of data such as property of a user is ensured.

A rich execution environment is deployed in a system of the first electronic device; and the obtaining first scenario information includes: obtaining the first scenario information based on the rich execution environment. The first scenario information may be obtained based on the rich execution environment.

A first scenario component is disposed in the first electronic device; and the obtaining the first scenario information based on the rich execution environment includes:
sending a first request message to the first scenario component based on the rich execution environment, where the first request message is for indicating to generate the first scenario information obtained through detection by the first scenario component; and receiving, based on the rich execution environment, the first scenario information sent by the first scenario component.

The first electronic device may perform each step on a rich execution environment system side to automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of the user is ensured.

A first scenario component is disposed in the first electronic device; a trusted execution environment is further deployed in the system of the first electronic device; and the obtaining the first scenario information based on the rich execution environment includes:
sending a second request message to the trusted execution environment based on the rich execution environment, where the second request message is for indicating to generate the first scenario information; and receiving, based on the rich execution environment, a return message returned by the trusted execution environment, where the return message is used to indicate the first scenario information, and the first scenario information is obtained by the trusted execution environment from the first scenario component.

The trusted execution environment is a secure world, and the trusted execution environment of the first electronic device verifies the first scenario information and the second scenario information. Therefore, validity and accuracy of a verification result can be ensured, and it is ensured that the first scenario information and the second scenario information are not tampered with.

The second request message includes the second scenario information, or the second request information is used to indicate the second scenario information; and
  the return message is a verification result; and the receiving, based on the rich execution environment, a return message returned by the trusted execution environment includes:
  receiving, based on the rich execution environment, a verification result returned by the trusted execution environment, where the verification result is generated after the trusted execution environment compares the first scenario information with the second scenario information, and the verification result represents that the first scenario information and the second scenario information meet the preset condition.

The trusted execution environment of the first electronic device verifies the first scenario information and the second scenario information; and the trusted execution environment of the first electronic device sends the verification result to the rich execution environment of the first electronic device. Because the trusted execution environment is a secure world, it is ensured that the first scenario information and the second scenario information are not maliciously attacked in the verification process.

Before the sending a second request message to the trusted execution environment based on the rich execution environment, the method further includes: performing signature processing on the second scenario information by using a public key, to obtain signed second scenario information, where
  the first scenario information is obtained after the trusted execution environment determines that the signed second scenario information is successfully verified by using a private key. Further, the trusted execution environment verifies a source of the second scenario information.

The first scenario information is obtained after the trusted execution environment sets the first scenario component to a preset configuration, and the preset configuration represents that the first scenario information can be obtained only by the trusted execution environment. The trusted execution environment is a secure world, and the first scenario component needs to be configured as readable only by the trusted execution environment. In this case, when the trusted execution environment reads information detected by the first scenario component, the trusted execution environment may be maliciously attacked. Because the first scenario information read by the trusted execution environment is not maliciously tampered with, accuracy and security of the first scenario information are ensured.

The method further includes:
  when determining that the first scenario information and the second scenario information do not meet the preset condition, generating and displaying prompt information. Further, when the scenario information fails to be verified, the user may be prompted that the scenario information is attacked.

The determining two-dimensional code data and second scenario information based on the two-dimensional code information includes:
  decrypting the two-dimensional code information to obtain the two-dimensional code data and the second scenario information.

The first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

When the first scenario information is the global positioning system information, and the second scenario information is the global positioning system information, the preset condition is that both the first scenario information and the second scenario information fall within a preset geographical range;
  when the first scenario information is the wireless local area network information, and the second scenario information is the wireless local area network information, the preset condition is that a wireless local area network identifier represented by the second scenario information exists in a wireless local area network list represented by the first scenario information;
  when the first scenario information is the Bluetooth information, and the second scenario information is the Bluetooth information, the preset condition is that a Bluetooth identifier represented by the second scenario information exists in a Bluetooth list represented by the first scenario information; or
  when the first scenario information is the natural environment information, and the second scenario information is the natural environment information, the preset condition is that both the first scenario information and the second scenario information fall within a preset value range.

According to a second aspect, a two-dimensional code processing method may be applied to a second electronic device, and the method includes:
  obtaining second scenario information, where the second scenario information is scenario information related to the second electronic device; and
  generating and displaying two-dimensional code information based on the second scenario information and preset two-dimensional code data, where the two-dimensional code information is used by a first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

In this embodiment, the second electronic device obtains the second scenario information, where the second scenario information is the scenario information related to the second electronic device; and the second electronic device generates and displays the two-dimensional code information based on the second scenario information and the preset two-dimensional code data, where the two-dimensional code information is used by the first electronic device to perform preset processing on the two-dimensional code data when the first electronic device determines that the first scenario information and the second scenario information meet the preset condition after the first electronic device obtains the two-dimensional code information, and the first scenario information is the scenario information related to the first electronic device. When the second electronic device needs to generate a two-dimensional code, the second electronic device may obtain the second scenario information related to the second electronic device; the second electronic device adds the second scenario information to the two-dimensional code; and further, the two-dimensional code displayed by the second electronic device carries the second scenario information related to the second electronic device. The first electronic device scans the two-dimensional code to obtain the second scenario information; the first electronic device may further obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of a user is ensured.

A rich execution environment is deployed in a system of the second electronic device; and the obtaining second scenario information includes:

obtaining the second scenario information based on the rich execution environment. Scenario information verification may be completed based on the rich execution environment, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of the user is ensured.

A second scenario component is disposed in the second electronic device; and the obtaining the second scenario information based on the rich execution environment includes:

sending a first request message to the second scenario component based on the rich execution environment, where the first request message is for indicating to generate the second scenario information detected by the second scenario component; and receiving, based on the rich execution environment, the second scenario information sent by the second scenario component.

The second electronic device performs each step on a rich execution environment system side, that is, completes obtaining of the second scenario information in the rich execution environment, and generates the two-dimensional code carrying the second scenario information. Therefore, the first electronic device may automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of the user is ensured. The process is simple and fast.

A trusted execution environment is further deployed in the system of the second electronic device; a second scenario component is disposed in the second electronic device; and the obtaining the second scenario information based on the rich execution environment includes:

sending a second request message to the trusted execution environment based on the rich execution environment, where the second request message is for indicating to generate the second scenario information; and receiving, based on the rich execution environment, the second scenario information returned by the trusted execution environment, where the second scenario information is obtained by the trusted execution environment from the second scenario component.

Because the trusted execution environment is a secure world, the second scenario information obtained by the trusted execution environment of the second electronic device is relatively secure.

The second request message is a trigger instruction detected based on the rich execution environment, or the second request message includes a trigger instruction, where the trigger instruction is for indicating to generate the two-dimensional code information.

The second scenario information is scenario information on which signature processing is performed by the trusted execution environment by using a public key; and after the receiving, based on the rich execution environment, the second scenario information returned by the trusted execution environment, the method further includes:

checking the second scenario information based on the rich execution environment by using a private key, to obtain a check result, where the check result represents that the second scenario information is successfully checked. The trusted execution environment of the second electronic device may sign the second scenario information, to ensure that the second scenario information is not tampered with when the second scenario information is transferred to the rich execution environment of the second electronic device.

The generating and displaying two-dimensional code information based on the second scenario information and preset two-dimensional code data includes:

generating to-be-processed data based on the rich execution environment, the second scenario information, and the two-dimensional code data, where the to-be-processed data is two-dimensional code data including the second scenario information; and sending the to-be-processed data to the trusted execution environment based on the rich execution environment, where the to-be-processed data is used by the trusted execution environment to generate and display the two-dimensional code information.

The rich execution environment of the second electronic device sends the two-dimensional code data including the second scenario information to the trusted execution environment of the second electronic device; and the trusted execution environment of the second electronic device draws and displays a two-dimensional code interface on a TUI. Because security of the trusted execution environment is very high, and the two-dimensional code interface is drawn and displayed in the trusted execution environment, it is further ensured that the second scenario information and the two-dimensional code data are not attacked or tampered with by a malicious device or a malicious application program, and security of the second scenario information and the two-dimensional code data is ensured.

Before the sending the to-be-processed data to the trusted execution environment based on the rich execution environment, the method further includes: encrypting the to-be-processed data based on the rich execution environment to obtain encrypted to-be-processed data.

The second scenario information is obtained after the trusted execution environment sets the second scenario component to a preset configuration, and the preset configuration represents that the second scenario information of the second scenario component can be obtained only by the trusted execution environment. Before the trusted execution environment of the second electronic device reads the second scenario information detected by the second scenario component, the trusted execution environment of the second electronic device sets the second scenario component as readable only by the trusted execution environment. Therefore, it is ensured that the second scenario information detected by the second electronic device is not tampered with by a malicious application program in the rich execution environment, and security of the second scenario information is ensured.

Before the obtaining second scenario information, the method further includes: receiving a trigger instruction, where the trigger instruction is for indicating to generate the two-dimensional code information.

The first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

When the first scenario information is the global positioning system information, and the second scenario information is the global positioning system information, the preset condition is that both the first scenario information and the second scenario information fall within a preset geographical range;

when the first scenario information is the wireless local area network information, and the second scenario information is the wireless local area network information, the preset condition is that a wireless local area network identifier represented by the second scenario information exists in a wireless local area network list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

According to a third aspect, a first electronic device may include:
a first obtaining unit, configured to obtain two-dimensional code information displayed by a second electronic device;
a second obtaining unit, configured to obtain first scenario information;
a determining unit, configured to determine two-dimensional code data and second scenario information based on the two-dimensional code information, where the first scenario information is scenario information related to the first electronic device, and the second scenario information is scenario information related to the second electronic device; and
a processing unit, configured to perform preset processing on the two-dimensional code data when determining that the first scenario information and the second scenario information meet a preset condition.

The scenario information of the electronic device is added to a two-dimensional code, so that the scenario information in the two-dimensional code displayed by the second electronic device is related to the second electronic device; then the first electronic device may obtain, from the two-dimensional code, the second scenario information related to the second electronic device; in addition, the first electronic device may obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of a user is ensured.

A rich execution environment is deployed in a system of the first electronic device; and the second obtaining unit is configured to:
obtain the first scenario information based on the rich execution environment. The first scenario information may be obtained based on the rich execution environment.

A first scenario component is disposed in the first electronic device; and the second obtaining unit includes:
a first sending module, configured to send a first request message to the first scenario component based on the rich execution environment, where the first request message is for indicating to generate the first scenario information obtained through detection by the first scenario component; and a first receiving module, configured to receive, based on the rich execution environment, the first scenario information sent by the first scenario component.

The first electronic device may perform each step on a rich execution environment system side to automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of the user is ensured.

A first scenario component is disposed in the first electronic device; a trusted execution environment is further deployed in the system of the first electronic device; and the second obtaining unit includes:

a second sending module, configured to send a second request message to the trusted execution environment based on the rich execution environment, where the second request message is for indicating to generate the first scenario information; and a second receiving module, configured to receive, based on the rich execution environment, a return message returned by the trusted execution environment, where the return message is used to indicate the first scenario information, and the first scenario information is obtained by the trusted execution environment from the first scenario component.

The trusted execution environment is a secure world, and the trusted execution environment of the first electronic device verifies the first scenario information and the second scenario information. Therefore, validity and accuracy of a verification result can be ensured, and it is ensured that the first scenario information and the second scenario information are not tampered with.

The second request message includes the second scenario information, or the second request information is used to indicate the second scenario information; and the return message is a verification result; and the second receiving module is configured to:

receive, based on the rich execution environment, a verification result returned by the trusted execution environment, where the verification result is generated after the trusted execution environment compares the first scenario information with the second scenario information, and the verification result represents that the first scenario information and the second scenario information meet the preset condition.

The trusted execution environment of the first electronic device verifies the first scenario information and the second scenario information; and the trusted execution environment of the first electronic device sends the verification result to the rich execution environment of the first electronic device. Because the trusted execution environment is a secure world, it is ensured that the first scenario information and the second scenario information are not maliciously attacked in the verification process.

The second obtaining unit further includes:

a signature module, configured to: before the second sending module sends the second request message to the trusted execution environment based on the rich execution environment, perform signature processing on the second scenario information by using a public key, to obtain signed second scenario information, where the first scenario information is obtained after the trusted execution environment determines that the signed second scenario information is successfully verified by using a private key.

The first scenario information is obtained after the trusted execution environment sets the first scenario component to a preset configuration, and the preset configuration represents that the first scenario information can be obtained only by the trusted execution environment. The trusted execution environment is a secure world, and the first scenario component needs to be configured as readable only by the trusted execution environment. In this case, when the trusted execution environment reads information detected by the first scenario component, the trusted execution environment may be maliciously attacked. Because the first scenario information read by the trusted execution environment is not maliciously tampered with, accuracy and security of the first scenario information are ensured.

The first electronic device further includes:

a prompting unit, configured to generate and display prompt information when it is determined that the first scenario information and the second scenario information do not meet the preset condition. Further, when the scenario information fails to be verified, the user may be prompted that the scenario information is attacked.

The determining unit is configured to:

decrypt the two-dimensional code information to obtain the two-dimensional code data and the second scenario information.

The first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

When the first scenario information is the global positioning system information, and the second scenario information is the global positioning system information, the preset condition is that both the first scenario information and the second scenario information fall within a preset geographical range;

when the first scenario information is the wireless local area network information, and the second scenario information is the wireless local area network information, the preset condition is that a wireless local area network identifier represented by the second scenario information exists in a wireless local area network list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

According to a fourth aspect, a second electronic device may include:
- an obtaining unit, configured to obtain second scenario information, where the second scenario information is scenario information related to the second electronic device;
- a generation unit, configured to generate and display two-dimensional code information based on the second scenario information and preset two-dimensional code data; and
- a display unit, configured to display the two-dimensional code information, where the two-dimensional code information is used by a first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

In this embodiment, the second electronic device obtains the second scenario information, where the second scenario information is the scenario information related to the second electronic device; and the second electronic device generates and displays the two-dimensional code information based on the second scenario information and the preset two-dimensional code data, where the two-dimensional code information is used by the first electronic device to perform preset processing on the two-dimensional code data when the first electronic device determines that the first scenario information and the second scenario information meet the preset condition after the first electronic device obtains the two-dimensional code information, and the first scenario information is the scenario information related to the first electronic device. When the second electronic device needs to generate a two-dimensional code, the second electronic device may obtain the second scenario information related to the second electronic device; the second electronic device adds the second scenario information to the two-dimensional code; and further, the two-dimensional code displayed by the second electronic device carries the second scenario information related to the second electronic device. The first electronic device scans the two-dimensional code to obtain the second scenario information; the first electronic device may further obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of a user is ensured.

A rich execution environment is deployed in a system of the second electronic device; and the obtaining unit is configured to:
- obtain the second scenario information based on the rich execution environment. Scenario information verification may be completed based on the rich execution environment, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of the user is ensured.

A second scenario component is disposed in the second electronic device; and the obtaining unit includes:
- a first sending module, configured to send a first request message to the second scenario component based on the rich execution environment, where the first request message is for indicating to generate the second scenario information detected by the second scenario component; and
- a first receiving module, configured to receive, based on the rich execution environment, the second scenario information sent by the second scenario component.

The second electronic device performs each step on a rich execution environment system side, that is, completes obtaining of the second scenario information in the rich execution environment, and generates the two-dimensional code carrying the second scenario information. Therefore, the first electronic device may automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of the user is ensured. The process is simple and fast.

A trusted execution environment is further deployed in the system of the second electronic device; a second scenario component is disposed in the second electronic device; and the obtaining unit includes:
- a second sending module, configured to send a second request message to the trusted execution environment based on the rich execution environment, where the second request message is for indicating to generate the second scenario information; and
- a second receiving module, configured to receive, based on the rich execution environment, the second scenario information returned by the trusted execution environment, where the second scenario information is obtained by the trusted execution environment from the second scenario component.

Because the trusted execution environment is a secure world, the second scenario information obtained by the trusted execution environment of the second electronic device is relatively secure.

The second request message is a trigger instruction detected based on the rich execution environment, or the second request message includes a trigger instruction, where the trigger instruction is for indicating to generate the two-dimensional code information.

The second scenario information is scenario information on which signature processing is performed by the trusted execution environment by using a public key; and the obtaining unit further includes:
a check module, configured to: after the second receiving module receives, based on the rich execution environment, the second scenario information returned by the trusted execution environment, check the second scenario information based on the rich execution environment by using a private key, to obtain a check result, where the check result represents that the second scenario information is successfully checked. The trusted execution environment of the second electronic device may sign the second scenario information, to ensure that the second scenario information is not tampered with when the second scenario information is transferred to the rich execution environment of the second electronic device.

The generation unit includes:
a generation module, configured to generate to-be-processed data based on the rich execution environment, the second scenario information, and the two-dimensional code data, where the to-be-processed data is two-dimensional code data including the second scenario information; and
a sending module, configured to send the to-be-processed data to the trusted execution environment based on the rich execution environment, where the to-be-processed data is used by the trusted execution environment to generate and display the two-dimensional code information.

The rich execution environment of the second electronic device sends the two-dimensional code data including the second scenario information to the trusted execution environment of the second electronic device; and the trusted execution environment of the second electronic device draws and displays a two-dimensional code interface on a TUI. Because security of the trusted execution environment is very high, and the two-dimensional code interface is drawn and displayed in the trusted execution environment, it is further ensured that the second scenario information and the two-dimensional code data are not attacked or tampered with by a malicious device or a malicious application program, and security of the second scenario information and the two-dimensional code data is ensured.

The generation unit further includes:
an encryption module, configured to: before the sending module sends the to-be-processed data to the trusted execution environment based on the rich execution environment, encrypt the to-be-processed data based on the rich execution environment to obtain encrypted to-be-processed data.

The second scenario information is obtained after the trusted execution environment sets the second scenario component to a preset configuration, and the preset configuration represents that the second scenario information of the second scenario component can be obtained only by the trusted execution environment. Before the trusted execution environment of the second electronic device reads the second scenario information detected by the second scenario component, the trusted execution environment of the second electronic device sets the second scenario component as readable only by the trusted execution environment. Therefore, it is ensured that the second scenario information detected by the second electronic device is not tampered with by a malicious application program in the rich execution environment, and security of the second scenario information is ensured.

The second electronic device further includes:
a receiving unit, configured to receive a trigger instruction before the obtaining unit obtains the second scenario information, where the trigger instruction is for indicating to generate the two-dimensional code information.

The first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

When the first scenario information is the global positioning system information, and the second scenario information is the global positioning system information, the preset condition is that both the first scenario information and the second scenario information fall within a preset geographical range;
when the first scenario information is the wireless local area network information, and the second scenario information is the wireless local area network information, the preset condition is that a wireless local area network identifier represented by the second scenario information exists in a wireless local area network list represented by the first scenario information;
when the first scenario information is the Bluetooth information, and the second scenario information is the Bluetooth information, the preset condition is that a Bluetooth identifier represented by the second scenario information exists in a Bluetooth list represented by the first scenario information; or
when the first scenario information is the natural environment information, and the second scenario information is the natural environment information, the preset condition is that both the first scenario information and the second scenario information fall within a preset value range.

According to a fifth aspect, a first electronic device may include an image collector and a processor, where
the image collector is configured to collect two-dimensional code information in the method provided by the first aspect; and
the processor is configured to obtain the two-dimensional code information collected by the image collector, and execute instructions in computer-executable program code, where when the processor executes the instructions, the instructions enable the imaging device to perform the method provided by the first aspect.

According to a sixth aspect, a second electronic device may include a processor, where
the processor is configured to execute instructions in computer-executable program code, where when the processor executes the instructions, the instructions enable the imaging device to perform the method provided by the second aspect.

According to a seventh aspect, a first electronic device may include a processor, an image collector, and a first scenario component, where
the image collector is configured to collect two-dimensional code information in any implementation of the first aspect; and
the processor is configured to obtain the two-dimensional code information collected by the image collector, and execute instructions in computer-executable program code, where when the processor executes the instructions, the instructions enable the imaging device to perform any implementation of the first aspect.

According to an eighth aspect, an imaging device may include at least one processing component or chip configured to perform any implementation of the first aspect.

According to a ninth aspect, a program may include program code, where when a computer runs the computer program, the program code performs any implementation of the first aspect.

According to a tenth aspect, a computer-readable storage medium may include the program in the ninth aspect.

According to an eleventh aspect, a first electronic device may include a processor and a second scenario component, where the processor is configured to execute instructions in computer-executable program code, where when the processor executes the instructions, the instructions enable the imaging device to perform any implementation of the second aspect.

According to a twelfth aspect, an imaging device may include at least one processing component or chip configured to perform any implementation of the second aspect.

According to a thirteenth aspect, a program may include program code, where when a computer runs the computer program, the program code performs any implementation of the second aspect.

According to a fourteenth aspect, a computer-readable storage medium may include the program in the thirteenth aspect.

According to a fifteenth aspect, a computer program may include program code, where when a computer runs the computer program, the program code performs any implementation of the first aspect or any implementation of the second aspect.

According to a sixteenth aspect, a computer program product may include a computer program stored in a readable storage medium, at least one processor of an electronic device may read the computer program from the readable storage medium, and the at least one processor executes the computer program, so that the electronic device performs the method according to the first aspect or the method according to the second aspect. The electronic device may be the foregoing first electronic device or second electronic device.

DETAILED DESCRIPTION OF THE EMBODIMENTS

Figure 1:
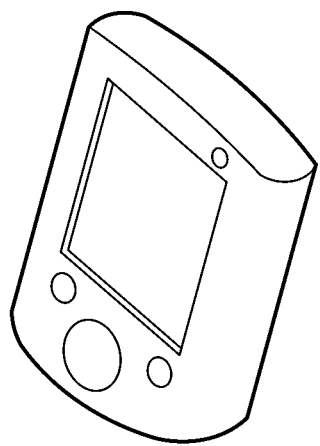
FIG. 1 is a schematic diagram 1 of an application scenario according to an embodiment.

Embodiments are applied to electronic devices. The electronic devices include but are not limited to a terminal device, a fixed electronic device, and a network device. The terminal devices may be mobile terminal devices or fixed terminal devices. The electronic devices may be electronic devices in the conventional technology or may be electronic devices emerging in the future.

In the following, some terms are described, to help a person skilled in the art have a better understanding. It should be noted that when the embodiments are applied to imaging devices, names of the imaging devices may change, but this does not affect the implementation of the embodiments.

(1) Electronic device: The electronic device may be a device that generates and displays a two-dimensional code; or may be a device that scans and processes a two-dimensional code; or may be a device that has both a function of generating and displaying a two-dimensional code and a function of scanning and processing a two-dimensional code.

(2) Terminal device: The terminal device is a device that provides voice and/or data connectivity for a user. The terminal device may be, but is not limited to, a mobile terminal, a vehicle terminal, a vehicle-mounted terminal, a vehicle device, a public terminal, a handheld device having a wireless communication function, a wearable device, a computing device, a terminal having a POS (point of sales) function, or the like. The vehicle-mounted terminal includes but is not limited to a vehicle-mounted navigator, or the like. The mobile terminal includes but is not limited to a mobile phone, a wearable device, a tablet computer, or the like. For example, the terminal device may be a virtual reality (VR) terminal device, an augmented reality (AR) terminal device, a wireless terminal in industrial control, a wireless terminal in self driving, a wireless terminal in telemedicine, a wireless terminal in smart grid, a wireless terminal in smart city, a wireless terminal in smart home, or the like.

(3) Network device: The network device, also referred to as a radio access network (RAN) device, is a device that connects a terminal device to a wireless network and includes devices in various communications standards. The network device may have a plurality of forms, such as a macro base station, a micro base station, a relay station, and an access point. The network device includes but is not limited to a network device in a new radio network or a network device in a long term evolution network. For example, the network device includes but is not limited to a transmission point (TRP), a next generation NodeB (gNB), a base transceiver station (BTS) in a global system for mobile communications (GSM) or code division multiple access (CDMA), a NodeB (NB) in a wideband code division multiple access (WCDMA) system, an evolved NodeB (eNB) in a long term evolution system, a radio network controller (RNC), a base station controller (BSC), a home evolved NodeB (HeNB), or an home NodeB (HNB), a baseband unit (BBU), or the like.

(4) Fixed electronic device: For example, the fixed electronic device may be a bus scanner capable of reading a two-dimensional code and/or generating a two-dimensional code, for example, a subway cloud gate machine capable of reading a two-dimensional code and/or generating a two-dimensional code. The subway cloud gate machine may be referred to as a cloud gate machine for short.

(5) "A plurality of" means two or more, and another quantifier is similar to this. The term "and/or" describes an association relationship for describing associated objects and represents that three relationships may exist. For example, A and/or B may represent the following three cases: only A exists, both A and B exist, and only B exists. The character "/" usually represents an "or" relationship between the associated objects.

(6) "Correspondence" may refer to an association or a binding relationship, and that A corresponds to B means that there is an association or a binding relationship between A and B.

It should be noted that nouns or terms used in embodiments may be mutually referenced, and details are not described again.

Figure 2:
FIG. 2 is a schematic diagram 2 of an application scenario according to an embodiment.

FIG. 1 is a schematic diagram 1 of an application scenario according to an embodiment. FIG. 2 is a schematic diagram 2 of an application scenario according to an embodiment. As shown in FIG. 1 and FIG. 2, solutions in the embodiments may be applied to mobile terminals shown in FIG. 1 and FIG. 2. A mobile terminal may read a two-dimensional code displayed by another electronic device. As shown in FIG. 2, the mobile terminal may further generate and display a two-dimensional code.

Figure 3:
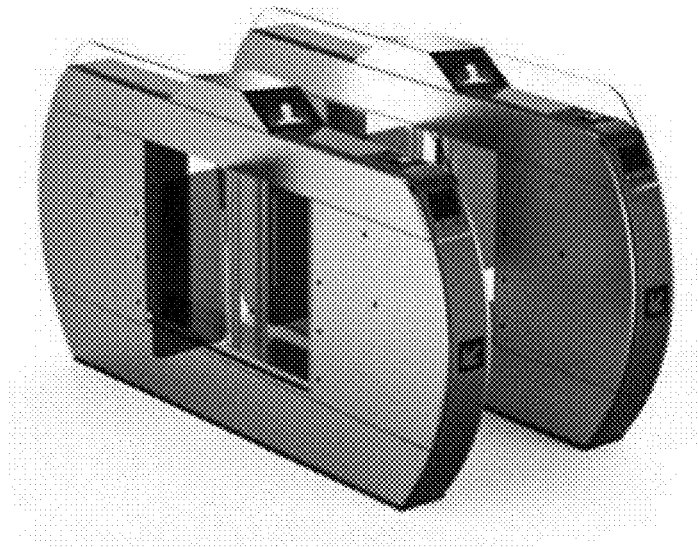
FIG. 3 is a schematic diagram 3 of an application scenario according to an embodiment.

FIG. 3 is a schematic diagram 3 of an application scenario according to an embodiment. As shown in FIG. 3, the solution in this embodiment may be applied to a gate machine shown in FIG. 3. The gate machine can read a two-dimensional code displayed by another electronic device. In an example, the gate machine can also generate and display a two-dimensional code. In addition, this embodiment may be further applied to a device such as a mobile terminal or a code scanner in a payment scenario.

With development of terminal technologies, electronic devices have become indispensable tools in people's life and work. Among the electronic devices, terminal devices are particularly widely used. To enhance convenience of a user's life, an electronic device may provide a two-dimensional code, and further, the user completes a payment action or the like by using the two-dimensional code. When the electronic device generates the two-dimensional code, the electronic device may receive an attack from malware or the like. Further, the two-dimensional code that needs to be displayed by the electronic device is replaced with a two-dimensional code generated by the malware. Consequently, the electronic device displays the replaced two-dimensional code, and further, property of the user is stolen. Further, the malicious replacement of the two-dimensional code in the conventional technology causes a loss to the property of the user.

In an example, the electronic device may be a mobile terminal device. Emergence and development of a mobile terminal device bring great convenience to a user's life and work. For example, the user may use the mobile terminal device to perform photographing, navigation, and payment. As functions, a storage capacity, and a computing capability of the mobile terminal device become stronger, security of privacy information and property of the user in the mobile terminal device needs to be better ensured. Once the mobile terminal device is maliciously attacked, the privacy information and property of the user in the mobile terminal device are stolen.

Previously, an operating system in the mobile terminal device is not secure. An attacking device may control an operating system kernel in the mobile terminal device by using a security vulnerability, and further, the attacking device may steal the privacy information and property of the user in the mobile terminal device. For example, the attacking device uses the security vulnerability to control the operating system kernel in the mobile terminal device, and further attacks a two-dimensional code generated by the mobile terminal device. Further, the attacking device uses a malicious two-dimensional code to replace the two-dimensional code generated by the mobile terminal device.

In a process of displaying an interface by an application program of the terminal device, a background program of the terminal device is allowed to actively pop up an interface to a foreground and become an application program running in the foreground. When the user operates a normal foreground application program, the user triggers switching of an application program interface. At a moment when the terminal device switches the interface, a background malicious application program may pop up an interface of the background malicious application program, and further, the malicious interface replaces the interface that needs to be displayed by the normal application program. The user can hardly perceive the foregoing process.

Based on the foregoing reason, when the terminal device needs to generate and display the two-dimensional code, the user triggers the normal application program of the terminal device to generate and display the two-dimensional code. In this case, the background malicious application program of the terminal device may detect a triggering action of the user by using a thread. Then the malicious application program displays a malicious two-dimensional code to replace the two-dimensional code that needs to be displayed by the normal application program. When this process occurs in a payment scenario, the malicious two-dimensional code carries information about an attacker for receiving money. Further, the property of the user is stolen, and a loss is caused to the property of the user.

For example, the background malicious application program of the terminal device can view thread information of another application program by using a ps-At command, and the view operation does not require any additional permission. The malicious application program may continuously view thread information of a payment application program. Therefore, the malicious application program can detect, by using a side channel, a start moment of a thread represented as a payment action, and the malicious application program executes an am command in the background to replace an interface of a normal two-dimensional code for receiving money.

To defend a normal two-dimensional code against an attack of a malicious application program, in a remote payment scenario, when the terminal device needs to scan a two-dimensional code displayed on a web page, the two-dimensional code displayed on the web page carries location information of a payee. Further, when the terminal device scans the two-dimensional code displayed on the web page, the terminal device may parse out the location information in the two-dimensional code. The terminal device displays the location information in the two-dimensional code, and then the user manually determines whether the location information in the two-dimensional code is the location information of the payee. However, this mode is applicable only to the remote payment scenario. In addition, it is necessary to ensure that location information in two-dimensional codes of different payees is different. Otherwise, verification of the location information by the user cannot ensure that information in the two-dimensional code for receiving money is accurate.

A two-dimensional code processing method and a device may resolve the foregoing problem.

Figure 4:
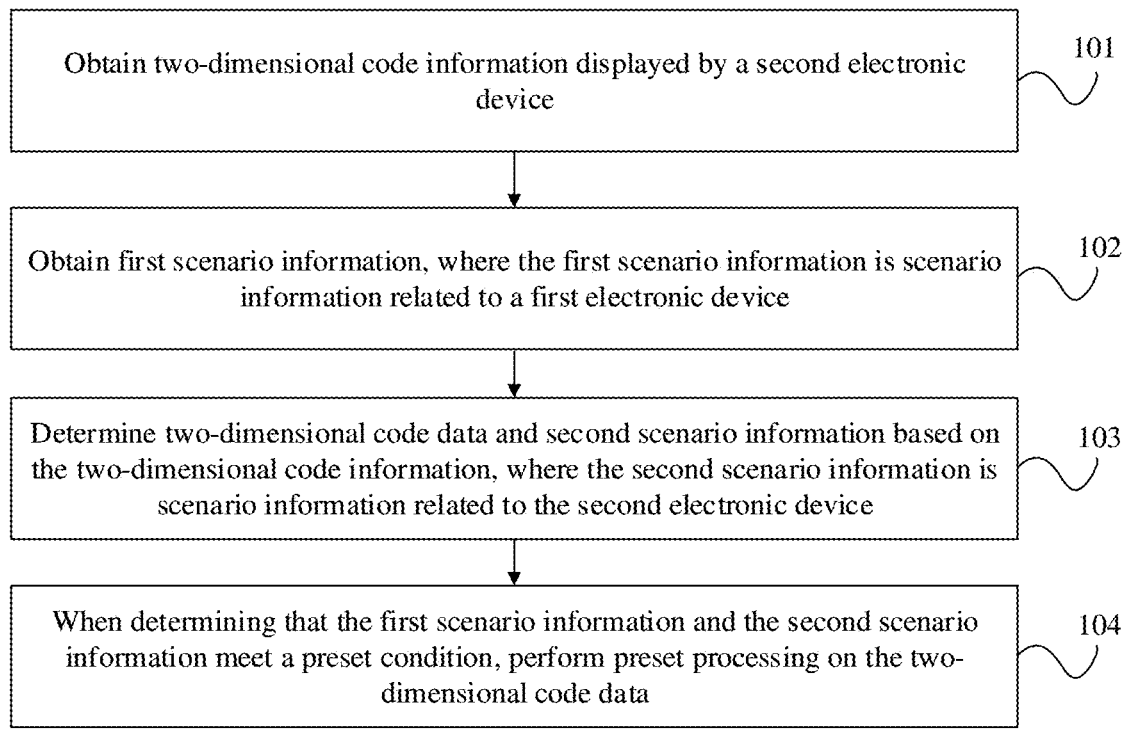
FIG. 4 is a schematic flowchart of a two-dimensional code processing method according to an embodiment.

FIG. 4 is a schematic flowchart of a two-dimensional code processing method according to an embodiment. In the embodiment shown in FIG. 4, the method is applied to a first electronic device, and the method includes the following steps.

101. Obtain two-dimensional code information displayed by a second electronic device.

For example, the first electronic device may be a mobile terminal device, may be a terminal device having a POS function, or may be a cloud gate machine. Alternatively, the first electronic device may be another apparatus or device that can perform the solution in this embodiment.

In this embodiment, the first electronic device may complete each step by using a rich execution environment (rich execution environment, REE) system, or the first electronic device may complete each step by using a trusted execution environment (trusted execution environment, TEE) system, or the first electronic device may complete each step by using another operating system. An architecture and a system on which the first electronic device is based are not limited in this embodiment.

The second electronic device may complete each step by using an REE system, or the second electronic device may complete each step by using a TEE system, or the second electronic device may complete each step by using another operating system. An architecture and a system on which the second electronic device is based are not limited in this embodiment.

The first electronic device and the second electronic device may interact within a short range. After the second electronic device receives a trigger instruction, the second electronic device determines that a two-dimensional code needs to be generated and displayed. The two-dimensional code displayed by the second electronic device is referred to as two-dimensional code information; and the two-dimensional code information is a black and white interface or a color interface.

The second electronic device may obtain scenario information related to the second electronic device, and the scenario information related to the second electronic device is referred to as second scenario information. In addition, the second electronic device obtains two-dimensional code data. The two-dimensional code data represents user information of a user corresponding to the second electronic device. Then the second electronic device generates the two-dimensional code information based on the second scenario information and the two-dimensional code data. Therefore, the two-dimensional code information carries the two-dimensional code data and the scenario information related to the second electronic device.

In an example, the second electronic device may generate the two-dimensional code information based on prestored two-dimensional code data and the obtained second scenario information.

In an example, the second electronic device may obtain the two-dimensional code data from a network device, and then generate the two-dimensional code information based on the two-dimensional code data and the obtained second scenario information.

In an example, in a payment scenario, the two-dimensional code data includes but is not limited to user information of a user as a payee. Alternatively, in a payment scenario, the two-dimensional code data includes but is not limited to user information of a user as a payer. In a contact-adding scenario, the two-dimensional code data includes but is not limited to user information and a user identity.

In an example, the second scenario information includes but is not limited to the following information: global positioning system (GPS) information of the second electronic device, Bluetooth information of the second electronic device, wireless local area network (WLAN) information of the second electronic device, and information about a natural environment in which the second electronic device is located. The Bluetooth information of the second electronic device is Bluetooth information of a Bluetooth connection sent by the second electronic device. The Wi-Fi information of the second electronic device is information about a wireless local area network to which the second electronic device is connected. The information about the natural environment in which the second electronic device is located includes but is not limited to the following information: ambient noise information, ambient illumination information, ambient humidity information, and ambient temperature information.

The second electronic device displays the two-dimensional code information, and then the first electronic device may scan the two-dimensional code displayed by the second electronic device.

102. Obtain first scenario information, where the first scenario information is scenario information related to the first electronic device.

For example, after the first electronic device obtains the two-dimensional code information, the first electronic device may further obtain the scenario information related to the first electronic device. The scenario information related to the first electronic device is referred to as the first scenario information.

In an example, the first scenario information includes but is not limited to the following information: global positioning system (GPS) information of the first electronic device, Bluetooth information of the first electronic device, wireless local area network (wifi) information of the first electronic device, and information about a natural environment in which the first electronic device is located. The Bluetooth information of the first electronic device is Bluetooth information of a Bluetooth connection sent by the first electronic device. The Wi-Fi information of the first electronic device is information about a wireless local area network to which the first electronic device is connected. The information about the natural environment in which the first electronic device is located includes but is not limited to the following information: ambient noise information, ambient illumination information, ambient humidity information, and ambient temperature information.

103. Determine the two-dimensional code data and the second scenario information based on the two-dimensional code information, where the second scenario information is the scenario information related to the second electronic device.

For example, because the second scenario information is added to the two-dimensional code information generated by the second electronic device, after parsing the scanned two-dimensional code information, the first electronic device may obtain the two-dimensional code data and the second scenario information.

In addition, an execution order of a process in which the first electronic device parses the two-dimensional code information and a process in which the first electronic device obtains the first scenario information is not limited. In other words, an execution order of step 102 and step 103 is not limited. Step 102 may be first performed, and then step 103 is performed. Alternatively, step 103 may be performed first and then step 102 is performed. Alternatively, step 102 and step 103 may be performed simultaneously.

104. When determining that the first scenario information and the second scenario information meet a preset condition, perform preset processing on the two-dimensional code data.

For example, in step 102, the first electronic device has obtained the first scenario information related to the first electronic device, and in step 103, the first electronic device has obtained the second scenario information related to the second electronic device. Then the first electronic device may verify the first scenario information and the second scenario information, to further determine whether the first scenario information and the second scenario information meet the preset condition.

In an example, if the scenario information is GPS information, that is, the first scenario information is a location of the first electronic device, and the second scenario information is a location of the second electronic device, the preset condition may be that the first electronic device and the second electronic device are located in a same geographical range.

In an example, if the scenario information is Wi-Fi information, that is, the first scenario information is the information about the wireless local area network to which the first electronic device is connected, and the second scenario information is the information about the wireless local area network to which the second electronic device is connected, the preset condition may be that both the first electronic device and the second electronic device are connected to the same wireless local area network. Alternatively, the preset condition may be that the wireless local area network to which the first electronic device is connected and the wireless local area network to which the second electronic device is connected belong to a same network range.

In an example, if the scenario information is Bluetooth information, that is, the second scenario information is the Bluetooth connection sent by the second electronic device, and the first scenario information is a Bluetooth list in which the first electronic device can connect to Bluetooth, the preset condition is that the Bluetooth connection represented by the second scenario information is located in the Bluetooth list represented by the first scenario information.

In an example, if the scenario information is illumination information, that is, the first scenario information is illumination intensity of the environment in which the first electronic device is located, and the second scenario information is illumination intensity of the environment in which the second electronic device is located, the preset condition may be that the illumination intensity represented by the first scenario information and the illumination intensity represented by the second scenario information are the same.

In an example, if the scenario information is noise information, that is, the first scenario information is noise intensity of the environment in which the first electronic device is located, and the second scenario information is noise intensity of the environment in which the second electronic device is located, the preset condition may be that the noise intensity represented by the first scenario information and the noise intensity represented by the second scenario information are the same.

When determining that the first scenario information and the second scenario information meet the preset condition, the first electronic device may perform preset processing on the obtained two-dimensional code data. The preset processing includes but is not limited to: performing transfer processing on a payee represented by the two-dimensional code data, performing fee deduction processing on a payer represented by the two-dimensional code data, and sending a preset request to a user represented by the two-dimensional code data, where the preset request is, for example, a request for adding a contact.

In this embodiment, the first electronic device obtains the two-dimensional code information displayed by the second electronic device; the first electronic device obtains the first scenario information, and determines the two-dimensional code data and the second scenario information based on the two-dimensional code information, where the first scenario information is the scenario information related to the first electronic device, and the second scenario information is the scenario information related to the second electronic device; and when determining that the first scenario information and the second scenario information meet the preset condition, the first electronic device performs preset processing on the two-dimensional code data. The scenario information of the electronic device is added to the two-dimensional code, so that the scenario information in the two-dimensional code displayed by the second electronic device is related to the second electronic device; then the first electronic device may obtain, from the two-dimensional code, the second scenario information related to the second electronic device; in addition, the first electronic device may obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of the user is ensured.

Figure 5:
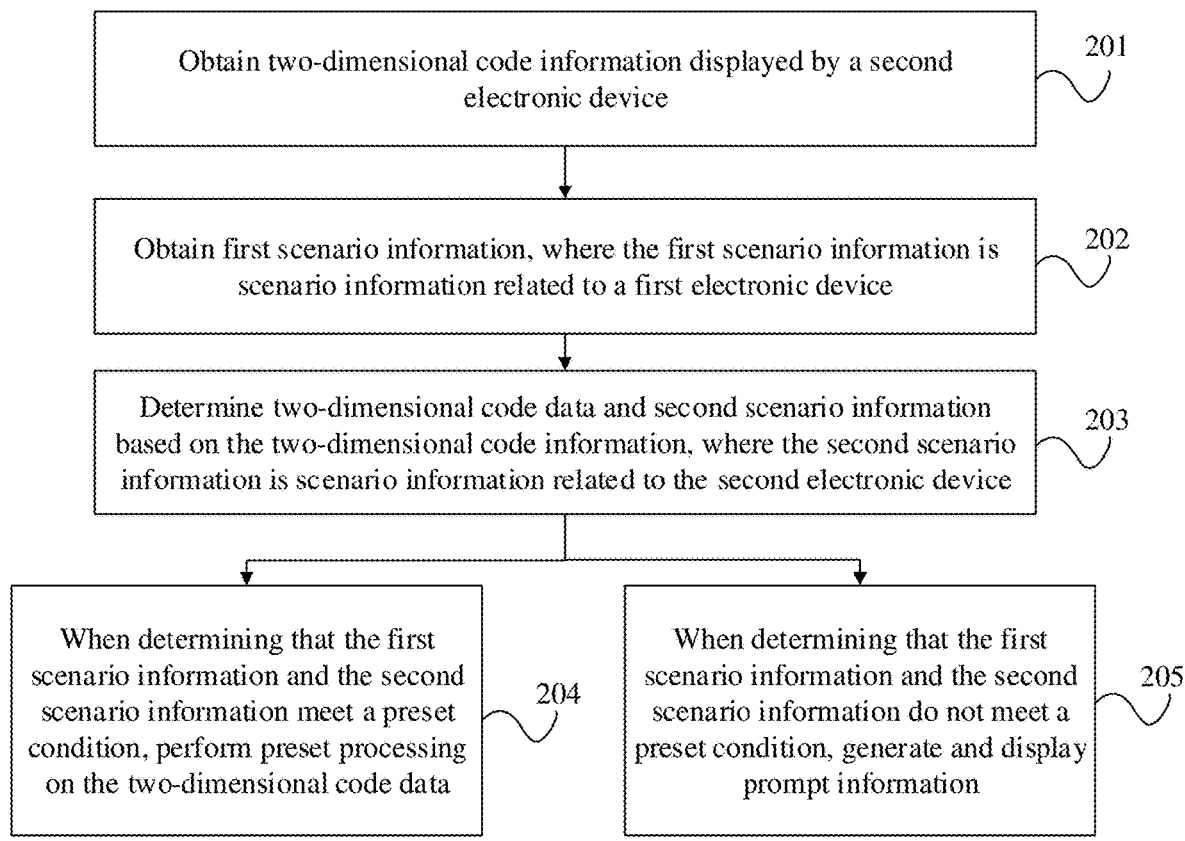
FIG. 5 is a schematic flowchart of another two-dimensional code processing method according to an embodiment.

FIG. 5 is a schematic flowchart of another two-dimensional code processing method according to an embodiment. In the embodiment shown in FIG. 4, the method is applied to a first electronic device, and the method includes the following steps.

201. Obtain two-dimensional code information displayed by a second electronic device.

For example, the first electronic device may be a mobile terminal device, may be a terminal device having a POS function, or may be a cloud gate machine. Alternatively, the first electronic device may be another apparatus or device that can perform the solution in this embodiment.

In this embodiment, the first electronic device may complete each step by using an REE system, or the first electronic device may complete each step by using a trusted execution environment (TEE) system, or the first electronic device may complete each step by using another operating system. An architecture and a system on which the first electronic device is based are not limited in this embodiment.

The second electronic device may complete each step by using an REE system, or the second electronic device may complete each step by using a TEE system, or the second electronic device may complete each step by using another operating system. An architecture and a system on which the second electronic device is based are not limited in this embodiment.

For this step, refer to step 101 shown in FIG. 4. Details are not described again.

202. Obtain first scenario information, where the first scenario information is scenario information related to the first electronic device.

For example, for this step, refer to step 102 shown in FIG. 4. Details are not described again.

203. Determine two-dimensional code data and second scenario information based on the two-dimensional code information, where the second scenario information is scenario information related to the second electronic device.

For example, for this step, refer to step 103 shown in FIG. 4. Details are not described again. An execution order of step 202 and step 203 is not limited. Step 202 may be first performed, and then step 203 is performed. Alternatively, step 203 may be performed first and then step 202 is performed. Alternatively, step 202 and step 203 may be performed simultaneously.

204. When determining that the first scenario information and the second scenario information meet a preset condition, perform preset processing on the two-dimensional code data.

For example, for this step, refer to step 104 shown in FIG. 4. Details are not described again.

205. When determining that the first scenario information and the second scenario information do not meet the preset condition, generate and display prompt information.

For example, in step 202, the first electronic device has obtained the first scenario information related to the first electronic device, and in step 203, the first electronic device has obtained the second scenario information related to the second electronic device. Then the first electronic device may verify the first scenario information and the second scenario information, to further determine whether the first scenario information and the second scenario information meet the preset condition.

When determining that the first scenario information and the second scenario information meet the preset condition, the first electronic device determines that the obtained two-dimensional code data is tampered with or replaced, and the first electronic device does not perform preset processing on the two-dimensional code data.

In this case, the first electronic device needs to prompt a user, and the first electronic device prompts the user that the two-dimensional code is replaced. The first electronic device generates the prompt information, and the first electronic device displays the prompt information to the user holding the first electronic device, where the prompt information represents that the two-dimensional code is a dangerous two-dimensional code. In an example, the first electronic device may further send prompt information to the second electronic device, to prompt that the two-dimensional code generated by the second electronic device is maliciously replaced.

Figure 6:
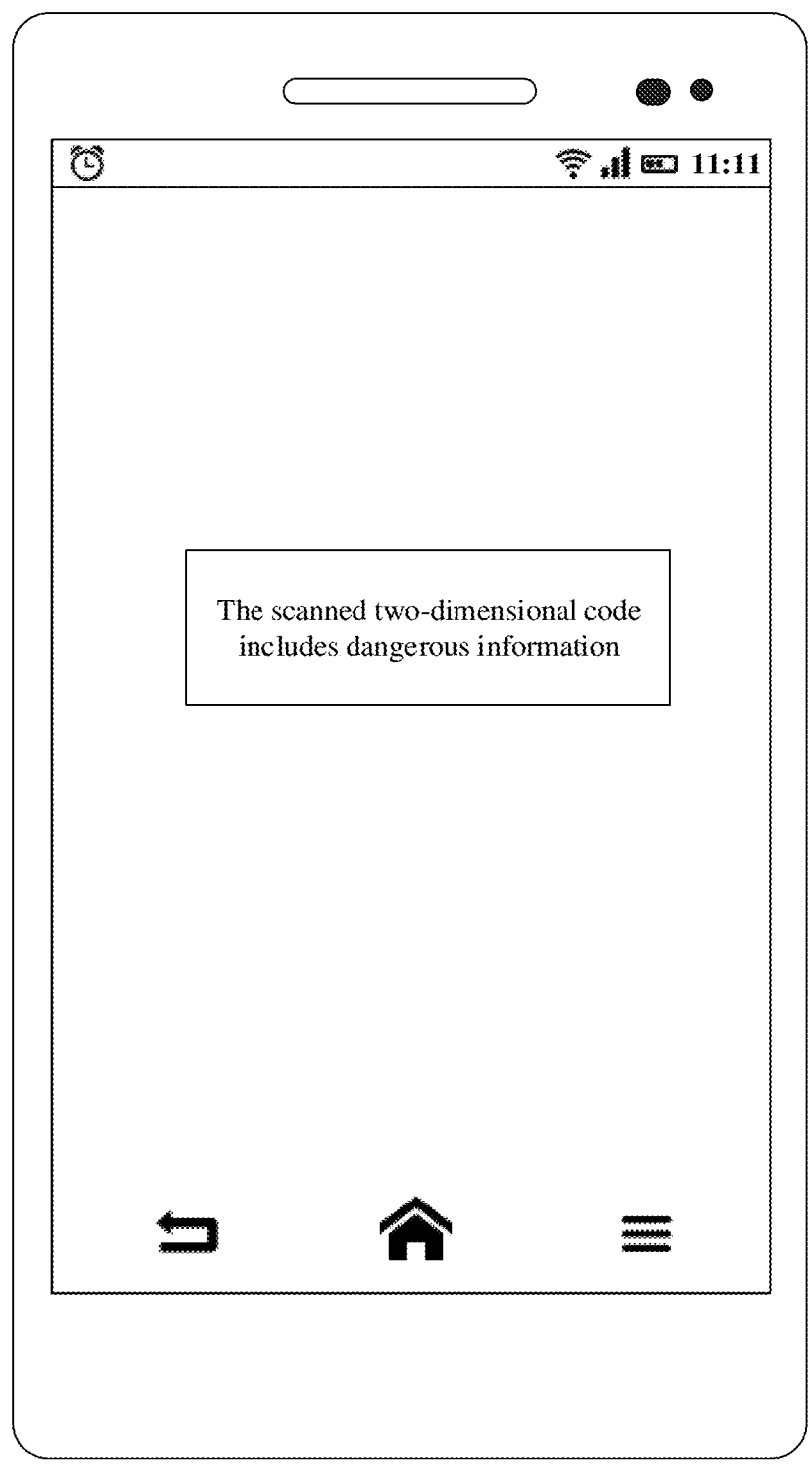
FIG. 6 is a schematic display diagram of a first electronic device according to an embodiment.

The prompt information includes but is not limited to the following information: text information, image information, voice information, or vibration information. In an example, FIG. 6 is a schematic display diagram of the first electronic device according to this embodiment. As shown in FIG. 6, the first electronic device may pop up a display interface, and the display interface is for prompting the user that the obtained two-dimensional code is maliciously replaced. The user may select a button on the display interface to close the display interface. Alternatively, the first electronic device may control the display interface to gradually disappear.

In an example, if the scenario information is GPS information, that is, the first scenario information is a location of the first electronic device, and the second scenario information is a location of the second electronic device, if the first electronic device determines that the location represented by the first scenario information and the location of the second electronic device do not fall within a same geographical range, the first electronic device sends prompt information to the user, to prompt that the two-dimensional code is maliciously replaced, and further prompt the user not to perform a subsequent operation.

In an example, if the scenario information is Wi-Fi information, that is, the first scenario information is information about a wireless local area network to which the first electronic device is connected, and the second scenario information is information about a wireless local area network to which the second electronic device is connected, if the first electronic device determines that the wireless local area network to which the first electronic device is connected and the wireless local area network to which the second electronic device is connected are different wireless local area networks, the first electronic device sends prompt information to the user, to prompt that the two-dimensional code is maliciously replaced, and further prompt the user not to perform a subsequent operation.

In an example, if the scenario information is Bluetooth information, that is, the second scenario information is a Bluetooth connection sent by the second electronic device, and the first scenario information is a Bluetooth list in which the first electronic device can connect to Bluetooth, if the first electronic device determines that the Bluetooth connection sent by the second electronic device is not in the Bluetooth list of the first electronic device, the first electronic device sends prompt information to the user, to prompt that the two-dimensional code is maliciously replaced, and further prompt the user not to perform a subsequent operation.

In this embodiment, on a basis of the foregoing embodiment, the first electronic device compares the first scenario information related to the first electronic device with the second scenario information related to the second electronic device, to determine whether the first scenario information matches the second scenario information; if it is determined that the first scenario information does not match the second scenario information, the first electronic device may determine that the scanned two-dimensional code is not generated by the second electronic device, but is generated by a malicious device and then substituted into the second electronic device; therefore, the first electronic device may send prompt information to prompt the user or the second electronic device. The two-dimensional code may be automatically verified based on the scenario information, and when it is determined that the scanned two-dimensional code is a malicious attack two-dimensional code, the prompt information is sent, to ensure security of property of the user.

Figure 7:
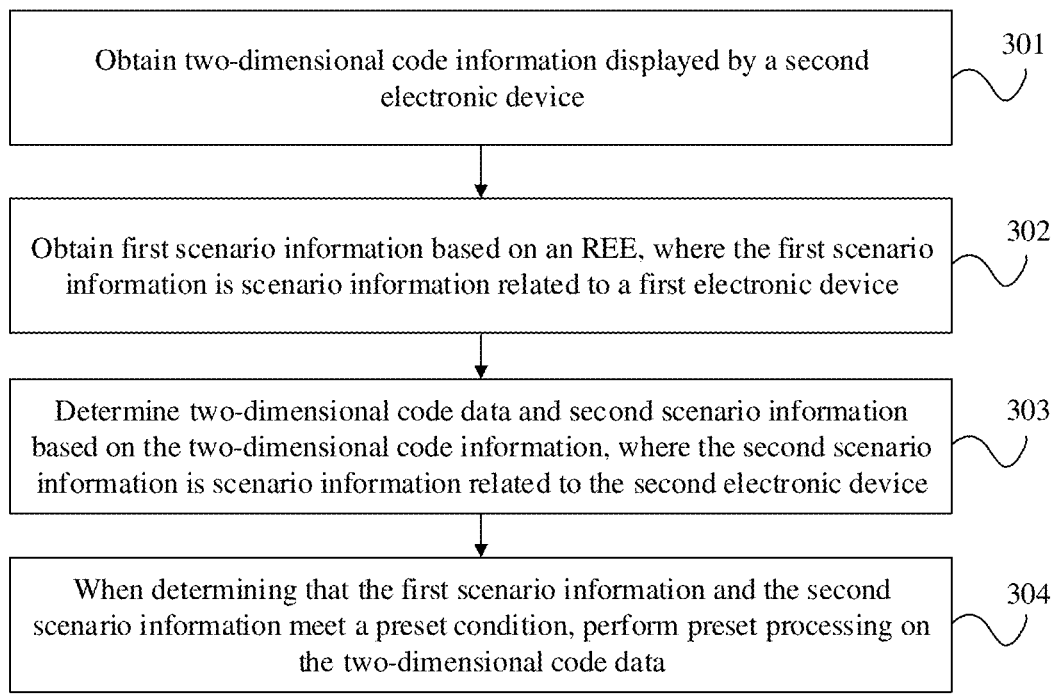
FIG. 7 is a schematic flowchart of still another two-dimensional code processing method according to an embodiment.

FIG. 7 is a schematic flowchart of still another two-dimensional code processing method according to an embodiment. In the embodiment shown in FIG. 7, the method is applied to a first electronic device, and a rich execution environment (REE) is deployed in a system of the first electronic device. The method includes the following steps.

301. Obtain two-dimensional code information displayed by a second electronic device.

For example, the first electronic device may be a mobile terminal device, may be a terminal device having a POS function, or may be a cloud gate machine. Alternatively, the first electronic device may be another apparatus or device that can perform the solution in this embodiment.

An REE system may be deployed in the system of the electronic device. The REE system may include the following several running modes: a user mode, a kernel mode, and the like.

The second electronic device may complete each step by using the REE system, or the second electronic device may complete each step by using a TEE system, or the second electronic device may complete each step by using another operating system. An architecture and a system on which the second electronic device is based are not limited in this embodiment.

Referring to step 101 in FIG. 4, the second electronic device may obtain second scenario information related to the second electronic device. The second electronic device generates and displays the two-dimensional code information based on the second scenario information and two-dimensional code data.

302. Obtain first scenario information based on the REE, where the first scenario information is scenario information related to the first electronic device.

For example, the REE system of the first electronic device may obtain the first scenario information in user mode or kernel mode. Alternatively, another operating system is configured in the first electronic device, and the REE system of the first electronic device interacts with the another operating system to further obtain the first scenario information.

The first scenario information is the scenario information related to the first electronic device.

303. Determine the two-dimensional code data and the second scenario information based on the two-dimensional code information, where the second scenario information is the scenario information related to the second electronic device.

In an example, step 303 includes: decrypting the two-dimensional code information to obtain the two-dimensional code data and the second scenario information.

For example, the REE system of the first electronic device may decrypt and parse the scanned two-dimensional code information in user mode or kernel mode to obtain the two-dimensional code data and the second scenario information. Alternatively, another operating system is configured in the first electronic device, and the another operating system of the first electronic device decrypts and parses the scanned two-dimensional code information.

An execution order of step 302 and step 303 is not limited. Step 302 may be first performed, and then step 303 is performed. Alternatively, step 303 may be performed first and then step 302 is performed. Alternatively, step 302 and step 303 may be performed simultaneously.

304. When determining that the first scenario information and the second scenario information meet a preset condition, perform preset processing on the two-dimensional code data.

For example, the REE system of the first electronic device may analyze the first scenario information and the second scenario information in user mode or kernel mode. Alternatively, another operating system is configured in the first electronic device, and the another operating system of the first electronic device analyzes the first scenario information and the second scenario information.

For a specific process of analyzing the first scenario information and the second scenario information, refer to step 104 shown in FIG. 4. Details are not described again.

In this embodiment, the first electronic device may perform each step on an REE system side to automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of a user is ensured.

Figure 8:
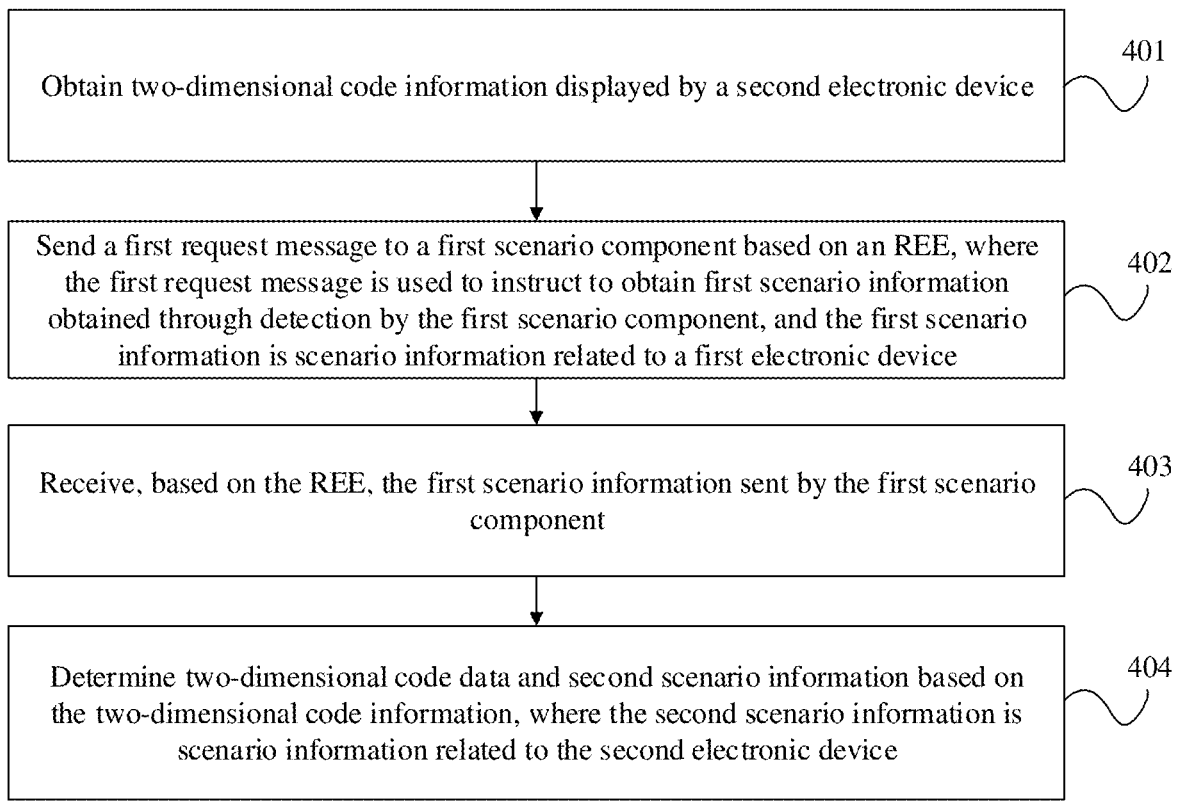
FIG. 8 is a schematic flowchart of yet another two-dimensional code processing method according to an embodiment.

FIG. 8 is a schematic flowchart of yet another two-dimensional code processing method according to an embodiment. In the embodiment shown in FIG. 8, the method is applied to a first electronic device, an REE is deployed in a system of the first electronic device, and a first scenario component is disposed in the first electronic device. The method includes the following steps.

401. Obtain two-dimensional code information displayed by a second electronic device.

For example, the first electronic device may be a mobile terminal device, may be a terminal device having a POS function, or may be a cloud gate machine. Alternatively, the first electronic device may be another apparatus or device that can perform the solution in this embodiment.

An REE system may be deployed in the system of the electronic device. The REE system may include the following several running modes: a user mode, a kernel mode, and the like.

The second electronic device may complete each step by using an REE system, or the second electronic device may complete each step by using a TEE system, or the second electronic device may complete each step by using another operating system. An architecture and a system on which the second electronic device is based are not limited in this embodiment.

Referring to step 101 in FIG. 4, the second electronic device may obtain second scenario information related to the second electronic device. The second electronic device generates and displays the two-dimensional code information based on the second scenario information and two-dimensional code data.

402. Send a first request message to the first scenario component based on the REE, where the first request message is for indicating to generate first scenario information obtained through detection by the first scenario component, and the first scenario information is scenario information related to the first electronic device.

For example, the REE system of the first electronic device may obtain the first scenario information in user mode or kernel mode. The first scenario information is the scenario information related to the first electronic device.

The first scenario component may be configured in the first electronic device. For example, if the first scenario component is a GPS chip, the first scenario information is GPS information. If the first scenario component is a Wi-Fi module, the first scenario information is Wi-Fi information. If the first scenario component is a Bluetooth chip, the first scenario information is Bluetooth information. If the first scenario component is a temperature sensor, the first scenario information is ambient temperature information. If the first scenario component is a sound sensor, the first scenario information is ambient noise information. If the first scenario component is a photosensor, the first scenario information is ambient illumination information.

The REE system of the first electronic device may directly interact with the first scenario component, and the REE system of the first electronic device may obtain the first scenario information detected by the first scenario component.

Therefore, the REE system of the first electronic device may directly send an instruction to the first scenario component to obtain the first scenario information. In an example, the REE system of the first electronic device sends the first request message to the first scenario component; and then the first scenario component sends the first scenario information obtained through detection to the REE system of the first electronic device.

403. Receive, based on the REE, the first scenario information sent by the first scenario component.

For example, referring to step 402, the REE system of the first electronic device may receive the first scenario information returned by the first scenario component. Step 403 is performed after step 402.

404. Determine the two-dimensional code data and the second scenario information based on the two-dimensional code information, where the second scenario information is the scenario information related to the second electronic device.

In an example, step 404 includes: decrypting the two-dimensional code information to obtain the two-dimensional code data and the second scenario information.

For example, the REE system of the first electronic device may decrypt and parse the scanned two-dimensional code information in user mode or kernel mode to obtain the two-dimensional code data and the second scenario information. In other words, the first electronic device completes parsing of the two-dimensional code information in the REE system.

An execution order of step 402 and step 404 is not limited. Step 402 may be first performed, and then step 404 is performed. Alternatively, step 404 may be performed first and then step 402 is performed. Alternatively, step 402 and step 404 may be performed simultaneously.

405. When determining that the first scenario information and the second scenario information meet a preset condition, perform preset processing on the two-dimensional code data.

For example, the REE system of the first electronic device may analyze the first scenario information and the second scenario information in user mode or kernel mode. In other words, the first electronic device completes analysis of the first scenario information and the second scenario information in the REE system.

For analysis of the first scenario information and the second scenario information, refer to step 104 shown in FIG. 4. Details are not described again.

In this embodiment, the first electronic device may perform each step on an REE system side, that is, complete obtaining and verification of the scenario information in the REE, to automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of a user is ensured. The process is simple and fast.

Figure 9:
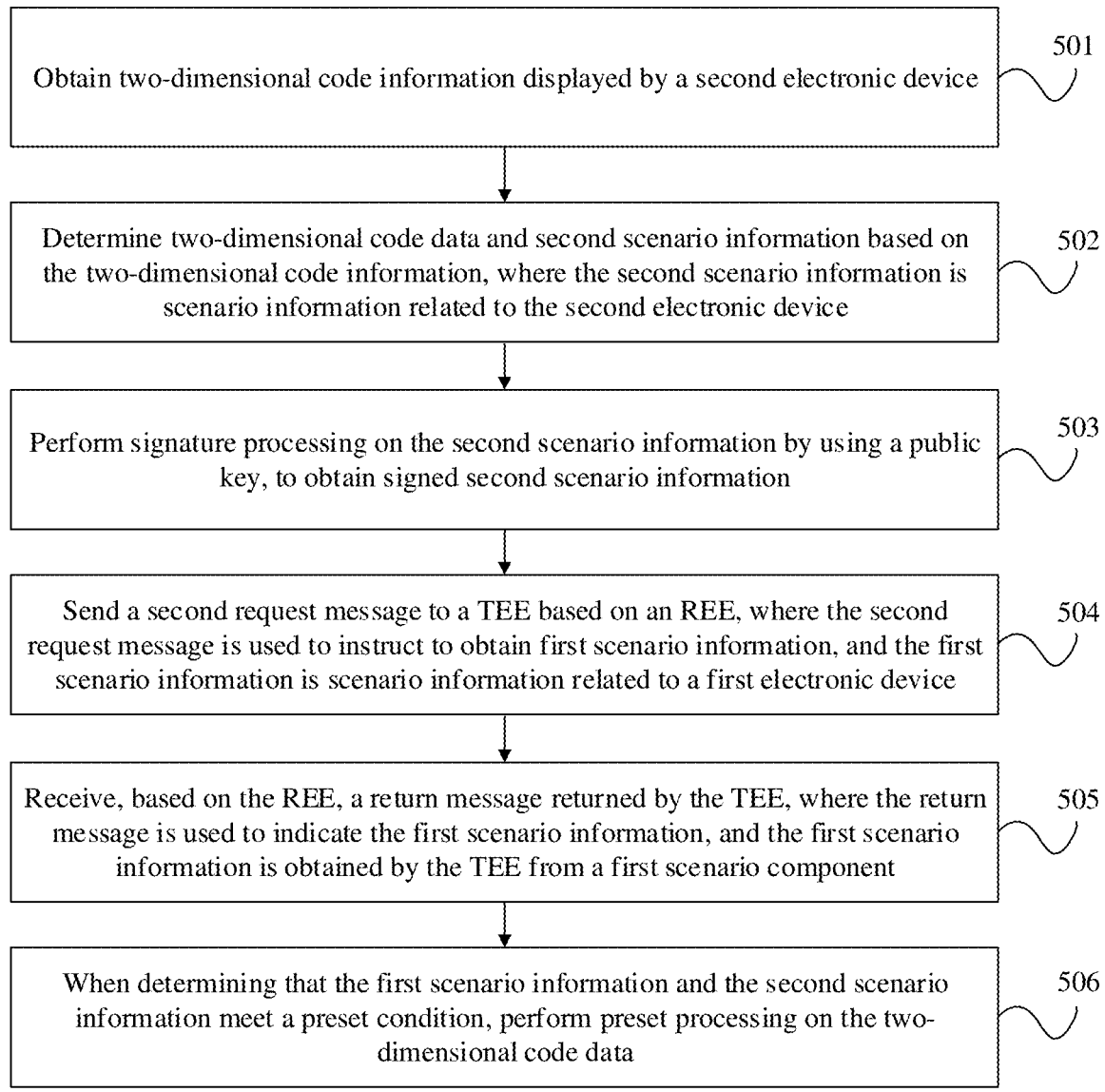
FIG. 9 is a schematic flowchart of a further two-dimensional code processing method according to an embodiment.

FIG. 9 is a schematic flowchart of a further two-dimensional code processing method according to an embodiment. In the embodiment shown in FIG. 9, the method is applied to a first electronic device, a rich execution environment (REE) and a trusted execution environment (TEE) are deployed in a system of the first electronic device, and a first scenario component is disposed in the first electronic device. The method includes the following steps.

501. Obtain two-dimensional code information displayed by a second electronic device.

For example, the first electronic device may be a mobile terminal device, may be a terminal device having a POS function, or may be a cloud gate machine. Alternatively, the first electronic device may be another apparatus or device that can perform the solution in this embodiment.

To ensure security of the electronic device, a TrustZone technology and an advanced RISC machine (ARM) hardware virtualization technology are introduced. A mobile terminal device may use an ARM TrustZone technology to ensure that the mobile terminal device is not easily attacked. A hardware security feature in an ARM central processing unit (CPU) may support the TrustZone technology and the ARM hardware virtualization technology. The ARM TrustZone technology has a higher permission than an operating system, and therefore is not easily attacked.

The ARM TrustZone technology divides hardware resources into two system sides: an REE system side and a TEE system side. Further, the ARM TrustZone technology divides the hardware resources into two worlds: a normal world and a secure world. The REE side is a normal world, and the TEE side is a secure world.

An operating system closely related to a user can run in an REE system. The TrustZone technology, as a technology for ensuring system security, runs in a TEE system.

The normal world does not mean that the operating system or software running in the REE system is malicious, but that security of the REE system is lower than that of the TEE system. When a central processing unit (central processing unit, CPU) works in the REE system, resources on the TEE system side are not allowed to be accessed by the central processing unit. The resources on the TEE system side include, for example, a register, a memory, a cache, and an external device. When the central processing unit accesses the resources on the TEE system side, the REE system crashes. However, hardware and software running in the TEE system may have higher access permissions.

In an example, hardware that uses the TrustZone technology may set a sensitive memory as a secure memory (Secure Memory) by configuring a TZASC (TrustZone address space controller) register and a TZMA (TrustZone memory adapter) register, so that the REE system cannot access the secure memory. When the central processing unit works in the TEE system, the central processing unit may access both resources in the TEE system and resources in the REE system.

Figure 10:
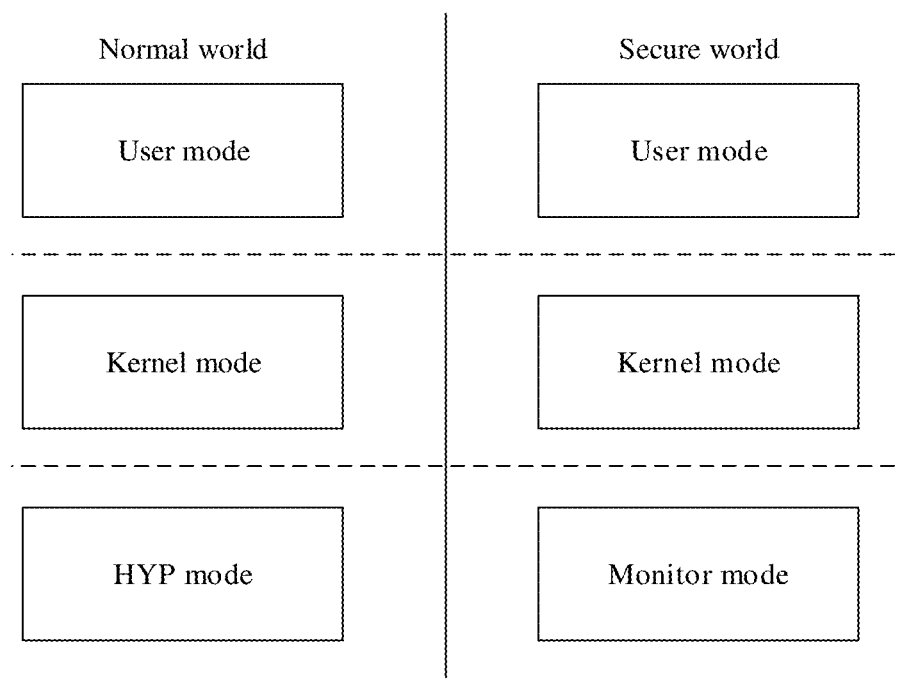
FIG. 10 is a schematic diagram of a system architecture of ARMv7 according to an embodiment.

In an example, the REE system and the TEE system may run in an ARMv7 system architecture. FIG. 10 is a schematic diagram of a system architecture of ARMv7 according to this embodiment.

As shown in FIG. 10, the REE system used as the normal world includes the following architectural layers (CPU modes): a user mode (USR), a kernel mode (SVC), and a hypervisor mode (HYP). In user mode and kernel mode of the REE system, an operating system closely related to the user and user operations can run. The HYP mode is a mode with a highest access permission in the REE system. In an example, when the central processing unit works in HYP mode, the central processing unit can access all hardware resources in user mode, kernel mode, and HYP mode. When the central processing unit works in user mode or kernel mode, the central processing unit cannot access any hardware resource in HYP mode. As shown in FIG. 10, the REE used as the normal world includes three permission levels: PL0, PL1, and PL2. PL0 is the user mode, PL1 is the kernel mode, and PL2 is the HYP mode.

As shown in FIG. 10, the TEE system used as the secure world includes the following architectural layers (CPU mode): a user mode (USR), a kernel mode (SVC), and a monitor mode (MON). Possibly, the TEE system may also include a hypervisor mode (HYP). The monitor mode is a mode with a highest access permission in the TEE system. In an example, when the central processing unit works in monitor mode, the central processing unit can access all hardware resources in the secure world and can also access all hardware resources in the normal world. In addition, the TrustZone technology can be used in monitor mode to initialize and activate the hypervisor mode by configuring a hypervisor-related control register.

Moreover, the monitor mode in the TEE is also an entrance from the normal world to the secure world. In an example, in kernel mode or HYP mode of the REE system, a secure monitor call (SMC) instruction for entering the TEE from the REE may be executed, and further, it is possible to actively switch from the REE system to the monitor mode of the TEE system.

In an example, in monitor mode of the TEE system, an ERET instruction may be executed, and then the central processing unit may check an NS bit of a secure control register (SCR), to further determine whether to continue to stay in the TEE system. When the NS bit is set to 1, a return operation is performed in monitor mode to return to a kernel of the REE system, and then a world switch operation is performed. When the NS bit is set to 0, a return operation is performed in monitor mode to return to a kernel of the TEE system, and no world switch operation is performed.

Figure 11:
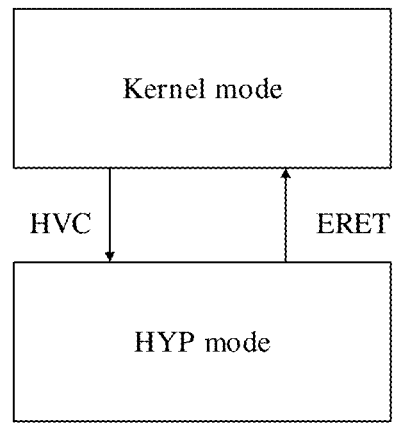
FIG. 11 is a schematic diagram of instructions of an REE system according to an embodiment.

FIG. 11 is a schematic diagram of instructions of the REE system according to this embodiment. As shown in FIG. 11, an HVC (hypervisor call) instruction may be executed in kernel mode of the REE system to enter the HYP mode of the REE system, and an ERET instruction may be executed in HYP mode of the REE system to further return from the HYP mode to the kernel mode of the REE system.

A layer-2 memory address translation (Stage-2 translation) memory virtualization technology is introduced in ARM. By using this technology, layer-1 memory address translation from a virtual address to a physical address (VA→PA) is transformed into the following process: first, address translation from the virtual address to an intermediate address (VA→IPA), and then address translation from the intermediate address to the physical address (IPA→PA). In other words, two-layer address transmission VA→IPA→PA is performed. The process of layer-2 memory address translation (IPA→PA) is completely controlled by the hypervisor and is transparent to the operating system. Further, for the operating system, IPA is the "physical address" used by the hypervisor.

A layer-2 address translation page table descriptor (page table descriptor) may also be set; and an attribute of a monitor bit may be accessed by using the layer-2 address translation page table descriptor, so that the hypervisor further performs access control on memory access of the operating system. The layer-2 address translation page table descriptor includes a read (R) control bit, a write (W) control bit, and an execution (X) control bit. The read/write control bit is related to data protection of the memory, and the execution control bit is related to memory code execution. By configuring the read control bit, the write control bit, and the execution control bit, the hypervisor is enabled to monitor physical memory access at a page granularity and further protect sensitive information.

To enable a device to support the TEE system, a chip and a chip technology for supporting the TEE have been developed and applied. Further, fingerprint recognition, face recognition, key and certificate management, integrity protection of kernel code segments and key data on the REE side, and the like may be completed under protection of the TEE system. In addition, in terms of the hardware virtualization technology, the hypervisor can be for defending a mobile phone against a root attack and a kernel code tampering attack, and the hypervisor can be for protecting the kernel in real time.

In an example, in a payment scenario, the mobile terminal device may generate a two-dimensional code by using the TEE. An application program of the mobile terminal device runs on the REE side of the mobile terminal device. When the application program of the mobile terminal device needs to draw the two-dimensional code, the application program of the mobile terminal device sends a secure monitor call (SMC) instruction to the kernel of the mobile terminal device by using a communications interface between the REE and the TEE, where the SMC instruction is for requesting the TEE to draw the two-dimensional code. The TEE of the mobile terminal device draws and displays the two-dimensional code.

However, in the process of the foregoing example, a malicious device or a malicious application program can still attack the process of generating the two-dimensional code. When the application program of the mobile terminal device sends the SMC instruction to the kernel of the mobile terminal device by using the communications interface between the REE and the TEE, the malicious application program may initiate a denial of service (DoS) attack, and further, the malicious application program rejects the SMC request by using the DoS. In addition, the malicious application program generates a malicious two-dimensional code, and replaces the normal two-dimensional code with the malicious two-dimensional code. For example, the malicious application program generates a fake two-dimensional code interface and replaces a normal two-dimensional code interface with the fake two-dimensional code interface. Further, in a manner of generating the two-dimensional code on only the TEE side, the mobile terminal device may still receive an attack of a malicious device or a malicious application program, it still cannot be ensured that the two-dimensional code is not maliciously replaced, and there is a possibility that property of the user is stolen.

Figure 12:
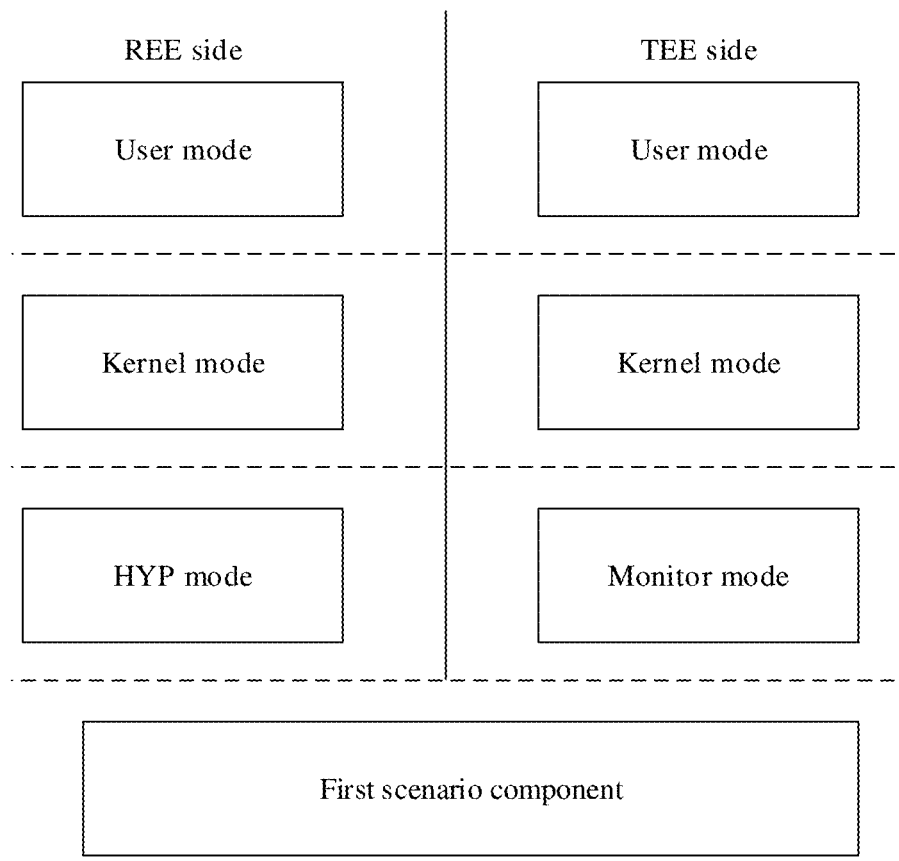
FIG. 12 is a schematic diagram of system deployment of a first electronic device according to an embodiment.

In this embodiment, an REE system and a TEE system may be deployed in the system of the first electronic device. FIG. 12 is a schematic diagram of system deployment of the first electronic device according to this embodiment. As shown in FIG. 12, the REE system and the TEE system are deployed in the first electronic device. An REE side of the first electronic device includes the following architectural layers: a user mode (USR), a kernel mode (SVC), and a hypervisor mode (HYP). A TEE side of the first electronic device includes the following architectural layers: a user mode (USR), a kernel mode (SVC), and a monitor mode (MON).

The second electronic device may complete each step by using the REE system, or the second electronic device may complete each step by using the TEE system, or the second electronic device may complete each step by using another operating system. An architecture and a system on which the second electronic device is based are not limited in this embodiment.

Referring to step 101 in FIG. 4, the second electronic device may obtain second scenario information related to the second electronic device. The second electronic device generates and displays the two-dimensional code information based on the second scenario information and two-dimensional code data.

An application program that needs to scan and process a two-dimensional code may run on the REE side of the first electronic device. In an example, the application program runs in user mode on the REE side of the first electronic device. Therefore, the first electronic device scans, on the REE side, the two-dimensional code information displayed by the second electronic device.

In an example, the user triggers the first electronic device to perform a scanning action. The REE of the first electronic device sends a scanning instruction to a camera of the first electronic device, and the first electronic device further scans, by using the camera, the two-dimensional code information carrying the second scenario information.

502. Determine the two-dimensional code data and the second scenario information based on the two-dimensional code information, where the second scenario information is the scenario information related to the second electronic device.

In an example, step 502 includes: decrypting the two-dimensional code information to obtain the two-dimensional code data and the second scenario information.

For example, the first electronic device decrypts and parses the two-dimensional code information on the REE side to obtain the two-dimensional code data and the second scenario information, where the second scenario information is the scenario information related to the second electronic device.

In an example, before step 504, step 503 may be included.

503. Perform signature processing on the second scenario information by using a public key, to obtain signed second scenario information.

For example, to ensure that the obtained second scenario information is not attacked or tampered with by a malicious application program in the first electronic device, the REE of the first electronic device performs signature processing on the second scenario information by using the public key, to obtain the signed second scenario information.

504. Send a second request message to the TEE based on the REE, where the second request message is for indicating to generate first scenario information, and the first scenario information is scenario information related to the first electronic device.

In an example, the second request message includes the second scenario information, or the second request information is used to indicate the second scenario information.

For example, the REE of the first electronic device triggers an SMC instruction to enter the TEE of the first electronic device. Then the REE of the first electronic device requests the first scenario information of the first electronic device from the TEE of the first electronic device based on the second scenario information.

The REE of the first electronic device sends the second request message to the TEE of the first electronic device, where the second request message is used to indicate that the first scenario information related to the first electronic device needs to be obtained.

In an example, the TEE of the first electronic device further needs to verify the second scenario information related to the second electronic device; therefore, the REE of the first electronic device needs to send the second scenario information to the TEE of the first electronic device.

In an example, the REE of the first electronic device directly sends the signed second scenario information to a trusted application (TA) of the TEE of the first electronic device.

In an example, the REE of the first electronic device places the signed second scenario information into the second request message, and the REE of the first electronic device sends the second request message to the TA of the TEE of the first electronic device.

In an example, the second request message may indicate the signed second scenario information, and the REE of the first electronic device sends the second request message to the TA of the TEE of the first electronic device.

505. Receive, based on the REE, a return message returned by the TEE, where the return message is used to indicate the first scenario information, and the first scenario information is obtained by the TEE from the first scenario component.

In an example, the return message is a verification result; and step 505 includes: receiving, based on the REE, a verification result returned by the TEE, where the verification result is generated after the TEE compares the first scenario information with the second scenario information, and the verification result represents that the first scenario information and the second scenario information meet a preset condition.

In an example, the first scenario information is obtained after the TEE determines that the signed second scenario information is successfully verified by using a private key.

In an example, the first scenario information is obtained after the TEE sets the first scenario component to a preset configuration, and the preset configuration represents that the first scenario information can be obtained only by the TEE.

In an example, the first scenario information includes at least one of the following: GPS information, Wi-Fi information, Bluetooth information, and natural environment information; and the second scenario information includes at least one of the following: GPS information, Wi-Fi information, Bluetooth information, and natural environment information.

In an example, when the first scenario information is the GPS information, and the second scenario information is the GPS information, the preset condition is that both the first scenario information and the second scenario information fall within a preset geographical range;

when the first scenario information is the Wi-Fi information, and the second scenario information is the Wi-Fi information, the preset condition is that a Wi-Fi identifier represented by the second scenario information exists in a Wi-Fi list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

For example, after the TA of the TEE of the first electronic device obtains the signed second scenario information based on the second request message, a source of the information needs to be verified. The TA of the TEE of the first electronic device performs signature verification on the signed second scenario information by using the private key corresponding to the public key. In addition, the TEE of the first electronic device needs to obtain the first scenario information detected by the first scenario component.

In an example, after the TA of the TEE of the first electronic device determines that the signed second scenario information is successfully verified, the TA of the TEE of the first electronic device sends an obtaining request to a kernel of the TEE, where the obtaining request is for indicating to generate the first scenario information.

In an example, when verifying the signed second scenario information successfully, the TA of the TEE of the first electronic device sends an obtaining request to the kernel of the TEE, where the obtaining request is for indicating to generate the first scenario information.

In an example, the first scenario component in the first electronic device may collect the first scenario information. Before the kernel of the TEE of the first electronic device reads the first scenario information, the TEE of the first electronic device needs to configure the first scenario component as readable only by the TEE. This is because the first scenario component can be read by the REE and the TEE of the first electronic device. However, the REE is a normal world. If the REE reads information detected by the first scenario component, a case in which the REE is maliciously attacked may occur, and as a result, the first scenario information read by the REE is maliciously tampered with. The TEE is a secure world, and the first scenario component needs to be configured as readable only by the TEE. In this case, when the TEE reads information detected by the first scenario component, a case in which the TEE is maliciously attacked occurs. Because the first scenario information read by the TEE is not maliciously tampered with, accuracy and security of the first scenario information are ensured. In this case, the kernel of the TEE of the first electronic device sets the first scenario component to a preset configuration, and the preset configuration represents that the first scenario information detected by the first scenario component can be obtained only by the TEE of the first electronic device.

The kernel of the TEE of the first electronic device reads the first scenario information detected by the first scenario component.

The kernel of the TEE of the first electronic device sends the first scenario information to the TA of the TEE of the first electronic device.

Then the TA of the TEE of the first electronic device verifies the first scenario information and the second scenario information based on the preset condition to generate a verification result. When the first scenario information and the second scenario information meet the preset condition, the verification result represents that the first scenario information and the second scenario information meet the preset condition, that is, the second scenario information is successfully verified; or when the first scenario information and the second scenario information do not meet the preset condition, the verification result represents that the first scenario information and the second scenario information do not meet the preset condition, that is, the second scenario information fails to be verified.

In an example, the scenario information is GPS information, that is, the first scenario information is a location of the first electronic device, and the second scenario information is a location of the second electronic device. The TEE of the first electronic device may determine whether the location represented by the first scenario information and the location represented by the second scenario information fall within a same preset geographical range; and if yes, the TEE of the first electronic device determines that the second scenario information is successfully verified; or if no, the TEE of the first electronic device determines that the second scenario information fails to be verified.

In an example, the scenario information is Wi-Fi information, that is, the first scenario information is information about a wireless local area network to which the first electronic device is connected, and the second scenario information is information about a wireless local area network to which the second electronic device is connected. The TEE of the first electronic device may determine whether the wireless local area network represented by the first scenario information and the wireless local area network represented by the second scenario information fall within a same network range; and if yes, the TEE of the first electronic device determines that the second scenario information is successfully verified; or if no, the TEE of the first electronic device determines that the second scenario information fails to be verified.

In an example, the scenario information is Wi-Fi information, that is, the first scenario information is information about a wireless local area network to which the first electronic device is connected, and the second scenario information is a wireless local area network list in the second electronic device. The TEE of the first electronic device may determine whether the wireless local area network represented by the second scenario information exists in the wireless local area network list represented by the first scenario information; and if yes, the TEE of the first electronic device determines that the second scenario information is successfully verified; or if no, the TEE of the first electronic device determines that the second scenario information fails to be verified.

In an example, the scenario information is Bluetooth information, that is, the first scenario information is information about Bluetooth to which the first electronic device is connected, and the second scenario information is a Bluetooth list in the second electronic device. The TEE of the first electronic device may determine whether the Bluetooth represented by the second scenario information exists in the Bluetooth list represented by the first scenario information; and if yes, the TEE of the first electronic device determines that the second scenario information is successfully verified; or if no, the TEE of the first electronic device determines that the second scenario information fails to be verified.

In an example, the scenario information is natural environment information, that is, the first scenario information is environment information of an environment in which the first electronic device is located, and the second scenario information is environment information of an environment in which the second electronic device is located. The TEE of the first electronic device may determine whether the environment information represented by the first scenario information and the environment information represented by the second scenario information fall within a same range; and if yes, the TEE of the first electronic device determines that the second scenario information is successfully verified; or if no, the TEE of the first electronic device determines that the second scenario information fails to be verified. The natural environment information includes but is not limited to the following information: illumination information, noise information, temperature information, and humidity information.

The TA of the TEE of the first electronic device sends the verification result to the REE of the first electronic device by using the system kernel.

The REE of the first electronic device receives the verification result sent by the TA of the TEE of the first electronic device.

506. When determining that the first scenario information and the second scenario information meet the preset condition, perform preset processing on the two-dimensional code data.

For example, when the REE of the first electronic device determines that the verification result represents that the first scenario information and the second scenario information meet the preset condition, the REE of the first electronic device may perform preset processing on the two-dimensional code data.

Figure 13:
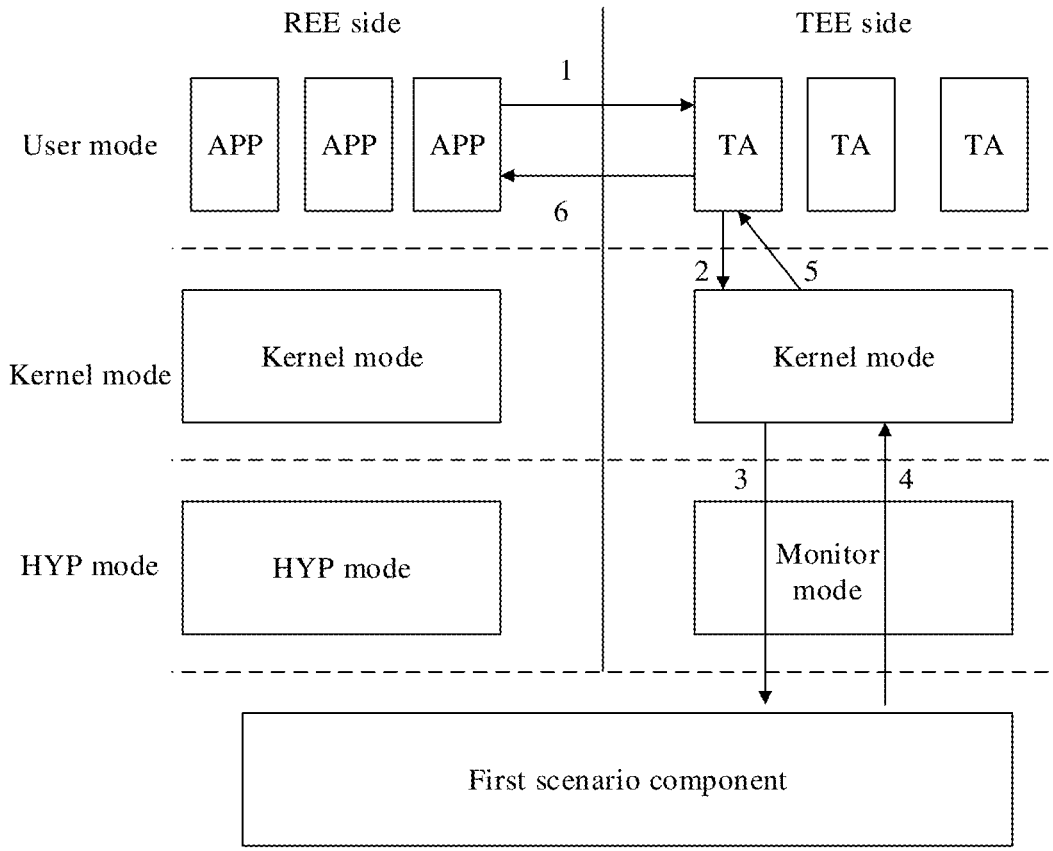
FIG. 13 is a diagram of interaction between an REE and a TEE of a first electronic device according to an embodiment.

In an example, FIG. 13 is a diagram of interaction between an REE and a TEE of a first electronic device according to an embodiment. As shown in FIG. 13, in user mode on an REE side of the first electronic device, a plurality of application programs (APP) run. An application program scans two-dimensional code information displayed by a second electronic device; the REE decrypts the two-dimensional code information to obtain two-dimensional code data and second scenario information; and the REE performs signature processing on the second scenario information by using a public key, to obtain signed second scenario information. Then in step 1, the REE triggers an SMC instruction to enter the TEE and sends the signed second scenario information to a TA of the TEE. In step 2, the TA of the TEE verifies the signed second scenario information by using a private key; and after the TA of the TEE determines that the signed second scenario information is successfully verified, the TA of the TEE sends an obtaining request to a kernel of the TEE, where the obtaining request is for indicating to generate first scenario information. In step 3, the kernel of the TEE sets the first scenario information in the first electronic device to a preset configuration, where the preset configuration represents that the first scenario information can be obtained only by the kernel of the TEE. In step 4, the kernel of the TEE reads the first scenario information. In step 5, the kernel of the TEE sends the first scenario information to the TA of the TEE. In step 6, the TA of the TEE verifies the determined first scenario information and the determined second scenario information based on a preset condition, and generates a verification result; and the TA of the TEE sends the verification result to the REE by using the system kernel, where the verification result represents that the second scenario information is successfully verified, or the verification result represents that the second scenario information fails to be verified.

In this embodiment, the REE of the first electronic device obtains the two-dimensional code information displayed by the second electronic device; the REE of the first electronic device determines, based on the two-dimensional code information, the two-dimensional code data and the second scenario information related to the second electronic device; the REE of the first electronic device sends the second request message to the TEE of the first electronic device, where the second request message is for indicating to generate the first scenario information related to the first electronic device, and the second request message may include or indicate the second scenario information; the TEE of the first electronic device obtains the first scenario information, and the TEE of the first electronic device verifies the first scenario information and the second scenario information; and the TEE of the first electronic device sends the verification result to the REE of the first electronic device. Further, the REE of the first electronic device instructs the TEE of the first electronic device to read the first scenario information related to the first electronic device. The TEE of the first electronic device may set the first scenario component as readable only by the TEE, thereby ensuring that the first scenario information detected by the first electronic device is not tampered with by a malicious application program in the REE and ensuring security of the first scenario information. Because the TEE is a secure world, the TEE of the first electronic device verifies the first scenario information and the second scenario information, to ensure validity and accuracy of the verification result, and ensure that the first scenario information and the second scenario information are not tampered with. Further, the TEE of the first electronic device sends the accurate verification result to the REE of the first electronic device. After determining that the verification result represents that the second scenario information is successfully verified, the REE of the first electronic device performs preset processing, for example, payment or deduction processing, on the two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of the user is ensured. In addition, because of security of the TEE, the process of obtaining and verifying the scenario information is not maliciously attacked, it is further ensured that verification of the two-dimensional code is effectively completed, and a malicious two-dimensional code is effectively identified.

Figure 14:
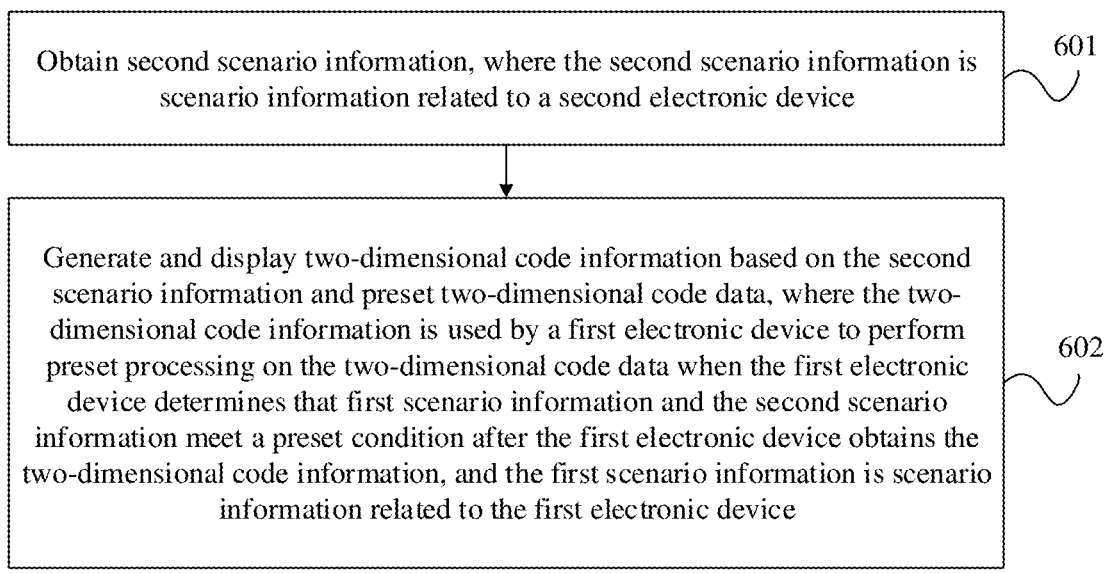
FIG. 14 is a schematic flowchart of a still further two-dimensional code processing method according to an embodiment.

FIG. 14 is a schematic flowchart of a still further two-dimensional code processing method according to an embodiment. In the embodiment shown in FIG. 14, the method is applied to a second electronic device, and the method includes the following steps.

601. Obtain second scenario information, where the second scenario information is scenario information related to the second electronic device.

For example, the second electronic device may be a mobile terminal device, may be a terminal device having a POS function, or may be a cloud gate machine. Alternatively, the second electronic device may be another apparatus or device that can perform the solution in this embodiment.

In this embodiment, a first electronic device may complete each step by using an REE system, or a first electronic device may complete each step by using a TEE system, or a first electronic device may complete each step by using another operating system. An architecture and a system on which the first electronic device is based are not limited in this embodiment.

The second electronic device may complete each step by using an REE system, or the second electronic device may complete each step by using a TEE system, or the second electronic device may complete each step by using another operating system. An architecture and a system on which the second electronic device is based are not limited in this embodiment.

The first electronic device and the second electronic device may interact within a short range. After the second electronic device receives a trigger instruction, the second electronic device determines that a two-dimensional code needs to be generated and displayed. The two-dimensional code displayed by the second electronic device is referred to as two-dimensional code information; and the two-dimensional code information is a black and white interface or a color interface.

The second electronic device may obtain the scenario information related to the second electronic device, where the scenario information related to the second electronic device is referred to as the second scenario information.

In an example, the second scenario information includes but is not limited to the following information: GPS information of the second electronic device, Bluetooth information of the second electronic device, Wi-Fi information of the second electronic device, and information about a natural environment in which the second electronic device is located. The Bluetooth information of the second electronic device is Bluetooth information of a Bluetooth connection sent by the second electronic device. The Wi-Fi information of the second electronic device is information about a wireless local area network to which the second electronic device is connected. The information about the natural environment in which the second electronic device is located includes but is not limited to the following information: ambient noise information, ambient illumination information, ambient humidity information, and ambient temperature information.

602. Generate and display the two-dimensional code information based on the second scenario information and preset two-dimensional code data, where the two-dimensional code information is used by the first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

In an example, the first scenario information includes at least one of the following: GPS information, Wi-Fi information, Bluetooth information, and natural environment information; and the second scenario information includes at least one of the following: GPS information, Wi-Fi information, Bluetooth information, and natural environment information.

In an example, when the first scenario information is the GPS information, and the second scenario information is the GPS information, the preset condition is that both the first scenario information and the second scenario information fall within a preset geographical range;

when the first scenario information is the Wi-Fi information, and the second scenario information is the Wi-Fi information, the preset condition is that a Wi-Fi identifier represented by the second scenario information exists in a Wi-Fi list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

For example, the second electronic device obtains the two-dimensional code data. The two-dimensional code data represents user information of a user corresponding to the second electronic device. Then the second electronic device generates the two-dimensional code information based on the second scenario information and the two-dimensional code data. Therefore, the two-dimensional code information carries the two-dimensional code data and the scenario information related to the second electronic device.

In an example, the second electronic device may generate the two-dimensional code information based on prestored two-dimensional code data and the obtained second scenario information.

In an example, the second electronic device may obtain the two-dimensional code data from a network device, and then generate the two-dimensional code information based on the two-dimensional code data and the obtained second scenario information.

In an example, in a payment scenario, the two-dimensional code data includes but is not limited to user information of a user as a payee. Alternatively, in a payment scenario, the two-dimensional code data includes but is not limited to user information of a user as a payer. In a contact-adding scenario, the two-dimensional code data includes but is not limited to user information and a user identity.

The second electronic device displays the two-dimensional code information, and then the first electronic device may scan the two-dimensional code displayed by the second electronic device.

Because the second scenario information is added to the two-dimensional code information generated by the second electronic device, after parsing the scanned two-dimensional code information, the first electronic device may obtain the two-dimensional code data and the second scenario information.

After the first electronic device obtains the two-dimensional code information, the first electronic device may further obtain the scenario information related to the first electronic device. The scenario information related to the first electronic device is referred to as the first scenario information.

In an example, the first scenario information includes but is not limited to the following information: GPS information of the first electronic device, Bluetooth information of the first electronic device, Wi-Fi information of the first electronic device, and information about a natural environment in which the first electronic device is located. The Bluetooth information of the first electronic device is Bluetooth information of a Bluetooth connection sent by the first electronic device. The Wi-Fi information of the first electronic device is information about a wireless local area network to which the first electronic device is connected. The information about the natural environment in which the first electronic device is located includes but is not limited to the following information: ambient noise information, ambient illumination information, ambient humidity information, and ambient temperature information.

Because the second scenario information is added to the two-dimensional code information generated by the second electronic device, after parsing the scanned two-dimensional code information, the first electronic device may obtain the two-dimensional code data and the second scenario information. The first electronic device may verify the first scenario information and the second scenario information, and further determine whether the first scenario information and the second scenario information meet the preset condition.

When determining that the first scenario information and the second scenario information meet the preset condition, the first electronic device may perform preset processing on the obtained two-dimensional code data. The preset processing includes but is not limited to: performing transfer processing on a payee represented by the two-dimensional code data, performing fee deduction processing on a payer represented by the two-dimensional code data, and sending a preset request to a user represented by the two-dimensional code data, where the preset request is, for example, a request for adding a contact. For an action of the first electronic device, refer to the foregoing embodiment. Details are not described again.

In this embodiment, the second electronic device obtains the second scenario information, where the second scenario information is the scenario information related to the second electronic device; and the second electronic device generates and displays the two-dimensional code information based on the second scenario information and the preset two-dimensional code data, where the two-dimensional code information is used by the first electronic device to perform preset processing on the two-dimensional code data when the first electronic device determines that the first scenario information and the second scenario information meet the preset condition after the first electronic device obtains the two-dimensional code information, and the first scenario information is the scenario information related to the first electronic device. When the second electronic device needs to generate the two-dimensional code, the second electronic device may obtain the second scenario information related to the second electronic device; the second electronic device adds the second scenario information to the two-dimensional code; and further, the two-dimensional code displayed by the second electronic device carries the second scenario information related to the second electronic device. The first electronic device scans the two-dimensional code to obtain the second scenario information; the first electronic device may further obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of the user is ensured.

Figure 15:
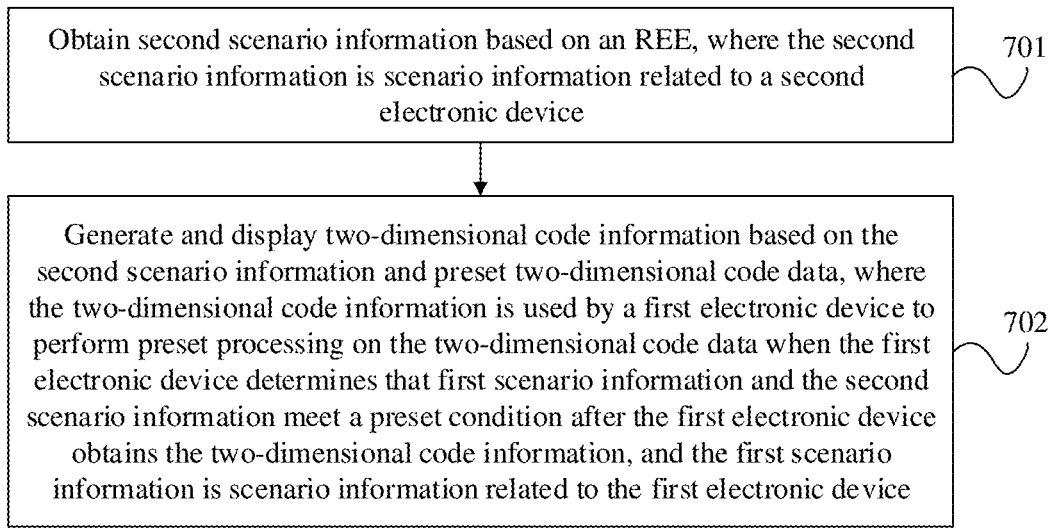
FIG. 15 is a schematic flowchart of a yet further two-dimensional code processing method according to an embodiment.

FIG. 15 is a schematic flowchart of a yet further two-dimensional code processing method according to an embodiment. In the embodiment shown in FIG. 15, the method is applied to a second electronic device, and an REE is deployed in a system of the second electronic device. The method includes the following steps.

701. Obtain second scenario information based on the REE, where the second scenario information is scenario information related to the second electronic device.

For example, the second electronic device may be a mobile terminal device, may be a terminal device having a POS function, or may be a cloud gate machine. Alternatively, the second electronic device may be another apparatus or device that can perform the solution in this embodiment.

In this embodiment, a first electronic device may complete each step by using an REE system, or a first electronic device may complete each step by using a TEE system, or a first electronic device may complete each step by using another operating system. An architecture and a system on which the first electronic device is based are not limited in this embodiment.

An REE system may be deployed in the system of the second electronic device. The REE system may include the following several running modes: a user mode, a kernel mode, and the like.

The REE system of the second electronic device may obtain the second scenario information in user mode or kernel mode. Alternatively, another operating system is configured in the second electronic device, and the REE system of the second electronic device interacts with the another operating system to further obtain the second scenario information.

The second scenario information is the scenario information related to the second electronic device.

For an action of the second electronic device, refer to step 601 shown in FIG. 14. Details are not described again.

702. Generate and display two-dimensional code information based on the second scenario information and preset two-dimensional code data, where the two-dimensional code information is used by the first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

For example, the second electronic device may generate and display the two-dimensional code information based on the REE system. For a specific process, refer to step 602 shown in FIG. 14. Details are not described again.

In this embodiment, the second electronic device may obtain, based on the REE, the second scenario information related to the second electronic device; the second electronic device adds the second scenario information to the two-dimensional code; and further, the two-dimensional code displayed by the second electronic device carries the second scenario information related to the second electronic device. The first electronic device scans the two-dimensional code to obtain the second scenario information; the first electronic device may further obtain the first scenario information related to the first electronic device; the first electronic device compares the first scenario information related to the first electronic device with the second scenario information related to the second electronic device, to determine whether the first scenario information matches the second scenario information; if it is determined that the first scenario information matches the second scenario information, the first electronic device may determine that the scanned two-dimensional code is generated by the second electronic device, and that the two-dimensional code is not sent by another malicious device; and then the first electronic device may process the scanned two-dimensional code. The two-dimensional code may be automatically verified based on the scenario information, the scenario information of the two electronic devices that need to perform two-dimensional code interaction is compared, and further, two-dimensional code verification is completed. In this way, it can be effectively ensured that the scanned two-dimensional code is not a malicious attack two-dimensional code, and a malicious two-dimensional code can be identified. Therefore, security of property of a user is ensured.

Figure 16:
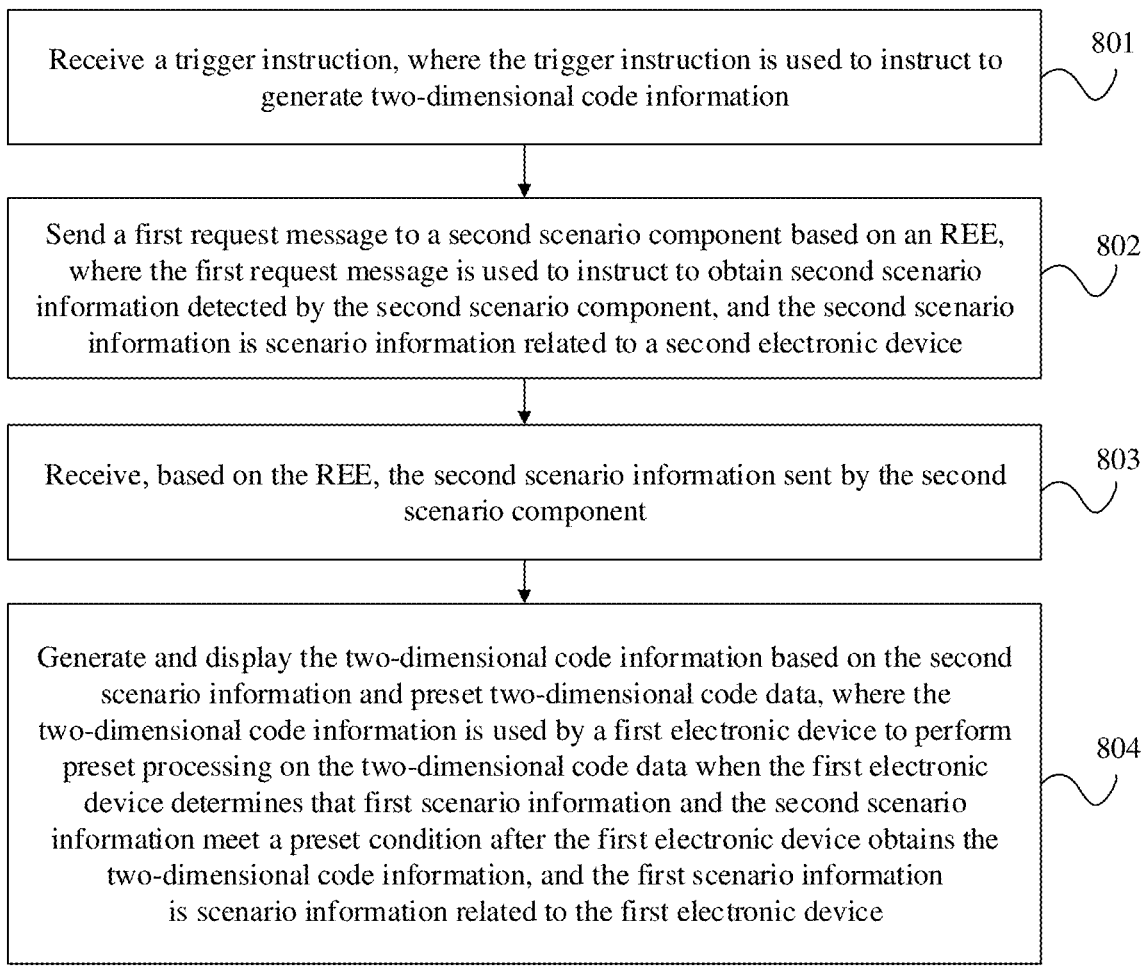
FIG. 16 is a schematic flowchart of a still yet further two-dimensional code processing method according to an embodiment.

FIG. 16 is a schematic flowchart of a still yet further two-dimensional code processing method according to an embodiment. In the embodiment shown in FIG. 16, the method is applied to a second electronic device, an REE is deployed in a system of the second electronic device, and a second scenario component is disposed in the second electronic device. The method includes the following steps.

801. Receive a trigger instruction, where the trigger instruction is for indicating to generate two-dimensional code information.

For example, the second electronic device may be a mobile terminal device, may be a terminal device having a POS function, or may be a cloud gate machine. Alternatively, the second electronic device may be another apparatus or device that can perform the solution in this embodiment.

In this embodiment, a first electronic device may complete each step by using an REE system, or a first electronic device may complete each step by using a TEE system, or a first electronic device may complete each step by using another operating system. An architecture and a system on which the first electronic device is based are not limited in this embodiment.

An REE system may be deployed in the system of the second electronic device. The REE system may include the following several running modes: a user mode, a kernel mode, and the like.

A user may send a trigger instruction to the second electronic device by touch, voice, gesture, or the like, where the trigger instruction is for indicating the second electronic device to generate the two-dimensional code information.

The REE of the second electronic device receives the trigger instruction in user mode or kernel mode.

802. Send a first request message to the second scenario component based on the REE, where the first request message is for indicating to generate second scenario information detected by the second scenario component, and the second scenario information is scenario information related to the second electronic device.

For example, the REE system of the second electronic device may obtain the second scenario information in user mode or kernel mode. The second scenario information is the scenario information related to the second electronic device.

The second scenario component may be configured in the second electronic device. For example, if the second scenario component is a GPS chip, the second scenario information is GPS information. If the second scenario component is a Wi-Fi module, the second scenario information is Wi-Fi information. If the second scenario component is a Bluetooth chip, the second scenario information is Bluetooth information. If the second scenario component is a temperature sensor, the second scenario information is ambient temperature information. If the second scenario component is a sound sensor, the second scenario information is ambient noise information. If the second scenario component is a photosensor, the second scenario information is ambient illumination information.

The REE system of the second electronic device may directly interact with the second scenario component, and the REE system of the second electronic device may obtain the second scenario information detected by the second scenario component.

Therefore, the REE system of the second electronic device may directly send an instruction to the second scenario component to obtain the second scenario information. In an example, the REE system of the second electronic device sends the first request message to the second scenario component; and then the second scenario component sends the second scenario information obtained through detection to the REE system of the second electronic device.

803. Receive, based on the REE, the second scenario information sent by the second scenario component.

For example, referring to step 802, the REE system of the second electronic device may receive the second scenario information returned by the second scenario component. Step 803 is performed after step 802.

804. Generate and display the two-dimensional code information based on the second scenario information and preset two-dimensional code data, where the two-dimensional code information is used by the first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

For example, the REE system of the second electronic device generates and displays the two-dimensional code information in user mode or kernel mode based on the second scenario information and the two-dimensional code data.

Then the first electronic device may scan the two-dimensional code information displayed by the second electronic device. For an action of the first electronic device, refer to step 602 shown in FIG. 14. Details are not described again.

In this embodiment, the second electronic device performs each step on an REE system side, that is, completes obtaining of the second scenario information in the REE, and generates a two-dimensional code carrying the second scenario information. Therefore, the first electronic device may automatically verify the two-dimensional code based on the scenario information, compare the scenario information of the two electronic devices that need to perform two-dimensional code interaction, and further complete two-dimensional code verification. In this way, it can be effectively ensured that the scanned two-dimensional code is not a malicious attack two-dimensional code, and a malicious two-dimensional code can be identified. Therefore, security of property of the user is ensured. The process is simple and fast.

Figure 17:
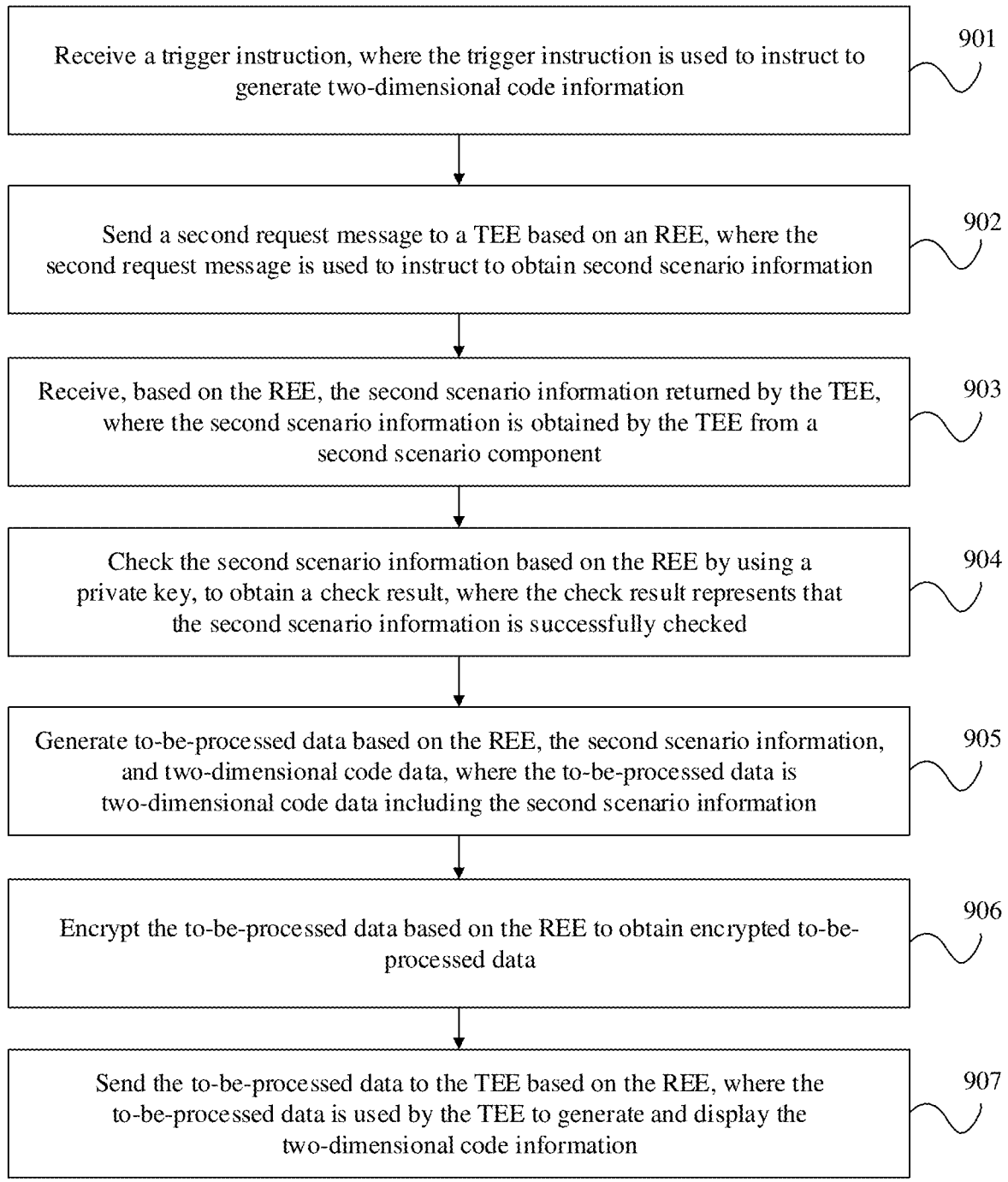
FIG. 17 is a schematic flowchart of an even yet another two-dimensional code processing method according to an embodiment.

FIG. 17 is a schematic flowchart of an even yet another two-dimensional code processing method according to an embodiment. In the embodiment shown in FIG. 17, the method is applied to a second electronic device, an REE and a TEE are deployed in a system of the second electronic device, and a second scenario component is disposed in the second electronic device. The method includes the following steps.

901. Receive a trigger instruction, where the trigger instruction is for indicating to generate two-dimensional code information.

For example, the second electronic device may be a mobile terminal device, may be a terminal device having a POS function, or may be a cloud gate machine. Alternatively, the second electronic device may be another apparatus or device that can perform the solution in this embodiment.

In this embodiment, a first electronic device may complete each step by using an REE system, or a first electronic device may complete each step by using a TEE system, or a first electronic device may complete each step by using another operating system. An architecture and a system on which the first electronic device is based are not limited in this embodiment.

Figure 18:
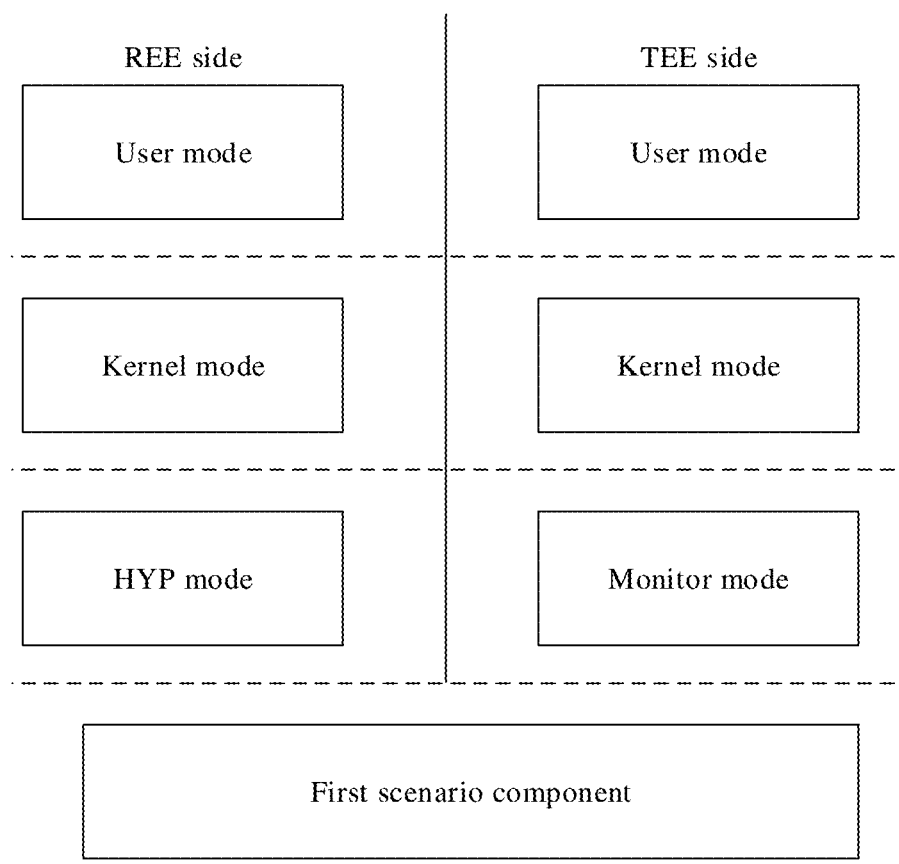
FIG. 18 is a schematic diagram of system deployment of a second electronic device according to an embodiment.

In this embodiment, an REE system and a TEE system may be deployed in the system of the second electronic device. FIG. 18 is a schematic diagram of system deployment of the second electronic device according to this embodiment. As shown in FIG. 18, the REE system and the TEE system are deployed in the second electronic device. An REE side of the second electronic device includes the following architectural layers: a user mode (USR), a kernel mode (SVC), and a hypervisor mode (HYP). A TEE side of the second electronic device includes the following architectural layers: a user mode (USR), a kernel mode (SVC), and a monitor mode (MON).

A plurality of application programs may run in user mode of the REE of the second electronic device. An application program may receive a trigger instruction sent by a user, where the trigger instruction is for indicating to generate the two-dimensional code information.

902. Send a second request message to the TEE based on the REE, where the second request message is for indicating to generate second scenario information.

In an example, the second request message is a trigger instruction detected based on the REE, or the second request message includes a trigger instruction, where the trigger instruction is for indicating to generate the two-dimensional code information.

For example, the application program of the REE of the second electronic device enters the TEE of the second electronic device by using an SMC instruction. The REE of the second electronic device sends the second request message to the TEE of the second electronic device, to request to obtain the second scenario information related to the second electronic device.

903. Receive, based on the REE, the second scenario information returned by the TEE, where the second scenario information is obtained by the TEE from the second scenario component.

In an example, the second scenario information is obtained after the TEE sets the second scenario component to a preset configuration, and the preset configuration represents that the second scenario information of the second scenario component can be obtained only by the TEE.

In an example, the second scenario information is scenario information on which the TEE performs signature processing by using a public key.

For example, the second scenario component is configured in the second electronic device, and the second scenario component may detect the current second scenario information of the second electronic device. The TEE of the second electronic device may read the second scenario information detected by the second scenario component.

In an example, a TA of the TEE of the second electronic device sends a request instruction to a kernel of the TEE, where the request instruction is for indicating to generate the second scenario information. The TA of the TEE of the second electronic device may obtain the second scenario information based on the kernel of the TEE.

In an example, the second scenario component in the second electronic device may collect the second scenario information. Before the kernel of the TEE of the second electronic device reads the second scenario information, the TEE of the second electronic device needs to configure the second scenario component as readable only by the TEE. This is because the second scenario component can be read by the REE and the TEE of the second electronic device. However, the REE is a normal world. If the REE reads information detected by the second scenario component, a case in which the REE is maliciously attacked may occur, and as a result, the second scenario information read by the REE is maliciously tampered with. The TEE is a secure world, and the second scenario component needs to be configured as readable only by the TEE. In this case, when the TEE reads information detected by the second scenario component, a case in which the TEE is maliciously attacked occurs. Because the second scenario information read by the TEE is not maliciously tampered with, accuracy and security of the second scenario information are ensured. In this case, the kernel of the TEE of the second electronic device sets the second scenario component to a preset configuration, and the preset configuration represents that the second scenario information detected by the second scenario component can be obtained only by the TEE of the second electronic device.

Further, in an example, the kernel of the TEE of the second electronic device sets the second scenario device as accessible only by the TEE, and the kernel of the TEE of the second electronic device reads the second scenario information detected by the second scenario component.

In addition, to ensure that the read second scenario information is not attacked or tampered with by a malicious application program in the second electronic device, the kernel of the TEE of the second electronic device may further perform signature processing on the second scenario information by using the public key, to obtain signed second scenario information. The kernel of the TEE of the second electronic device sends the signed second scenario information to the TA of the TEE of the second electronic device. The TA of the TEE of the second electronic device sends the signed second scenario information to the application program of the REE of the second electronic device by using a system kernel.

Further, the REE of the second electronic device receives the second scenario information sent by the TEE of the second electronic device.

904. Check the second scenario information based on the REE by using a private key, to obtain a check result, where the check result represents that the second scenario information is successfully checked.

For example, after receiving the second scenario information, the REE of the second electronic device needs to verify a source of the information. The REE of the second electronic device performs signature check on the signed second scenario information by using the private key corresponding to the public key, to obtain the check result.

905. Generate to-be-processed data based on the REE, the second scenario information, and two-dimensional code data, where the to-be-processed data is two-dimensional code data including the second scenario information.

For example, after the REE of the second electronic device determines that the check result represents that the second scenario information is successfully verified, the REE of the second electronic device generates the to-be-processed data based on the second scenario information and the two-dimensional code data, and further adds the second scenario information to the two-dimensional code data. In other words, the to-be-processed data is the two-dimensional code data including the second scenario information.

906. Encrypt the to-be-processed data based on the REE to obtain encrypted to-be-processed data.

For example, the REE of the second electronic device encrypts the to-be-processed data. In this embodiment, an encryption method is not limited.

907. Send the to-be-processed data to the TEE based on the REE, where the to-be-processed data is used by the TEE to generate and display the two-dimensional code information.

For example, the REE of the second electronic device sends the encrypted to-be-processed data to the TA of the TEE of the second electronic device through the system kernel by using an SMC instruction.

The TA of the TEE of the second electronic device decrypts the encrypted to-be-processed data. Then the TA of the TEE of the second electronic device draws, on a trusted user interface (TUI) on which the user interacts with the device, the two-dimensional code data that carries the second scenario information, to obtain the two-dimensional code information. The TEE of the second electronic device displays the two-dimensional code information, that is, the TEE of the second electronic device displays a two-dimensional code interface.

Then the first electronic device scans the two-dimensional code information displayed by the second electronic device, so that the first electronic device can parse out the second scenario information; the first electronic device obtains the first scenario information related to the first electronic device; and the first electronic device may verify the first scenario information and the second scenario information, to further determine whether the first scenario information and the second scenario information meet a preset condition. When determining that the first scenario information and the second scenario information meet the preset condition, the first electronic device may perform preset processing on the obtained two-dimensional code data.

For an action of the first electronic device, refer to the foregoing embodiment. Details are not described again.

Figure 19:
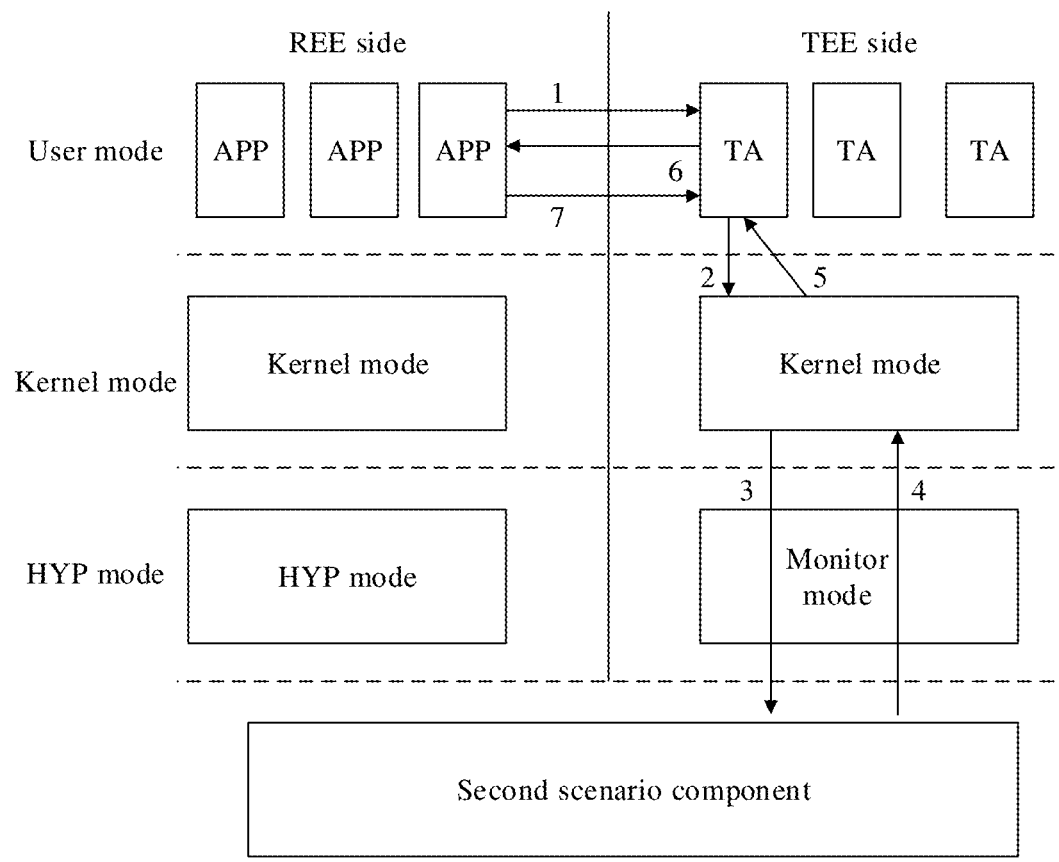
FIG. 19 is a diagram of interaction between an REE and a TEE of a second electronic device according to an embodiment.

In an example, FIG. 19 is a diagram of interaction between an REE and a TEE of a second electronic device according to an embodiment. As shown in FIG. 19, in user mode on an REE side of the second electronic device, a plurality of application programs (APP) run. An application program of the REE of the second electronic device receives a trigger instruction of a user, where the trigger instruction is for indicating to generate two-dimensional code information. Then in step 1, the application program of the REE of the second electronic device enters the TEE of the second electronic device by using an SMC instruction. In step 2, a TA of the TEE of the second electronic device sends a request instruction to a kernel of the TEE, where the request instruction is for indicating to generate second scenario information. In step 3, the kernel of the TEE of the second electronic device sets a second scenario component as accessible only by the TEE. In step 4, the kernel of the TEE of the second electronic device reads the second scenario information detected by the second scenario component. In step 5, the kernel of the TEE of the second electronic device signs the second scenario information by using a public key; and the kernel of the TEE of the second electronic device sends the signed second scenario information to the TA of the TEE. In step 6, the TA of the TEE of the second electronic device sends the signed second scenario information to the application program of the REE by using the system kernel. In step 7, the application program of the REE of the second electronic device verifies the signed second scenario information by using a private key; after determining that the second scenario information is successfully verified, the application program of the REE of the second electronic device generates to-be-processed data based on the second scenario information and two-dimensional code data, where the to-be-processed data is two-dimensional code data including the second scenario information; and the application program of the REE of the second electronic device encrypts the to-be-processed data, and sends the encrypted to-be-processed data to the TA of the TEE of the second electronic device by using the system kernel. Finally, the TA of the TEE of the second electronic device decrypts the encrypted to-be-processed data and draws and displays the two-dimensional code information on the TUI based on the to-be-processed data.

In this embodiment, the REE of the second electronic device sends the second request message to the TEE of the second electronic device, where the second request message is for indicating to generate the second scenario information; and the REE of the second electronic device receives the second scenario information returned by the TEE of the second electronic device, where the second scenario information is obtained by the TEE of the second electronic device from the second scenario component. Therefore, because the TEE is a secure world, the second scenario information obtained by the TEE of the second electronic device is relatively secure. Further, before the TEE of the second electronic device reads the second scenario information detected by the second scenario component, the TEE of the second electronic device sets the second scenario component as readable only by the TEE. Therefore, it is ensured that the second scenario information detected by the second electronic device is not tampered with by a malicious application program in the REE, and security of the second scenario information is ensured. The TEE of the second electronic device may further sign the second scenario information, to ensure that the second scenario information is not tampered with when the second scenario information is transferred to the REE of the second electronic device. The REE of the second electronic device generates, based on the second scenario information and the two-dimensional code data, the two-dimensional code data including the second scenario information; the REE of the second electronic device sends the two-dimensional code data including the second scenario information to the TEE of the second electronic device; and the TEE of the second electronic device draws and displays the two-dimensional code interface on the TUI. Because security of the TEE is very high, and the two-dimensional code interface is drawn and displayed in the TEE, it is further ensured that the second scenario information and the two-dimensional code data are not attacked or tampered with by a malicious device or a malicious application program, and security of the second scenario information and the two-dimensional code data is ensured.

Figure 20A:
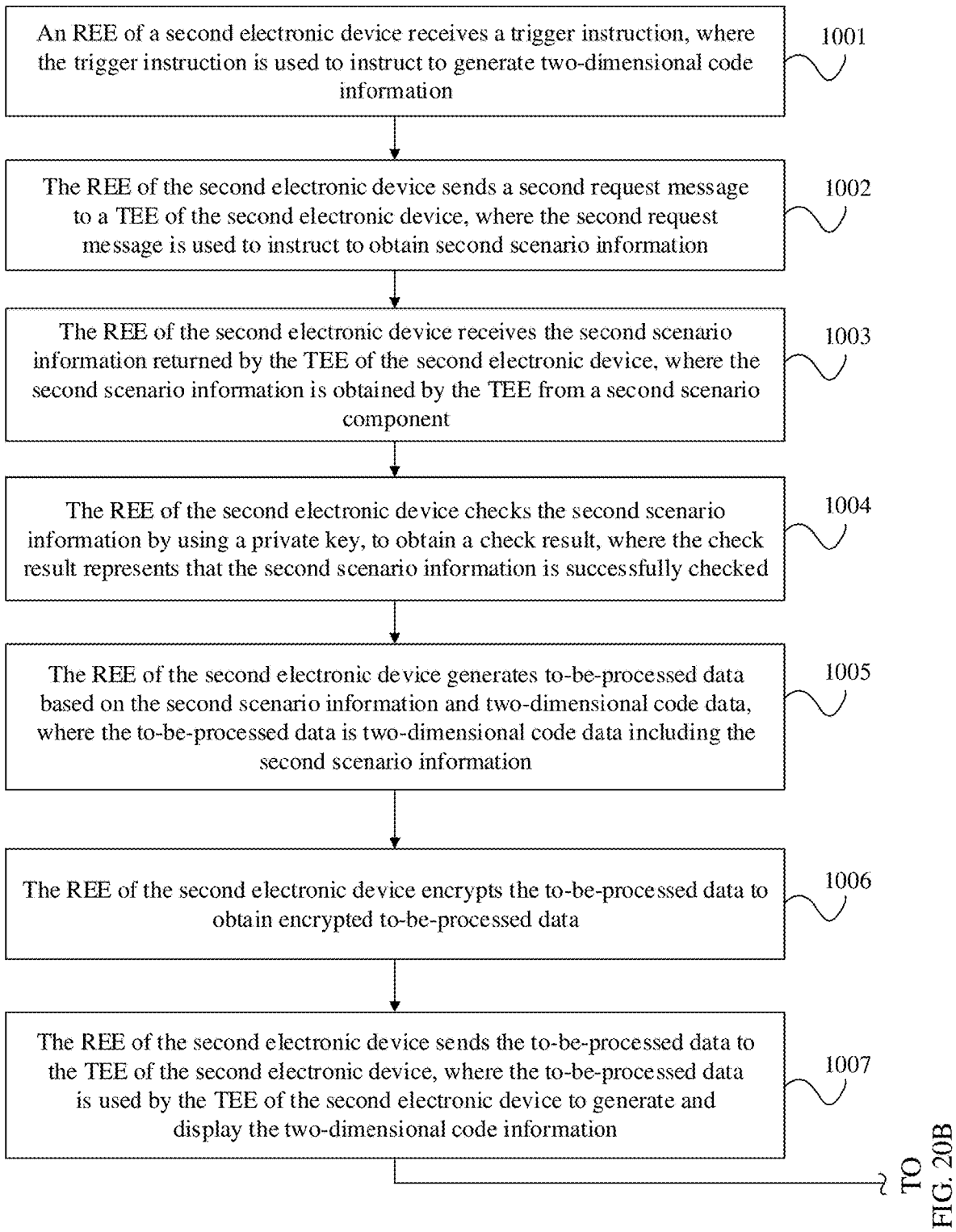
FIG. 20A and FIG. 20B are a schematic flowchart of another two-dimensional code processing method according to an embodiment.
Figure 20B:
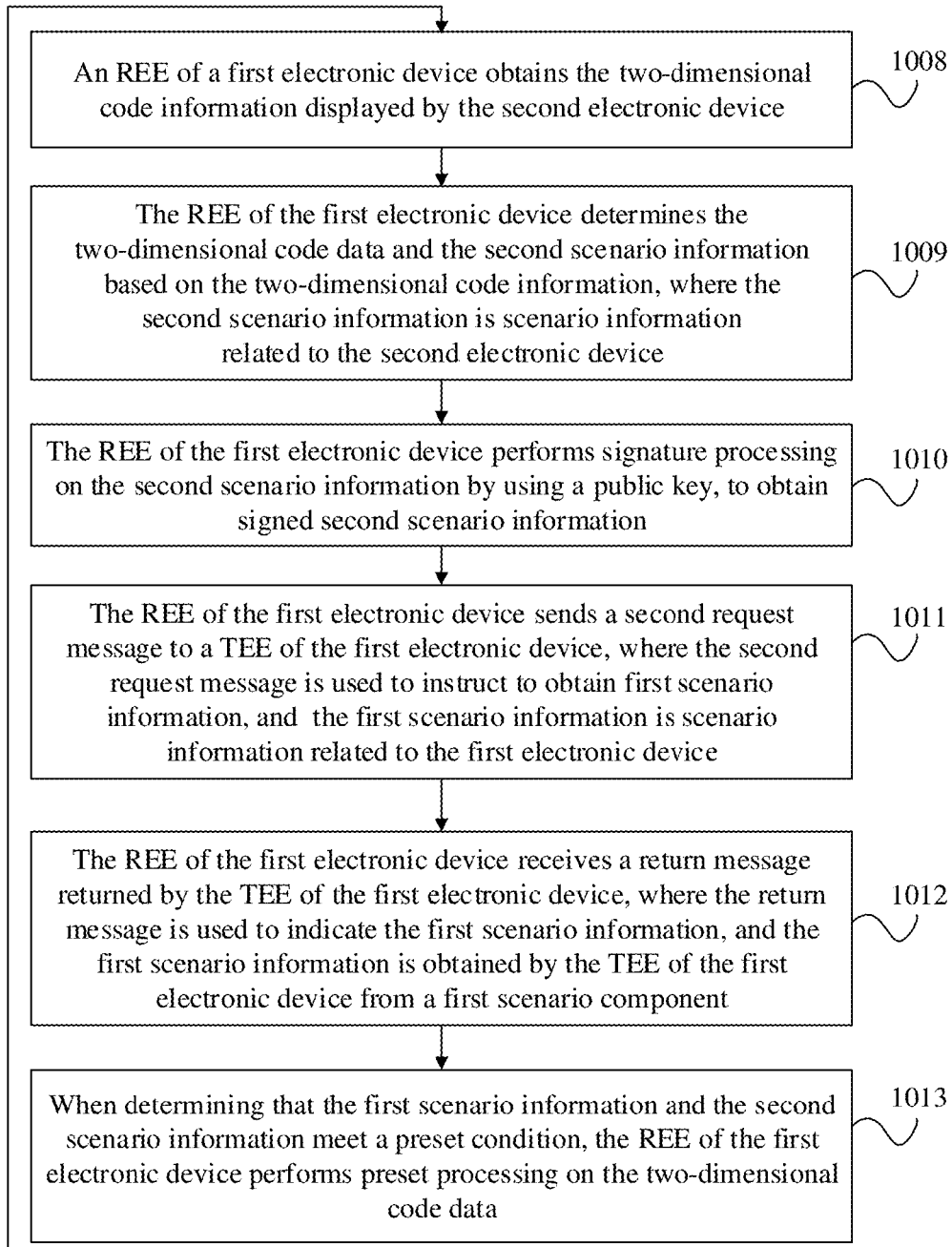

FIG. 20A and FIG. 20B are schematic flowcharts of another two-dimensional code processing method according to an embodiment. In the embodiment shown in FIG. 20A and FIG. 20B, the method includes the following steps.

1001. An REE of a second electronic device receives a trigger instruction, where the trigger instruction is for indicating to generate two-dimensional code information.

For example, the second electronic device may be a mobile terminal device, may be a terminal device having a POS function, or may be a cloud gate machine. Alternatively, the second electronic device may be another apparatus or device that can perform the solution in this embodiment.

An REE system and a TEE system may be deployed in a system of the second electronic device.

For this step, refer to step 901 shown in FIG. 17. Details are not described again.

1002. The REE of the second electronic device sends a second request message to a TEE of the second electronic device, where the second request message is for indicating to generate second scenario information.

In an example, the second request message is a trigger instruction detected based on the REE, or the second request message includes a trigger instruction, where the trigger instruction is for indicating to generate the two-dimensional code information.

For example, for this step, refer to step 902 shown in FIG. 17. Details are not described again.

1003. The REE of the second electronic device receives the second scenario information returned by the TEE of the second electronic device, where the second scenario information is obtained by the TEE from a second scenario component.

In an example, the second scenario information is obtained after the TEE sets the second scenario component to a preset configuration, and the preset configuration represents that the second scenario information of the second scenario component can be obtained only by the TEE.

In an example, the second scenario information is scenario information on which the TEE performs signature processing by using a public key.

For example, for this step, refer to step 903 shown in FIG. 17. Details are not described again.

1004. The REE of the second electronic device checks the second scenario information by using a private key, to obtain a check result, where the check result represents that the second scenario information is successfully checked.

For example, for this step, refer to step 904 shown in FIG. 17. Details are not described again.

1005. The REE of the second electronic device generates to-be-processed data based on the second scenario information and two-dimensional code data, where the to-be-processed data is two-dimensional code data including the second scenario information.

For example, for this step, refer to step 905 shown in FIG. 17. Details are not described again.

1006. The REE of the second electronic device encrypts the to-be-processed data to obtain encrypted to-be-processed data.

For example, for this step, refer to step 906 shown in FIG. 17. Details are not described again.

1007. The REE of the second electronic device sends the to-be-processed data to the TEE of the second electronic device, where the to-be-processed data is used by the TEE of the second electronic device to generate and display the two-dimensional code information.

For example, for this step, refer to step 907 shown in FIG. 17. Details are not described again.

1008. An REE of a first electronic device obtains the two-dimensional code information displayed by the second electronic device.

For example, the first electronic device may be a mobile terminal device, may be a terminal device having a POS function, or may be a cloud gate machine. Alternatively, the first electronic device may be another apparatus or device that can perform the solution in this embodiment.

An REE system and a TEE system may be deployed in a system of the first electronic device. For this step, refer to step 501 shown in FIG. 9. Details are not described again.

1009. The REE of the first electronic device determines the two-dimensional code data and the second scenario information based on the two-dimensional code information, where the second scenario information is scenario information related to the second electronic device.

For example, for this step, refer to step 502 shown in FIG. 9. Details are not described again.

1010. The REE of the first electronic device performs signature processing on the second scenario information by using a public key, to obtain signed second scenario information.

For example, for this step, refer to step 503 shown in FIG. 9. Details are not described again.

1011. The REE of the first electronic device sends a second request message to the TEE of the first electronic device, where the second request message is for indicating to generate first scenario information, and the first scenario information is scenario information related to the first electronic device.

In an example, the second request message includes the second scenario information, or the second request information is used to indicate the second scenario information.

For example, for this step, refer to step 504 shown in FIG. 9. Details are not described again.

1012. The REE of the first electronic device receives a return message returned by the TEE of the first electronic device, where the return message is used to indicate the first scenario information, and the first scenario information is obtained by the TEE of the first electronic device from a first scenario component.

In an example, the return message is a verification result; and step 1012 includes: receiving, based on the REE of the first electronic device, a verification result returned by the TEE of the first electronic device, where the verification result is generated after the TEE of the first electronic device compares the first scenario information with the second scenario information, and the verification result represents that the first scenario information and the second scenario information meet a preset condition.

In an example, the first scenario information is obtained after the TEE of the first electronic device determines that the signed second scenario information is successfully verified by using a private key.

In an example, the first scenario information is obtained after the TEE of the first electronic device sets the first scenario component to a preset configuration, and the preset configuration represents that the first scenario information can be obtained only by the TEE of the first electronic device.

For example, for this step, refer to step 505 shown in FIG. 9. Details are not described again.

1013. When determining that the first scenario information and the second scenario information meet the preset condition, the REE of the first electronic device performs preset processing on the two-dimensional code data.

For example, for this step, refer to step 506 shown in FIG. 9. Details are not described again.

The solution provided in this embodiment can defend against a collusion attack. The collusion attack means that a malicious application program is installed at both a two-dimensional code generation end and a two-dimensional code scanning end, and further, the malicious application program of the two-dimensional code generation end maliciously attacks a two-dimensional code generation process, and the malicious application program of the two-dimensional code scanning end maliciously attacks a two-dimensional code scanning process.

In an example, the malicious application program of the two-dimensional code generation end may generate a malicious two-dimensional code, and the malicious two-dimensional code includes two-dimensional code data of an attacker for receiving money and scenario information of the attacker. It should be noted that, when scenario information of the two-dimensional code generation end is obtained by a TEE of the two-dimensional code generation end, the malicious application program cannot forge correct scenario information of the two-dimensional code generation end, and further, the malicious application program cannot forge a two-dimensional code carrying the two-dimensional code data of the attacker and the correct scenario information of the two-dimensional code generation end. The malicious application program of the two-dimensional code generation end displays the malicious two-dimensional code. In addition, the malicious application program of the two-dimensional code generation end may send the scenario information of the attacker to the malicious application program of the two-dimensional code scanning end.

Then the malicious application program of the two-dimensional code scanning end may obtain the scenario information of the attacker in the malicious two-dimensional code. Further, the malicious application program of the two-dimensional code scanning end may maliciously tamper with scenario information of the two-dimensional code scanning end that is obtained by the two-dimensional code scanning end and may replace the scenario information of the two-dimensional code scanning end with the scenario information of the attacker. Further, a normal application program of the two-dimensional code scanning end obtains malicious scenario information, that is, the scenario information of the attacker. Therefore, after the two-dimensional code scanning end scans the malicious two-dimensional code displayed by the two-dimensional code generation end, because the malicious two-dimensional code includes the scenario information of the attacker, the normal application program of the two-dimensional code scanning end also obtains the malicious scenario information. Further, the normal application program of the two-dimensional code scanning end compares the obtained malicious scenario information with the malicious scenario information in the malicious two-dimensional code, and the two are consistent. Then the normal application program of the two-dimensional code scanning end processes the two-dimensional code data, for example, performs payment processing. It can be understood that the scenario information comparison is bypassed. The attacker can obtain property information of a user by attacking the process of two-dimensional code processing.

However, in the foregoing collusion attack process, firstly, the malicious application program needs to be installed at both the two-dimensional code generation end and the two-dimensional code scanning end; secondly, the malicious application program of the two-dimensional code generation end and the malicious application program of the two-dimensional code scanning end need to collude, that is, transfer messages, and the malicious application program of the two-dimensional code generation end needs to send the scenario information of the attacker to the malicious application program of the two-dimensional code scanning end. The malicious application program of the two-dimensional code scanning end further needs to have a permission to modify scenario information. Therefore, the collusion attack process is complex and is difficult to implement.

In this embodiment, the TEE of the second electronic device sets the second scenario component as readable only by the TEE, and the TEE of the second electronic device obtains the second scenario information related to the second electronic device. It is ensured that the second scenario information detected by the second electronic device is not tampered with by a malicious application program in the REE, and security of the second scenario information is ensured. The REE of the second electronic device generates, based on the second scenario information and the two-dimensional code data, the two-dimensional code data including the second scenario information; the REE of the second electronic device sends the two-dimensional code data including the second scenario information to the TEE of the second electronic device; and the TEE of the second electronic device draws and displays the two-dimensional code interface on a TUI. Because security of the TEE is very high, and the two-dimensional code interface is drawn and displayed in the TEE, it is further ensured that the second scenario information and the two-dimensional code data are not attacked or tampered with by a malicious device or a malicious application program, and security of the second scenario information and the two-dimensional code data is ensured. Then the REE of the first electronic device scans the two-dimensional code information displayed by the second electronic device; the TEE of the first electronic device sets the first scenario component as readable only by the TEE; and the TEE of the first electronic device obtains the first scenario information related to the first electronic device. Further, it is ensured that the first scenario information detected by the first electronic device is not tampered with by a malicious application program in the REE, and security of the first scenario information is ensured. The TEE of the first electronic device verifies the first scenario information and the second scenario information. Because the TEE is a secure world, it is ensured that the first scenario information and the second scenario information are not tampered with. After determining that the verification result represents that the second scenario information is successfully verified, the REE of the first electronic device performs preset processing on the two-dimensional code. The two-dimensional code may be automatically verified based on the scenario information, and it may be ensured, based on the scenario information, that the scanned two-dimensional code is not a malicious attack two-dimensional code, and a malicious two-dimensional code can be identified. Therefore, security of property of the user is ensured. In the manner provided in this embodiment, both the second electronic device serving as a two-dimensional code generation end and the first electronic device serving as a two-dimensional code scanning end use the TEE to obtain dynamic scenario data (respective scenario information) to ensure validity and security of the scenario information. This enhances security of the entire process, and effectively defends against a malicious collusion attack with a high permission.

Figure 21A:
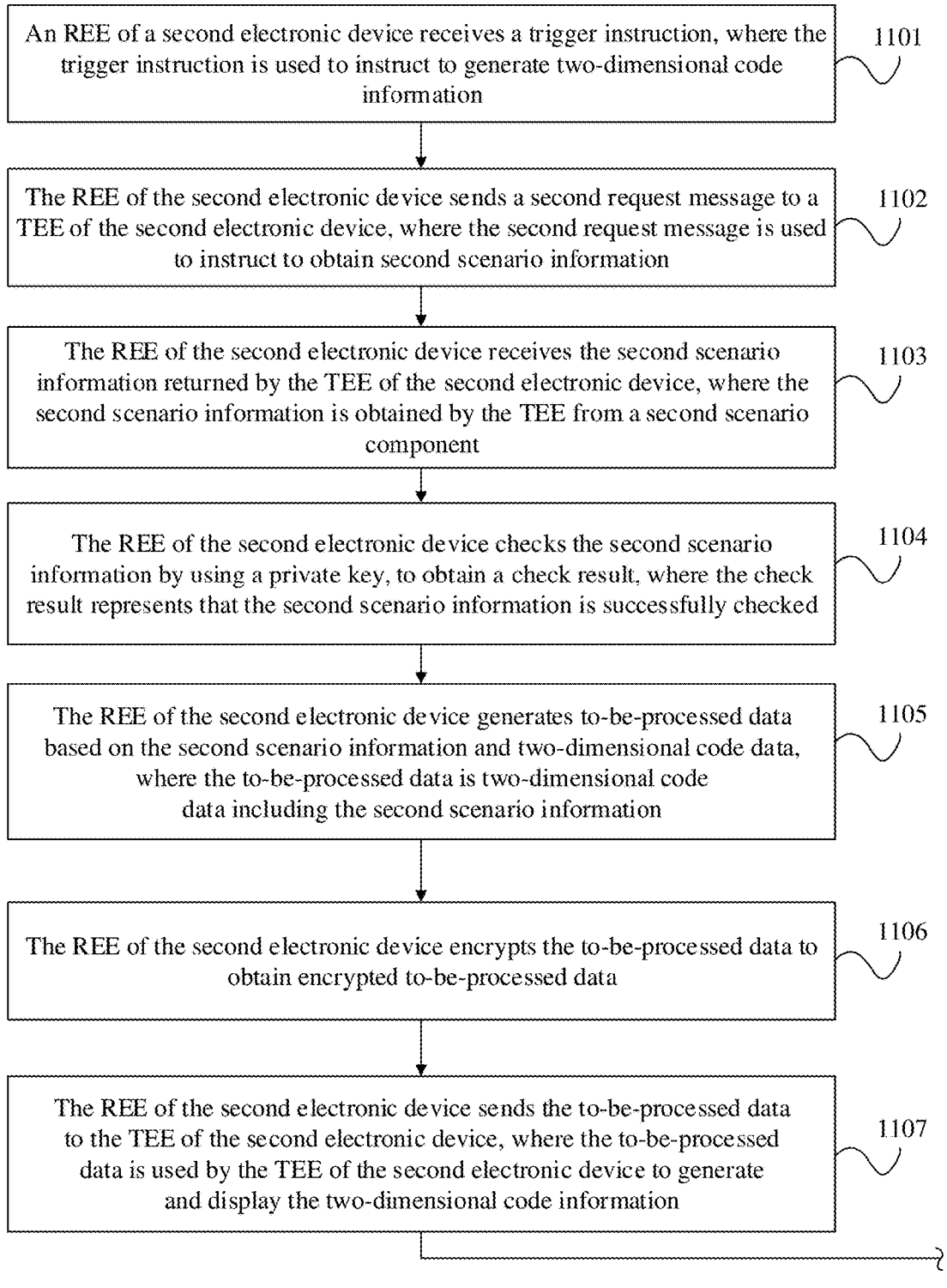
FIG. 21A and FIG. 21B are a schematic flowchart of yet another two-dimensional code processing method according to an embodiment.
Figure 21B:
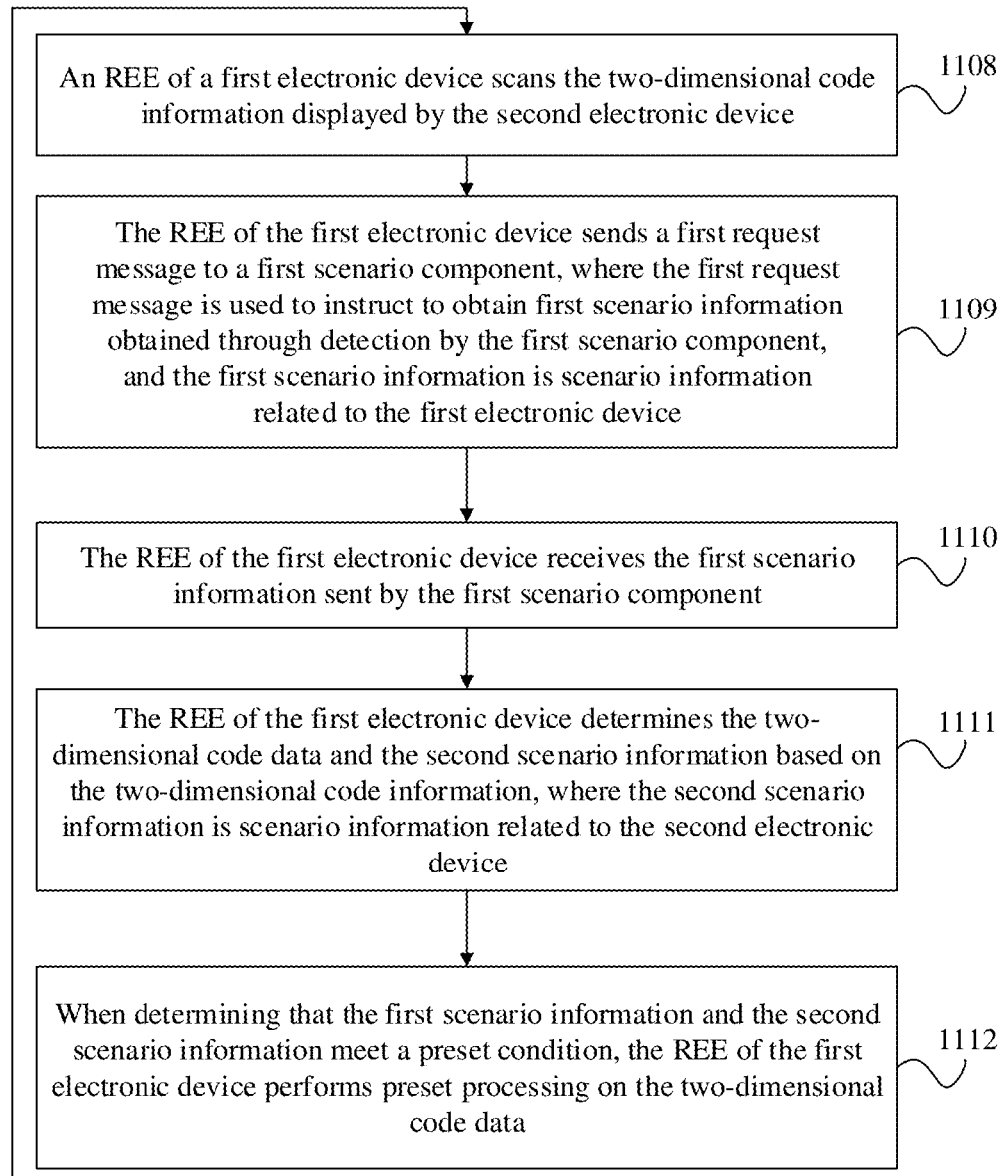

FIG. 21A and FIG. 21B are schematic flowcharts of yet another two-dimensional code processing method according to an embodiment. In the embodiment shown in FIG. 21A and FIG. 21B, the method includes the following steps.

1101. An REE of a second electronic device receives a trigger instruction, where the trigger instruction is for indicating to generate two-dimensional code information.

For example, the second electronic device may be a mobile terminal device, may be a terminal device having a POS function, or may be a cloud gate machine. Alternatively, the second electronic device may be another apparatus or device that can perform the solution in this embodiment.

An REE system and a TEE system may be deployed in a system of the second electronic device. A second scenario component is configured in the second electronic device.

For this step, refer to step 901 shown in FIG. 17. Details are not described again.

1102. The REE of the second electronic device sends a second request message to a TEE of the second electronic device, where the second request message is for indicating to generate second scenario information.

In an example, the second request message is a trigger instruction detected based on the REE, or the second request message includes a trigger instruction, where the trigger instruction is for indicating to generate the two-dimensional code information.

For example, for this step, refer to step 902 shown in FIG. 17. Details are not described again.

1103. The REE of the second electronic device receives the second scenario information returned by the TEE of the second electronic device, where the second scenario information is obtained by the TEE from the second scenario component.

In an example, the second scenario information is obtained after the TEE sets the second scenario component to a preset configuration, and the preset configuration represents that the second scenario information of the second scenario component can be obtained only by the TEE.

In an example, the second scenario information is scenario information on which the TEE performs signature processing by using a public key.

For example, for this step, refer to step 903 shown in FIG. 17. Details are not described again.

1104. The REE of the second electronic device checks the second scenario information by using a private key, to obtain a check result, where the check result represents that the second scenario information is successfully checked.

For example, for this step, refer to step 904 shown in FIG. 17. Details are not described again.

1105. The REE of the second electronic device generates to-be-processed data based on the second scenario information and two-dimensional code data, where the to-be-processed data is two-dimensional code data including second scenario information.

For example, for this step, refer to step 905 shown in FIG. 17. Details are not described again.

1106. The REE of the second electronic device encrypts the to-be-processed data to obtain encrypted to-be-processed data.

For example, for this step, refer to step 906 shown in FIG. 17. Details are not described again.

1107. The REE of the second electronic device sends the to-be-processed data to the TEE of the second electronic device, where the to-be-processed data is used by the TEE of the second electronic device to generate and display the two-dimensional code information.

For example, for this step, refer to step 907 shown in FIG. 17. Details are not described again.

1108. An REE of a first electronic device scans the two-dimensional code information displayed by the second electronic device.

For example, an REE system may be deployed in a system of the first electronic device; and a first scenario component is configured in the first electronic device.

For this step, refer to step 401 shown in FIG. 8. Details are not described again.

1109. The REE of the first electronic device sends a first request message to the first scenario component, where the first request message is for indicating to generate first scenario information obtained through detection by the first scenario component, and the first scenario information is scenario information related to the first electronic device.

For example, for this step, refer to step 402 shown in FIG. 8. Details are not described again.

1110. The REE of the first electronic device receives the first scenario information sent by the first scenario component.

For example, for this step, refer to step 403 shown in FIG. 8. Details are not described again.

1111. The REE of the first electronic device determines the two-dimensional code data and the second scenario information based on the two-dimensional code information, where the second scenario information is scenario information related to the second electronic device.

For example, for this step, refer to step 404 shown in FIG. 8. Details are not described again.

1112. When determining that the first scenario information and the second scenario information meet a preset condition, the REE of the first electronic device performs preset processing on the two-dimensional code data.

For example, for this step, refer to step 405 shown in FIG. 8. Details are not described again.

In this embodiment, the TEE of the second electronic device sets the second scenario component as readable only by the TEE, and the TEE of the second electronic device obtains the second scenario information related to the second electronic device. It is ensured that the second scenario information detected by the second electronic device is not tampered with by a malicious application program in the REE, and security of the second scenario information is ensuredREE. The REE of the second electronic device generates, based on the second scenario information and the two-dimensional code data, the two-dimensional code data including the second scenario information; the REE of the second electronic device sends the two-dimensional code data including the second scenario information to the TEE of the second electronic device; and the TEE of the second electronic device draws and displays the two-dimensional code interface on a TUI. Because security of the TEE is very high, and the two-dimensional code interface is drawn and displayed in the TEE, it is further ensured that the second scenario information and the two-dimensional code data are not attacked or tampered with by a malicious device or a malicious application program, and security of the second scenario information and the two-dimensional code data is ensured. Then the REE of the first electronic device scans the two-dimensional code information displayed by the second electronic device; the REE of the first electronic device obtains the first scenario information; and the REE of the first electronic device verifies the first scenario information and the second scenario information, and after the second scenario information is successfully verified, the REE of the first electronic device performs preset processing on the two-dimensional code. The two-dimensional code may be automatically verified based on the scenario information, and it may be ensured, based on the scenario information, that the scanned two-dimensional code is not a malicious attack two-dimensional code, and a malicious two-dimensional code can be identified. Therefore, security of property of a user is ensured. In the manner provided in this embodiment, the second electronic device serving as a two-dimensional code generation end obtains dynamic scenario data by using the TEE, and the first electronic device serving as a two-dimensional code scanning end obtains dynamic scenario data by using the REE. This process can defend against a malicious attack to some extent. In the solution in this embodiment, although the first electronic device serving as the two-dimensional code scanning end obtains the first scenario information and verifies the scenario information in the REE, a collusion attack requires the two-dimensional code generation end and the two-dimensional code scanning end to perform negotiation, collusion, message transfer, and the like. The process of the collusion attack is relatively complex. Therefore, the solution in this embodiment can defend against the malicious collusion attack to some extent.

Figure 22A:
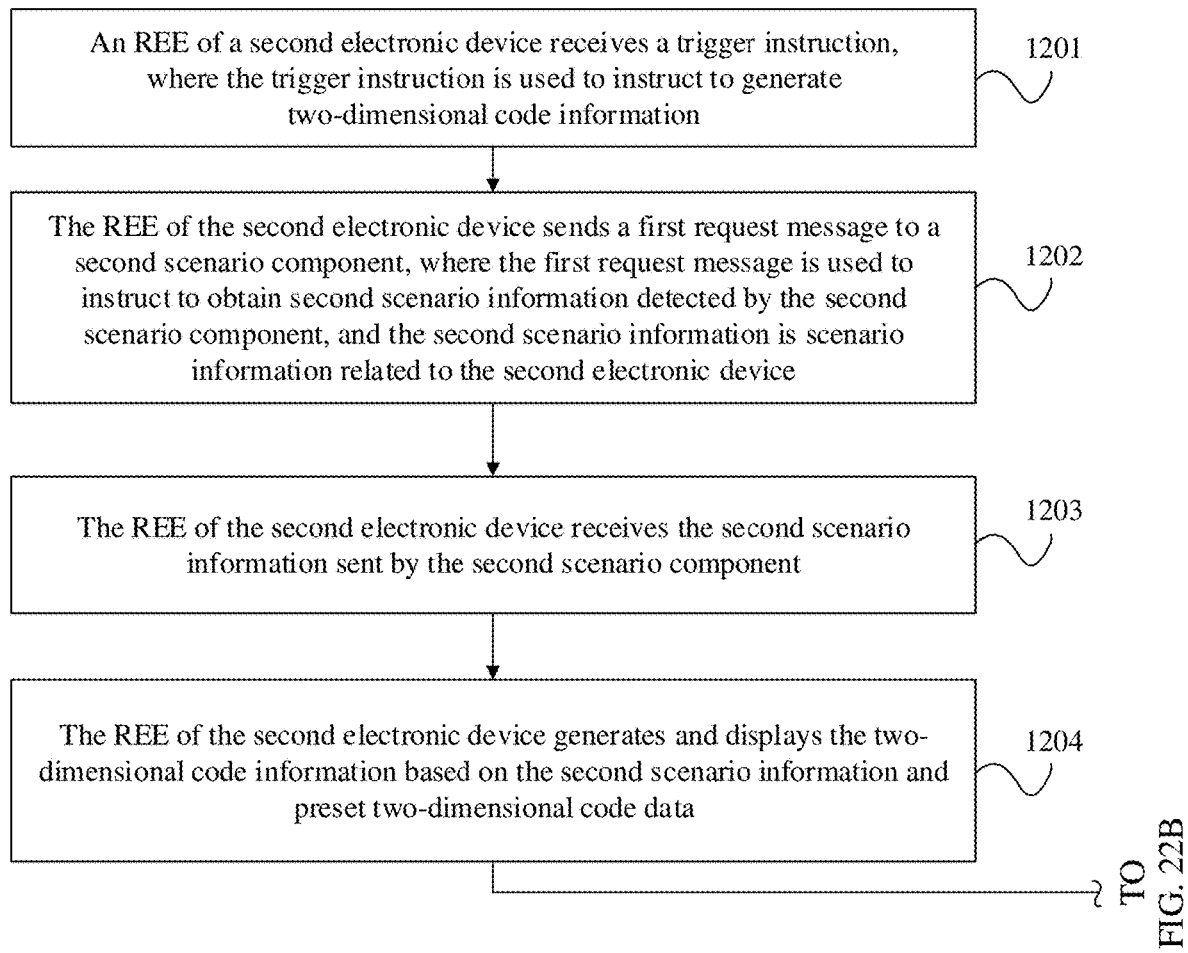
FIG. 22A and FIG. 22B are a schematic flowchart of a further two-dimensional code processing method according to an embodiment.
Figure 22B:
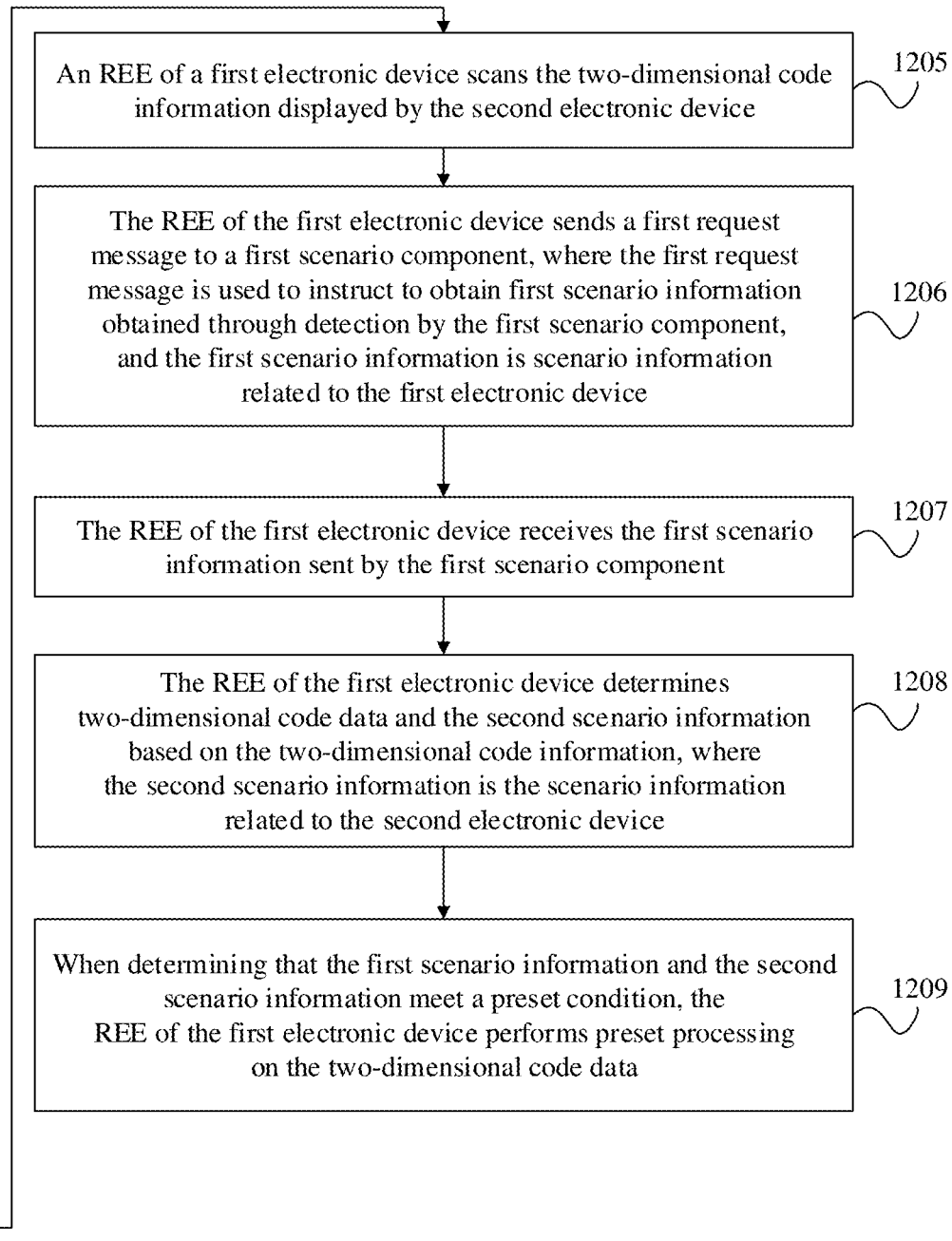

FIG. 22A and FIG. 22B are schematic flowcharts of a further two-dimensional code processing method according to an embodiment. In the embodiment shown in FIG. 22A and FIG. 22B, the method includes the following steps.

1201. An REE of a second electronic device receives a trigger instruction, where the trigger instruction is for indicating to generate two-dimensional code information.

For example, the second electronic device may be a mobile terminal device, may be a terminal device having a POS function, or may be a cloud gate machine. Alternatively, the second electronic device may be another apparatus or device that can perform the solution in this embodiment. A second scenario component is configured in the second electronic device.

An REE system may be deployed in a system of the second electronic device. For this step, refer to step 801 shown in FIG. 16. Details are not described again.

1202. The REE of the second electronic device sends a first request message to the second scenario component, where the first request message is for indicating to generate second scenario information detected by the second scenario component, and the second scenario information is scenario information related to the second electronic device.

For example, for this step, refer to step 802 shown in FIG. 16. Details are not described again.

1203. The REE of the second electronic device receives the second scenario information sent by the second scenario component.

For example, for this step, refer to step 803 shown in FIG. 16. Details are not described again.

1204. The REE of the second electronic device generates and displays the two-dimensional code information based on the second scenario information and preset two-dimensional code data.

For example, for this step, refer to step 804 shown in FIG. 16. Details are not described again.

1205. An REE of a first electronic device scans the two-dimensional code information displayed by the second electronic device.

For example, the REE system may be deployed in the system of the first electronic device; and a first scenario component is configured in the first electronic device. For this step, refer to step 401 shown in FIG. 8. Details are not described again.

1206. The REE of the first electronic device sends a first request message to the first scenario component, where the first request message is for indicating to generate first scenario information obtained through detection by the first scenario component, and the first scenario information is scenario information related to the first electronic device.

For example, for this step, refer to step 402 shown in FIG. 8. Details are not described again.

1207. The REE of the first electronic device receives the first scenario information sent by the first scenario component.

For example, for this step, refer to step 403 shown in FIG. 8. Details are not described again.

1208. The REE of the first electronic device determines two-dimensional code data and the second scenario information based on the two-dimensional code information, where the second scenario information is the scenario information related to the second electronic device.

For example, for this step, refer to step 404 shown in FIG. 8. Details are not described again.

1209. When determining that the first scenario information and the second scenario information meet a preset condition, the REE of the first electronic device performs preset processing on the two-dimensional code data.

For example, for this step, refer to step 405 shown in FIG. 8. Details are not described again.

In the solution provided in this embodiment, a two-dimensional code may be verified based on the scenario information. However, there is still a possibility of a malicious attack. An attacker only needs to install malware at a two-dimensional code generation end to complete a two-dimensional code replacement attack.

In an example, a malicious application program of the two-dimensional code generation end may obtain scenario data of the two-dimensional code generation end. The malicious application program of the two-dimensional code generation end may send the scenario data of the two-dimensional code generation end to a remote attacker device. The attacker device may initiate a root attack to the attacker device itself and tamper with the scenario data of the two-dimensional code generation end. The attacker device may generate a malicious two-dimensional code with attacker information and the scenario data of the two-dimensional code generation end. Then when the two-dimensional code generation end needs to generate a two-dimensional code, the attacker device may replace the two-dimensional code generated by the two-dimensional code generation end with the malicious two-dimensional code. Therefore, this embodiment possibly cannot avoid a malicious attack in this case.

In this embodiment, the REE of the second electronic device obtains the second scenario information related to the second electronic device; the REE of the second electronic device generates and displays the two-dimensional code carrying the second scenario information; the REE of the first electronic device scans the two-dimensional code information displayed by the second electronic device; the REE of the first electronic device obtains the first scenario information; and the REE of the first electronic device verifies the first scenario information and the second scenario information, and after the second scenario information is successfully verified, the REE of the first electronic device performs preset processing on the two-dimensional code. The two-dimensional code may be automatically verified based on the scenario information, and it may be ensured, based on the scenario information, that the scanned two-dimensional code is not a malicious attack two-dimensional code, and a malicious two-dimensional code can be identified. Therefore, security of property of a user is ensured.

Further, the foregoing embodiments may be applied to various scenarios.

In an example, the foregoing embodiments may be applied to a payment scenario. The second electronic device serving as the two-dimensional code generation end may obtain the second scenario information related to the second electronic device. The first electronic device serving as the two-dimensional code scanning end may obtain the first scenario information related to the first electronic device. After the first electronic device verifies the first scenario information and the second scenario information, the first electronic device performs payment processing or deduction processing on the scanned two-dimensional code. Therefore, in a face-to-face code scanning and transfer process, the two-dimensional code can be verified in the payment process based on the scenario information. Therefore, security of property of the user is ensured.

For example, third-party payment software may be installed on the first electronic device. Alternatively, the first electronic device has a POS function.

In an example, the foregoing embodiments may be applied to a subway travel scenario. The subway has become an important means of transportation for people to travel. The user can scan the code to take the subway. However, a card change attack occurs currently. A meaning of the card change attack is as follows: A passenger A takes the subway from a station 1 to a station 2, and a passenger B takes the subway from the station 2 to the station 1. It can be understood that both the passengers A and B need to spend C yuan. A mobile terminal device of the passenger A presents a two-dimensional code 1 at the station 1, and a cloud gate machine at the station 1 scans the two-dimensional code 1 of the mobile terminal device of the passenger A. A mobile terminal device of the passenger B presents a two-dimensional code 2 at the station 2, and a cloud gate machine at the station 2 scans the two-dimensional code 2 of the mobile terminal device of the passenger B. However, when the subway runs to a station 3 between the station 1 and the station 2, the passengers A and B get off at the same time, and then the passengers A and B exchange their two-dimensional codes and then continue to take the subway. Therefore, the mobile terminal device of the passenger A presents the two-dimensional code 2 at the station 2, and the cloud gate machine at the station 2 scans the two-dimensional code 2 of the mobile terminal device of the passenger A; and the mobile terminal device of the passenger B presents the two-dimensional code 1 at the station 1, and the cloud gate machine at the station 1 scans the two-dimensional code 1 of the mobile terminal device of the passenger B. Because the cloud gate machine of the subway deducts fees based on mileages of passengers, but the two-dimensional code 2 displayed on the mobile terminal device of the passenger A is still represented as the station 2, the cloud gate machine at the station 2 deducts a fee less than C yuan from the mobile terminal device of the passenger A; the two-dimensional code 1 displayed on the mobile terminal device of the passenger B is still represented as the station 1, and the cloud gate machine at the station 1 deducts a fee less than C yuan from the mobile terminal device of the passenger B. Therefore, a property and economic loss is caused to the subway.

Figure 23:
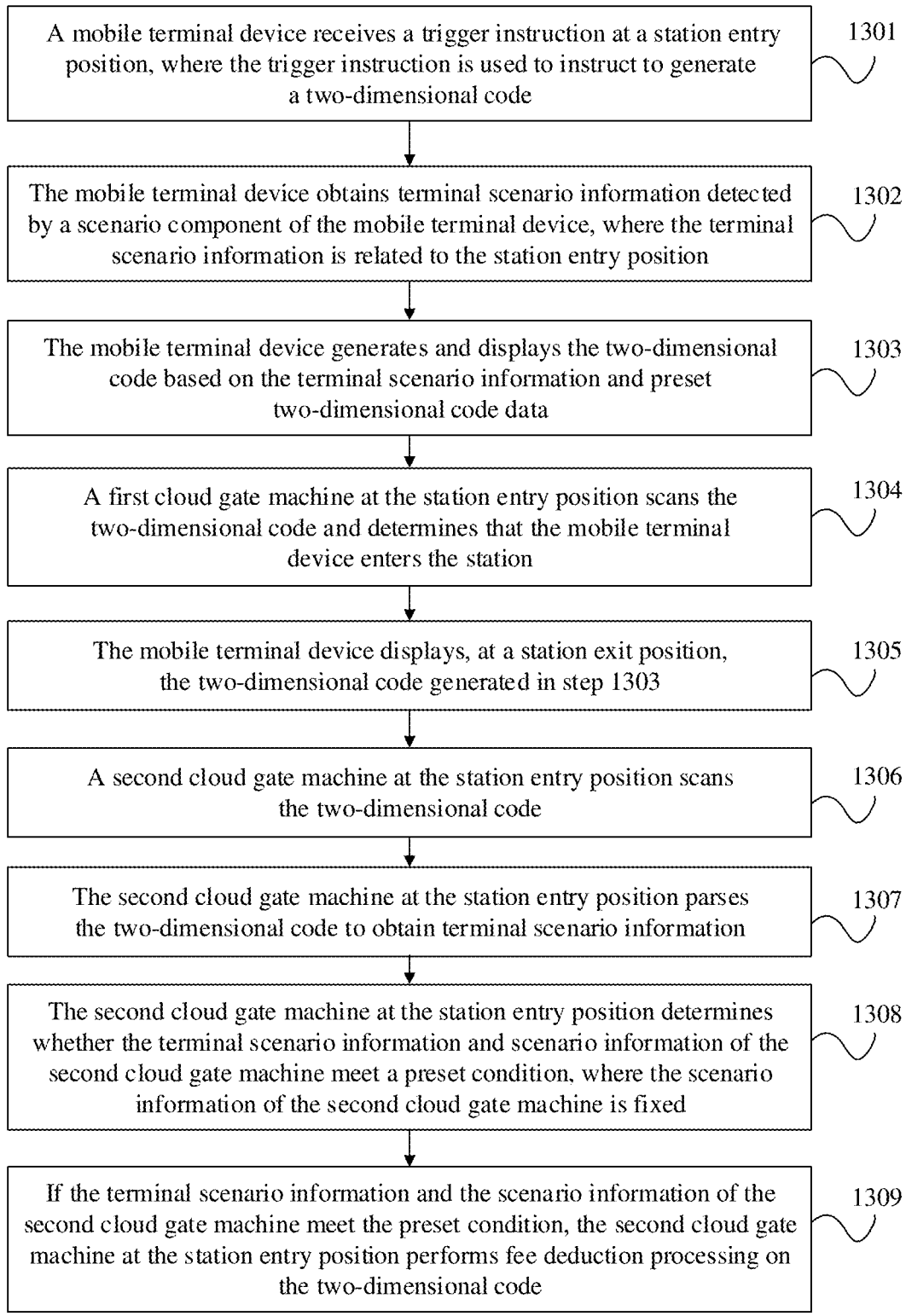
FIG. 23 is a schematic flowchart of a still further two-dimensional code processing method according to an embodiment.

In a subway travel scenario, the foregoing embodiment may be used. FIG. 23 is a schematic flowchart of a still further two-dimensional code processing method according to an embodiment. In the embodiment shown in FIG. 23, the method includes the following steps.

1301. A mobile terminal device receives a trigger instruction at a station entry position, where the trigger instruction is for indicating to generate a two-dimensional code.

1302. The mobile terminal device obtains terminal scenario information detected by a scenario component of the mobile terminal device, where the terminal scenario information is related to the station entry position.

1303. The mobile terminal device generates and displays the two-dimensional code based on the terminal scenario information and preset two-dimensional code data.

1304. A first cloud gate machine at the station entry position scans the two-dimensional code and determines that the mobile terminal device enters the station.

1305. The mobile terminal device displays, at a station exit position, the two-dimensional code generated in step 1303.

1306. A second cloud gate machine at the station entry position scans the two-dimensional code.

1307. The second cloud gate machine at the station entry position parses the two-dimensional code to obtain terminal scenario information.

1308. The second cloud gate machine at the station entry position determines whether the terminal scenario information and scenario information of the second cloud gate machine meet a preset condition, where the scenario information of the second cloud gate machine is fixed.

1309. If the terminal scenario information and the scenario information of the second cloud gate machine meet the preset condition, the second cloud gate machine at the station entry position performs fee deduction processing on the two-dimensional code.

In an example, in a subway scenario, the preset condition is that the terminal scenario information is inconsistent with the scenario information of the second cloud gate machine. For example, the scenario information is GPS information, that is, the terminal scenario information is GPS information obtained by the mobile terminal device at the station entry position, and the scenario information of the second cloud gate machine is used as GPS information at the station exit position. The preset condition is that the terminal scenario information and the scenario information of the second cloud gate machine do not fall within a same geographical range.

For another example, the scenario information is Wi-Fi information, that is, the terminal scenario information is Wi-Fi information obtained by the mobile terminal device at the station entry position, and the scenario information of the second cloud gate machine is used as Wi-Fi information at the station exit position. The preset condition is that the terminal scenario information and the scenario information of the second cloud gate machine are different; or the preset condition is that a Wi-Fi identifier represented by the terminal scenario information is in a Wi-Fi list represented by the scenario information of the second cloud gate machine.

For another example, the scenario information is Bluetooth information, that is, the terminal scenario information is Bluetooth information obtained by the mobile terminal device at the station entry position, and the scenario information of the second cloud gate machine is used as Bluetooth information at the station exit position. The preset condition is that the terminal scenario information and the scenario information of the second cloud gate machine are different; or the preset condition is that a Bluetooth identifier represented by the terminal scenario information is in a Bluetooth list represented by the scenario information of the second cloud gate machine.

For another example, the scenario information is natural environment information, that is, the terminal scenario information is natural environment information obtained by the mobile terminal device at the station entry position, and the scenario information of the second cloud gate machine is used as natural environment information at the station exit position. The preset condition is that the terminal scenario information and the scenario information of the second cloud gate machine are different.

For example, the passenger A takes the subway from the station 1 to the station 2. The mobile terminal of the passenger A may be used as a two-dimensional code generation end, and the cloud gate machine at the station may be used as a two-dimensional code scanning end. The passenger A enters the station at the station 1, and the mobile terminal of the passenger A obtains, at a location of the station 1, scenario information 1 corresponding to the mobile terminal; and the mobile terminal of the passenger A generates and displays the two-dimensional code based on the two-dimensional code data and the scenario information 1 corresponding to the mobile terminal. The cloud gate machine at the station 1 scans the two-dimensional code displayed by the mobile terminal of the passenger A, and the cloud gate machine at the station 1 can directly confirm that the passenger A enters the station. The passenger A exits the station at the station 2, and the mobile terminal of the passenger A displays the two-dimensional code generated at the station 1. The cloud gate machine at the station 2 scans the two-dimensional code displayed by the mobile terminal of the passenger A. The cloud gate machine at the station 2 may obtain the scenario information corresponding to the cloud gate machine at the station 2. The scenario information corresponding to the cloud gate machine at the station 2 may be prestored in the cloud gate machine at the station 2. Because a location of the cloud gate machine at the station 2 is fixed, the cloud gate machine at the station 2 does not need to dynamically obtain the scenario information and may directly invoke the prestored scenario information. The cloud gate machine at the station 2 parses out the scenario information in the two-dimensional code, where the scenario information in the two-dimensional code is the scenario information 1 corresponding to the mobile terminal, that is, the scenario information in the two-dimensional code is obtained by the mobile terminal of the passenger A at the location of the station 1. The cloud gate machine at the station 2 compares the scenario information in the two-dimensional code with the scenario information corresponding to the cloud gate machine at the station 2. When determining that the two are inconsistent, the cloud gate machine at the station 2 performs fee deduction on the two-dimensional code.

The passenger B enters the station at the station 2, and the mobile terminal of the passenger B obtains, at a location of the station 2, scenario information 2 corresponding to the mobile terminal; and the mobile terminal of the passenger B generates the two-dimensional code of the passenger B based on the two-dimensional code data and the scenario information 2 corresponding to the mobile terminal. The mobile terminal of the passenger B sends the two-dimensional code of the passenger B to the mobile terminal of the passenger A. When the passenger A exits the station at the station 2, if the mobile terminal of the passenger A obtains the two-dimensional code of the passenger B, the scenario information in the two-dimensional code of the passenger B is the scenario information obtained at the station 2. The cloud gate machine at the station 2 scans the two-dimensional code of the passenger B, and may parse out the scenario information in the two-dimensional code of the passenger B. The cloud gate machine at the station 2 compares the scenario information in the two-dimensional code of the passenger B with the scenario information corresponding to the cloud gate machine at the station 2. The cloud gate machine at the station 2 may determine that the two are consistent. Therefore, the cloud gate machine at the station 2 may determine that the two-dimensional code is maliciously changed. Therefore, the subway code change is resisted.

Figure 24:
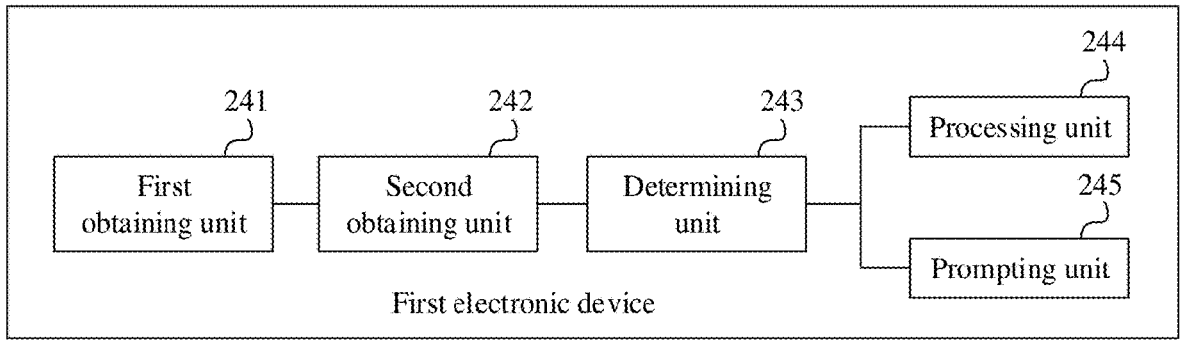
FIG. 24 is a schematic diagram of a structure of a first electronic device according to an embodiment.

FIG. 24 is a schematic diagram of a structure of a first electronic device according to an embodiment. As shown in FIG. 24, the first electronic device includes:

a first obtaining unit 241, configured to obtain two-dimensional code information displayed by a second electronic device, where in this case, the first obtaining unit 241 may perform step 101 of the method shown in FIG. 4; or the first obtaining unit 241 may perform step 201 of the method shown in FIG. 5; or the first obtaining unit 241 may perform step 301 of the method shown in FIG. 7;

a second obtaining unit 242, configured to obtain first scenario information, where in this case, the second obtaining unit 242 may perform step 102 of the method shown in FIG. 4; or the second obtaining unit 242 may perform step 202 of the method shown in FIG. 5; or the second obtaining unit 242 may perform step 302 of the method shown in FIG. 7;

a determining unit 243, configured to determine two-dimensional code data and second scenario information based on the two-dimensional code information, where the first scenario information is scenario information related to the first electronic device, and the second scenario information is scenario information related to the second electronic device; in this case, the determining unit 243 may perform step 103 of the method shown in FIG. 4; or the determining unit 243 may perform step 203 of the method shown in FIG. 5; or the determining unit 243 may perform step 303 of the method shown in FIG. 7; and a processing unit 244, configured to perform preset processing on the two-dimensional code data when determining that the first scenario information and the second scenario information meet a preset condition, where in this case, the processing unit 244 may perform step 104 of the method shown in FIG. 4; or the processing unit 244 may perform step 204 of the method shown in FIG. 5; or the processing unit 244 may perform step 304 of the method shown in FIG. 7.

In an example, an REE is deployed in a system of the first electronic device; and the second obtaining unit 242 is configured to obtain the first scenario information based on the REE. In this case, the second obtaining unit 242 may perform step 302 of the method shown in FIG. 7.

In an example, the first electronic device further includes a prompting unit 245, configured to generate and display prompt information when it is determined that the first scenario information and the second scenario information do not meet the preset condition. In this case, the prompting unit 245 may perform step 205 of the method shown in FIG. 5.

In an example, the determining unit 243 is configured to decrypt the two-dimensional code information to obtain the two-dimensional code data and the second scenario information.

In an example, the first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

In an example, when the first scenario information is the global positioning system information, and the second scenario information is the global positioning system information, the preset condition is that both the first scenario information and the second scenario information fall within a preset geographical range;

when the first scenario information is the wireless local area network information, and the second scenario information is the wireless local area network information, the preset condition is that a wireless local area network identifier represented by the second scenario information exists in a wireless local area network list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

In this embodiment, the first electronic device in the embodiment shown in FIG. 24 may be configured to perform the solutions in the embodiments shown in FIG. 4 and FIG. 5, FIG. 7 to FIG. 9, and FIG. 20A to FIG. 22B in the foregoing methods. Implementation principles and effects thereof are similar, and details are not described herein again.

Figure 25:
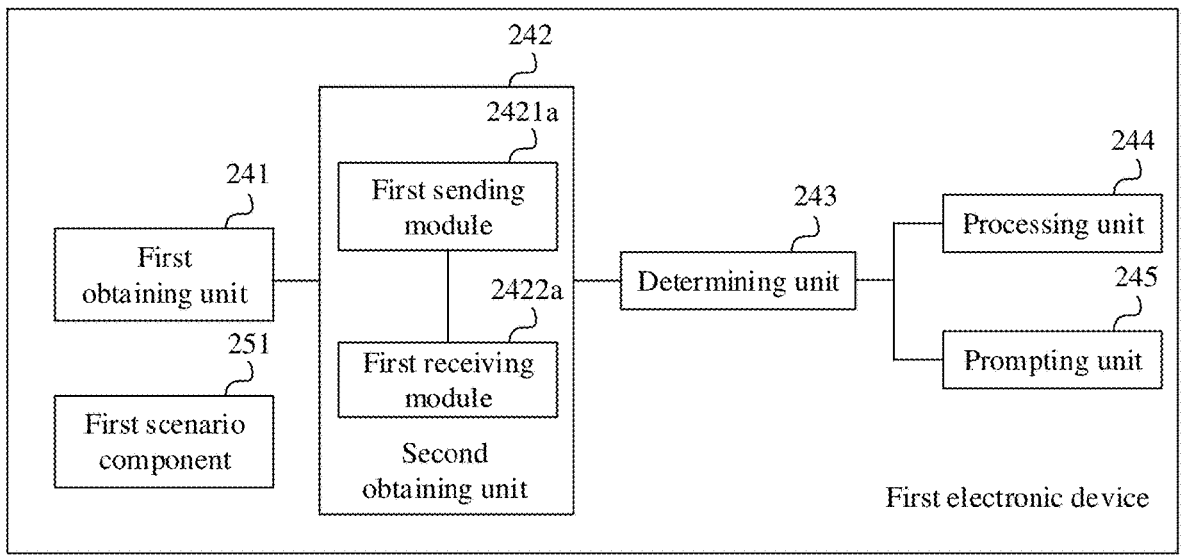
FIG. 25 is a schematic diagram of a structure of another first electronic device according to an embodiment.

FIG. 25 is a schematic diagram of a structure of another first electronic device according to an embodiment. On a basis of the embodiment shown in FIG. 24, as shown in FIG. 25, a first scenario component 251 is disposed in the first electronic device; and the second obtaining unit 242 includes:

a first sending module 2421a, configured to send a first request message to the first scenario component 251 based on the REE, where the first request message is for indicating to generate the first scenario information obtained through detection by the first scenario component 251; in this case, the first sending module 2421a may perform step 402 of the method shown in FIG. 8; and a first receiving module 2422a, configured to receive, based on the REE, the first scenario information sent by the first scenario component, where in this case, the first receiving module 2422a may perform step 403 of the method shown in FIG. 8.

In this embodiment, the first electronic device in the embodiment shown in FIG. 25 may be configured to perform the embodiment shown in FIG. 8 in the foregoing method. Implementation principles and effects thereof are similar, and details are not described herein again.

Figure 26:
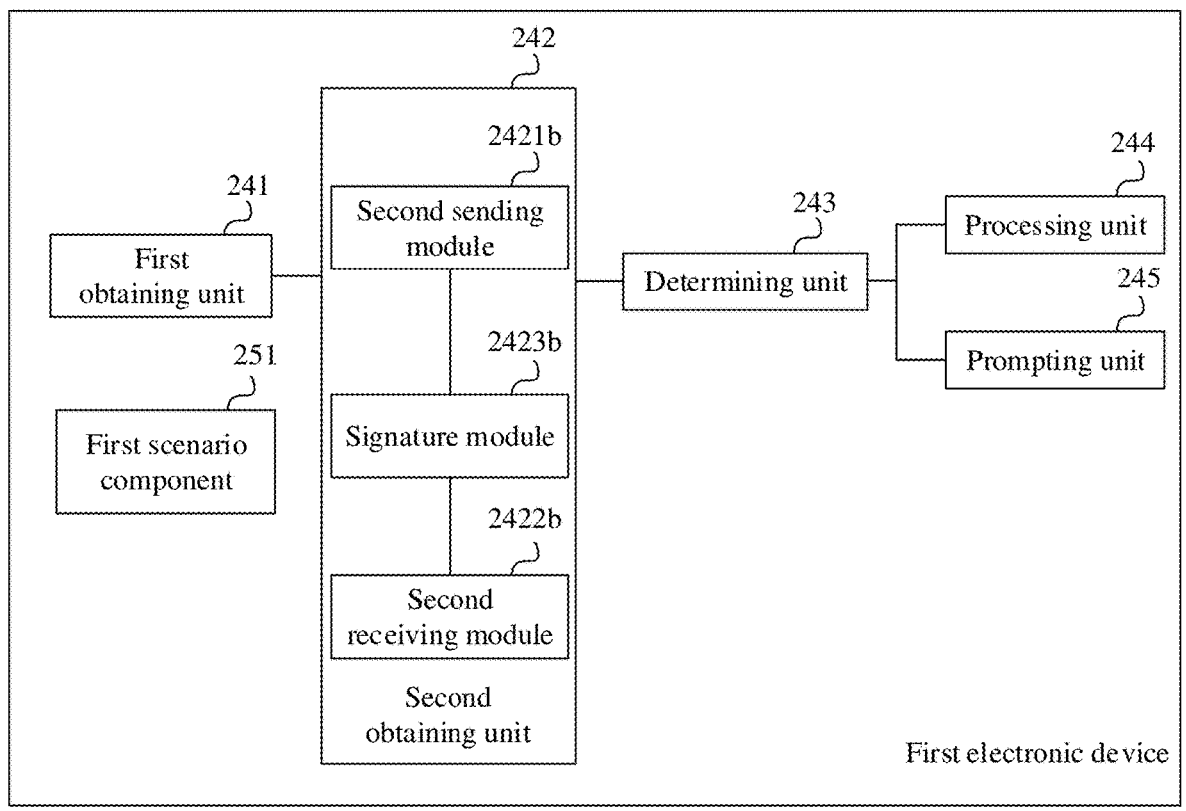
FIG. 26 is a schematic diagram of a structure of still another first electronic device according to an embodiment.

FIG. 26 is a schematic diagram of a structure of still another first electronic device according to an embodiment. On a basis of the embodiment shown in FIG. 24, as shown in FIG. 26, a first scenario component 251 is disposed in the first electronic device; a trusted execution environment is further deployed in the system of the first electronic device; and the second obtaining unit 242 includes:

a second sending module 2421b, configured to send a second request message to the trusted execution environment based on the REE, where the second request message is for indicating to generate the first scenario information; in this case, the second sending module 2421*b* may perform step 504 of the method shown in FIG. 9; and a second receiving module 2422*b*, configured to receive, based on the REE, a return message returned by the trusted execution environment, where the return message is used to indicate the first scenario information, and the first scenario information is obtained by the trusted execution environment from the first scenario component; in this case, the second receiving module 2422*b* may perform step 505 of the method shown in FIG. 9.

In an example, the second request message includes the second scenario information, or the second request information is used to indicate the second scenario information; the return message is a verification result; and the second receiving module 2422*b* is configured to:

receive, based on the REE, a verification result returned by the trusted execution environment, where the verification result is generated after the trusted execution environment compares the first scenario information with the second scenario information, and the verification result represents that the first scenario information and the second scenario information meet the preset condition; in this case, the second receiving module 2422*b* may perform step 505 of the method shown in FIG. 9.

In an example, the second obtaining unit 242 further includes:

a signature module 2423*b*, configured to: before the second sending module 2421*b* sends the second request message to the trusted execution environment based on the REE, perform signature processing on the second scenario information by using a public key, to obtain signed second scenario information, where the first scenario information is obtained after the trusted execution environment determines that the signed second scenario information is successfully verified by using a private key; in this case, the signature module 2423*b* may perform step 503 of the method shown in FIG. 9.

In an example, the first scenario information is obtained after the trusted execution environment sets the first scenario component to a preset configuration, and the preset configuration represents that the first scenario information can be obtained only by the trusted execution environment.

In this embodiment, the first electronic device in the embodiment shown in FIG. 26 may be configured to perform the embodiment shown in FIG. 9 in the foregoing method. Implementation principles and effects thereof are similar, and details are not described herein again.

Figure 27:
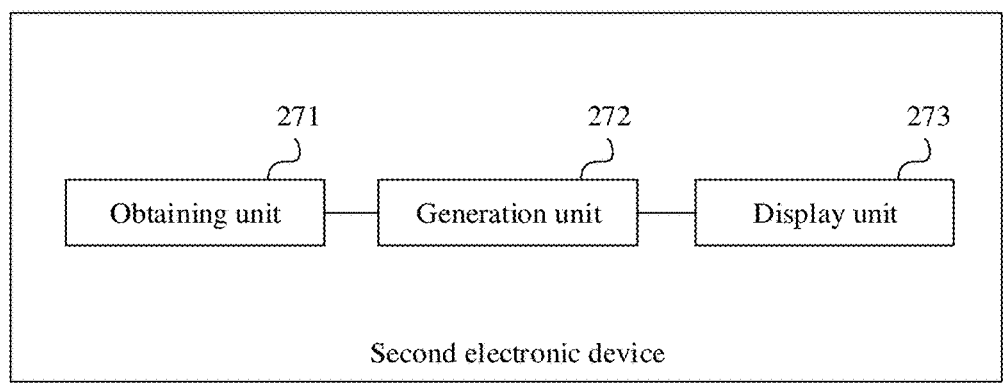
FIG. 27 is a schematic diagram of a structure of a second electronic device according to an embodiment.

FIG. 27 is a schematic diagram of a structure of a second electronic device according to an embodiment. As shown in FIG. 27, the second electronic device includes:

an obtaining unit 271, configured to obtain second scenario information, where the second scenario information is scenario information related to the second electronic device; in this case, the obtaining unit 271 may perform step 601 of the method shown in FIG. 14; or the obtaining unit 271 may perform step 701 of the method shown in FIG. 15;

a generation unit 272, configured to generate and display two-dimensional code information based on the second scenario information and preset two-dimensional code data, where in this case, the generation unit 272 may perform step 602 of the method shown in FIG. 14; or the generation unit 272 may perform step 702 of the method shown in FIG. 15; or the generation unit 272 may perform step 804 of the method shown in FIG. 16; and a display unit 273, configured to display the two-dimensional code information, where the two-dimensional code information is used by a first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device; in this case, the display unit 273 may perform step 602 of the method shown in FIG. 14; or the display unit 273 may perform step 702 of the method shown in FIG. 15; or the display unit 273 may perform step 804 of the method shown in FIG. 16.

In an example, an REE is deployed in a system of the second electronic device; and the obtaining unit 271 is configured to obtain the second scenario information based on the REE. In this case, the obtaining unit 271 may perform step 701 of the method shown in FIG. 15.

In an example, the first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

In an example, when the first scenario information is the global positioning system information, and the second scenario information is the global positioning system information, the preset condition is that both the first scenario information and the second scenario information fall within a preset geographical range;

when the first scenario information is the wireless local area network information, and the second scenario information is the wireless local area network information, the preset condition is that a wireless local area network identifier represented by the second scenario information exists in a wireless local area network list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

In this embodiment, the second electronic device in the embodiment shown in FIG. 27 may be configured to perform the embodiments shown in FIG. 14 to FIG. 17, and FIG. 20A to FIG. 22B in the foregoing methods. Implementation principles and effects thereof are similar, and details are not described herein again.

Figure 28:
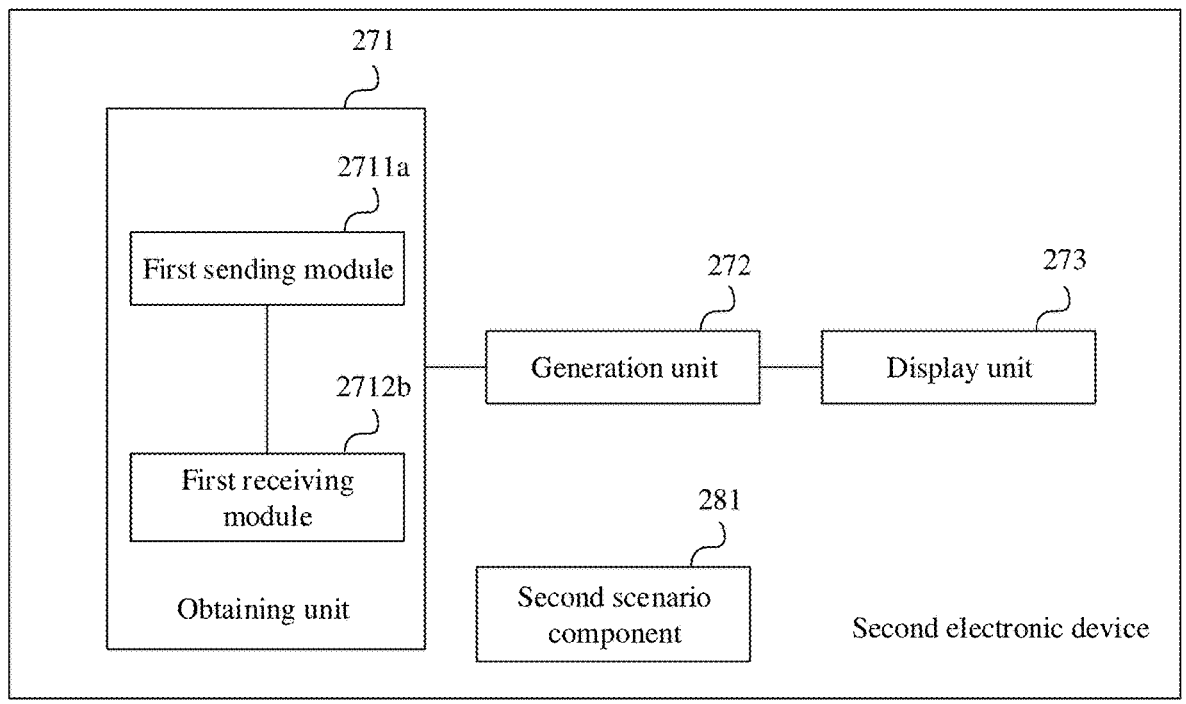
FIG. 28 is a schematic diagram of a structure of another second electronic device according to an embodiment.

FIG. 28 is a schematic diagram of a structure of another second electronic device according to an embodiment. On a basis of the embodiment shown in FIG. 27, as shown in FIG.

28, a second scenario component 281 is disposed in the second electronic device; and the obtaining unit 271 includes:

- a first sending module 2711*a*, configured to send a first request message to the second scenario component 281 based on the REE, where the first request message is for indicating to generate the second scenario information detected by the second scenario component 281; in this case, the first sending module 2711*a* may perform step 802 of the method shown in FIG. 16; and
- a first receiving module 2712*b*, configured to receive, based on the REE, the second scenario information sent by the second scenario component 281, where in this case, the first receiving module 2712*b* may perform step 803 of the method shown in FIG. 16.

In this embodiment, the second electronic device in the embodiment shown in FIG. 28 may be configured to perform the embodiment shown in FIG. 17 in the foregoing method. Implementation principles and effects thereof are similar, and details are not described herein again.

Figure 29:
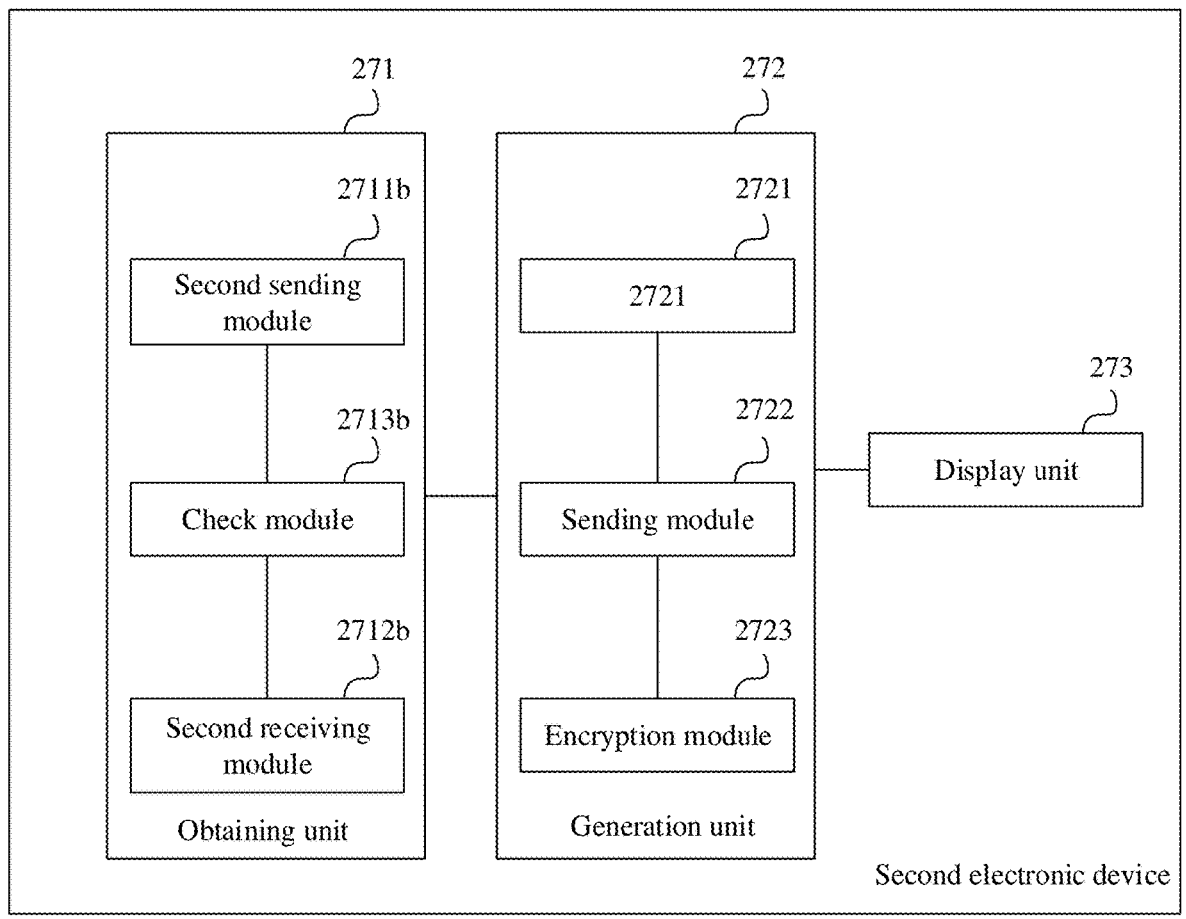
FIG. 29 is a schematic diagram of a structure of still another second electronic device according to an embodiment.

FIG. 29 is a schematic diagram of a structure of still another second electronic device according to an embodiment. On a basis of the embodiment shown in FIG. 27, as shown in FIG. 29, a trusted execution environment is further deployed in the system of the second electronic device; a second scenario component 291 is disposed in the second electronic device; and the obtaining unit 271 includes:

- a second sending module 2711*b*, configured to send a second request message to the trusted execution environment based on the REE, where the second request message is for indicating to generate the second scenario information; in this case, the second sending module 2711*b* may perform step 902 of the method shown in FIG. 17; and
- a second receiving module 2712*b*, configured to receive, based on the REE, the second scenario information returned by the trusted execution environment, where the second scenario information is obtained by the trusted execution environment from the second scenario component 291; in this case, the second receiving module 2712*b* may perform step 903 of the method shown in FIG. 17.

In an example, the second request message is a trigger instruction detected based on the REE, or the second request message includes a trigger instruction, where the trigger instruction is for indicating to generate the two-dimensional code information.

In an example, the second scenario information is scenario information on which signature processing is performed by the trusted execution environment by using a public key; and the obtaining unit 271 further includes:

- a check module 2713*b*, configured to: after the second receiving module 2712*b* receives, based on the REE, the second scenario information returned by the trusted execution environment, check the second scenario information based on the REE by using a private key, to obtain a check result, where the check result represents that the second scenario information is successfully checked; in this case, the check module 2713*b* may perform step 904 of the method shown in FIG. 17.

In an example, the generation unit 272 includes:

- a generation module 2721, configured to generate to-be-processed data based on the REE, the second scenario information, and the two-dimensional code data, where the to-be-processed data is two-dimensional code data including the second scenario information; in this case, the generation unit 272 may perform step 905 of the method shown in FIG. 17; and
- a sending module 2722, configured to send the to-be-processed data to the trusted execution environment based on the REE, where the to-be-processed data is used by the trusted execution environment to generate and display the two-dimensional code information; in this case, the sending module 2722 may perform step 907 of the method shown in FIG. 17.

In an example, the generation unit 272 further includes:

- an encryption module 2723, configured to: before the sending module 2722 sends the to-be-processed data to the trusted execution environment based on the REE, encrypt the to-be-processed data based on the REE to obtain encrypted to-be-processed data, where in this case, the encryption module 2723 may perform step 906 of the method shown in FIG. 17.

In an example, the second scenario information is obtained after the trusted execution environment sets the second scenario component 291 to a preset configuration, and the preset configuration represents that the second scenario information of the second scenario component 291 can be obtained only by the trusted execution environment.

In an example, the second electronic device further includes:

- a receiving unit 292, configured to receive a trigger instruction before the obtaining unit 271 obtains the second scenario information, where the trigger instruction is for indicating to generate the two-dimensional code information; in this case, the receiving unit 292 may perform step 901 of the method shown in FIG. 17.

In this embodiment, the second electronic device in the embodiment shown in FIG. 29 may be configured to perform the embodiment shown in FIG. 17 in the foregoing method. Implementation principles and effects thereof are similar, and details are not described herein again.

Figure 30:
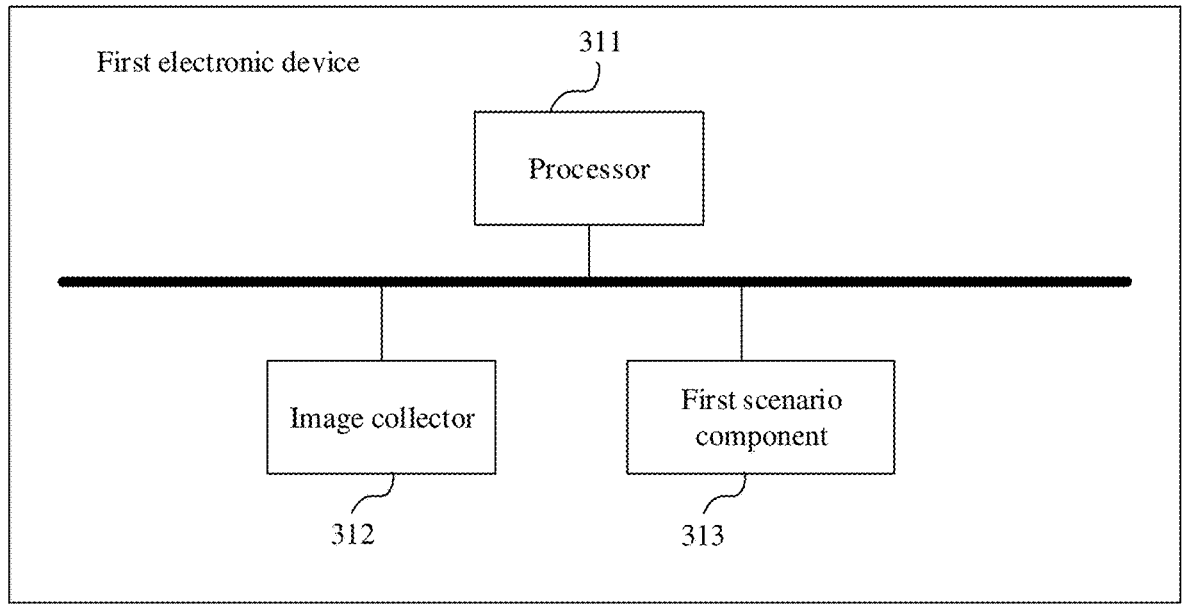
FIG. 30 is a schematic diagram of a structure of yet another first electronic device according to an embodiment.

FIG. 30 is a schematic diagram of a structure of yet another first electronic device according to an embodiment. As shown in FIG. 30, the first electronic device includes a processor 311 and an image collector 312.

The image collector 312 is configured to scan two-dimensional code information displayed by a second electronic device.

The processor 311 is configured to: obtain the two-dimensional code information displayed by the second electronic device; obtain first scenario information, and determine two-dimensional code data and second scenario information based on the two-dimensional code information, where the first scenario information is scenario information related to the first electronic device, and the second scenario information is scenario information related to the second electronic device; and when determining that the first scenario information and the second scenario information meet a preset condition, perform preset processing on the two-dimensional code data. In this case, the processor 311 may perform steps 101 to 104 of the method shown in FIG. 4; or the processor 311 may perform steps 201 to 204 of the method shown in FIG. 5; or the processor 311 may perform steps 301 to 304 of the method shown in FIG. 7.

In an example, an REE is deployed in a system of the first electronic device; and when obtaining the first scenario information, the processor 311 is configured to obtain the first scenario information based on the REE. In this case, the processor 311 may perform step 302 of the method shown in FIG. 7.

In an example, a first scenario component 313 is disposed in the first electronic device; and when obtaining the first scenario information based on the REE, the processor 311 is configured to:

send a first request message to the first scenario component 313 based on the REE, where the first request message is for indicating to generate the first scenario information obtained through detection by the first scenario component 313; in this case, the processor 311 may perform step 402 of the method shown in FIG. 8; and receive, based on the REE, the first scenario information sent by the first scenario component 313, where in this case, the processor 311 may perform step 403 of the method shown in FIG. 8.

In an example, a first scenario component 313 is disposed in the first electronic device; a trusted execution environment is further deployed in the system of the first electronic device; and when obtaining the first scenario information based on the REE, the processor 31 is configured to:

send a second request message to the trusted execution environment based on the REE, where the second request message is for indicating to generate the first scenario information; in this case, the processor 311 may perform step 504 of the method shown in FIG. 9; and receive, based on the REE, a return message returned by the trusted execution environment, where the return message is used to indicate the first scenario information, and the first scenario information is obtained by the trusted execution environment from the first scenario component 313; in this case, the processor 311 may perform step 505 of the method shown in FIG. 9.

In an example, the second request message includes the second scenario information, or the second request information is used to indicate the second scenario information; the return message is a verification result; and when receiving, based on the REE, the return message returned by the trusted execution environment, the processor 311 is configured to:

receive, based on the REE, a verification result returned by the trusted execution environment, where the verification result is generated after the trusted execution environment compares the first scenario information with the second scenario information, and the verification result represents that the first scenario information and the second scenario information meet the preset condition; in this case, the processor 311 may perform step 505 of the method shown in FIG. 9.

In an example, before sending the second request message to the trusted execution environment based on the REE, the processor 311 is further configured to perform signature processing on the second scenario information by using a public key, to obtain signed second scenario information, where the first scenario information is obtained after the trusted execution environment determines that the signed second scenario information is successfully verified by using a private key. In this case, the processor 311 may perform step 503 of the method shown in FIG. 9.

In an example, the first scenario information is obtained after the trusted execution environment sets the first scenario component 313 to a preset configuration, and the preset configuration represents that the first scenario information can be obtained only by the trusted execution environment.

In an example, the processor 311 is further configured to generate and display prompt information when determining that the first scenario information and the second scenario information do not meet the preset condition. In this case, the processor 311 may perform step 205 of the method shown in FIG. 5.

In an example, when determining the two-dimensional code data and the second scenario information based on the two-dimensional code information, the processor 311 is configured to decrypt the two-dimensional code information to obtain the two-dimensional code data and the second scenario information.

In an example, the first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

In an example, when the first scenario information is the global positioning system information, and the second scenario information is the global positioning system information, the preset condition is that both the first scenario information and the second scenario information fall within a preset geographical range;

when the first scenario information is the wireless local area network information, and the second scenario information is the wireless local area network information, the preset condition is that a wireless local area network identifier represented by the second scenario information exists in a wireless local area network list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

In this embodiment, the first electronic device in the embodiment shown in FIG. 30 may be configured to perform the embodiments shown in FIG. 4 and FIG. 5, FIG. 7 to FIG. 9, and FIG. 20A to FIG. 22B in the foregoing methods. Implementation principles and effects thereof are similar, and details are not described herein again.

Figure 31:
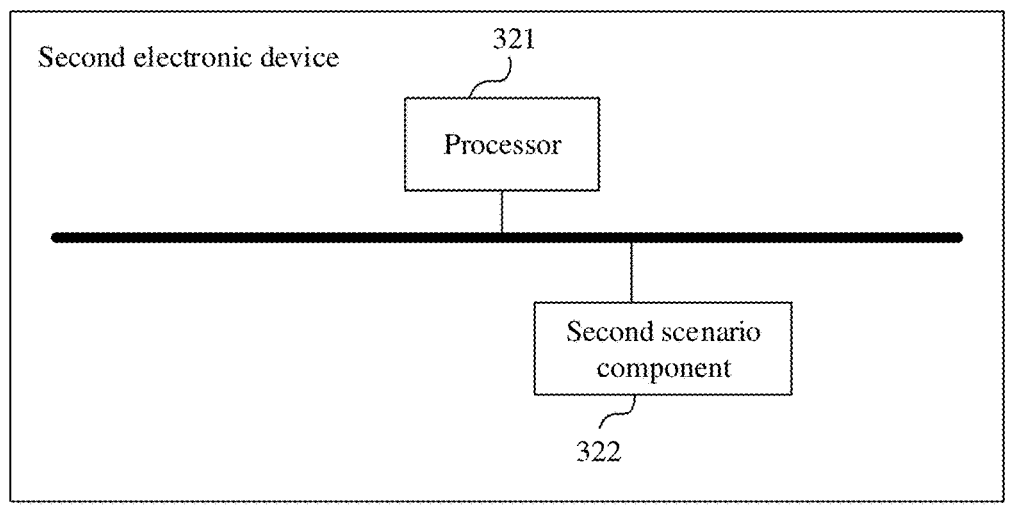
FIG. 31 is a schematic diagram of a structure of yet another second electronic device according to an embodiment.

FIG. 31 is a schematic diagram of a structure of yet another second electronic device according to an embodiment. As shown in FIG. 31, the second electronic device includes a processor 321.

The processor 321 is configured to: obtain second scenario information, where the second scenario information is scenario information related to the second electronic device; and generate and display two-dimensional code information based on the second scenario information and preset two-dimensional code data, where the two-dimensional code information is used by a first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device. In this case, the processor 321 may perform steps 601 and 602 of the method shown in FIG. 14; or the processor 321 may perform steps 701 and 702 of the method shown in FIG. 15.

In an example, an REE is deployed in a system of the second electronic device; and when obtaining the second scenario information, the processor 321 is configured to obtain the second scenario information based on the REE. In this case, the processor 321 may perform step 701 of the method shown in FIG. 15.

In an example, a second scenario component 322 is disposed in the second electronic device; and when obtaining the second scenario information based on the REE, the processor 321 is configured to:

send a first request message to the second scenario component 322 based on the REE, where the first request message is for indicating to generate the second scenario information detected by the second scenario component 322; in this case, the processor 321 may perform step 802 of the method shown in FIG. 16; and receive, based on the REE, the second scenario information sent by the second scenario component 322, where in this case, the processor 321 may perform step 803 of the method shown in FIG. 16.

In an example, a trusted execution environment is further deployed in the system of the second electronic device; a second scenario component 322 is disposed in the second electronic device; and when obtaining the second scenario information based on the REE, the processor 321 is configured to:

send a second request message to the trusted execution environment based on the REE, where the second request message is for indicating to generate the second scenario information; in this case, the processor 321 may perform step 902 of the method shown in FIG. 17; and receive, based on the REE, the second scenario information returned by the trusted execution environment, where the second scenario information is obtained by the trusted execution environment from the second scenario component 322; in this case, the processor 321 may perform step 903 of the method shown in FIG. 17.

In an example, the second request message is a trigger instruction detected based on the REE, or the second request message includes a trigger instruction, where the trigger instruction is for indicating to generate the two-dimensional code information.

In an example, the second scenario information is scenario information on which signature processing is performed by the trusted execution environment by using a public key; and after receiving, based on the REE, the second scenario information returned by the trusted execution environment, the processor 321 is further configured to:

check the second scenario information based on the REE by using a private key, to obtain a check result, where the check result represents that the second scenario information is successfully checked; in this case, the processor 321 may perform step 904 of the method shown in FIG. 17.

In an example, when generating and displaying the two-dimensional code information based on the second scenario information and preset two-dimensional code data, the processor 321 is configured to:

generate to-be-processed data based on the REE, the second scenario information, and the two-dimensional code data, where the to-be-processed data is two-dimensional code data including the second scenario information; in this case, the processor 321 may perform step 905 of the method shown in FIG. 17; and send the to-be-processed data to the trusted execution environment based on the REE, where the to-be-processed data is used by the trusted execution environment to generate and display the two-dimensional code information; in this case, the processor 321 may perform step 907 of the method shown in FIG. 17.

In an example, before sending the to-be-processed data to the trusted execution environment based on the REE, the processor 321 is further configured to encrypt the to-be-processed data based on the REE to obtain encrypted to-be-processed data. In this case, the processor 321 may perform step 906 of the method shown in FIG. 17.

In an example, the second scenario information is obtained after the trusted execution environment sets the second scenario component 322 to a preset configuration, and the preset configuration represents that the second scenario information of the second scenario component 322 can be obtained only by the trusted execution environment.

In an example, before obtaining the second scenario information, the processor 321 is further configured to receive a trigger instruction, where the trigger instruction is for indicating to generate the two-dimensional code information. In this case, the processor 321 may perform step 901 of the method shown in FIG. 17.

In an example, the first scenario information includes at least one of the following: global positioning system information, wireless local area network information, Bluetooth information, and natural environment information; and the second scenario information includes at least one of the following: global positioning system information, wireless local area network information, Bluetooth information, and natural environment information.

In an example, when the first scenario information is the global positioning system information, and the second scenario information is the global positioning system information, the preset condition is that both the first scenario information and the second scenario information fall within a preset geographical range;

when the first scenario information is the wireless local area network information, and the second scenario information is the wireless local area network information, the preset condition is that a wireless local area network identifier represented by the second scenario information exists in a wireless local area network list represented by the first scenario information;

when the first scenario information is the Bluetooth information, and the second scenario information is the Bluetooth information, the preset condition is that a Bluetooth identifier represented by the second scenario information exists in a Bluetooth list represented by the first scenario information; or when the first scenario information is the natural environment information, and the second scenario information is the natural environment information, the preset condition is that both the first scenario information and the second scenario information fall within a preset value range.

In this embodiment, the second electronic device in the embodiment shown in FIG. 31 may be configured to perform the embodiments shown in FIG. 14 to FIG. 17, and FIG. 20A to FIG. 22B in the foregoing methods. Implementation principles and effects thereof are similar, and details are not described herein again.

Figure 32:
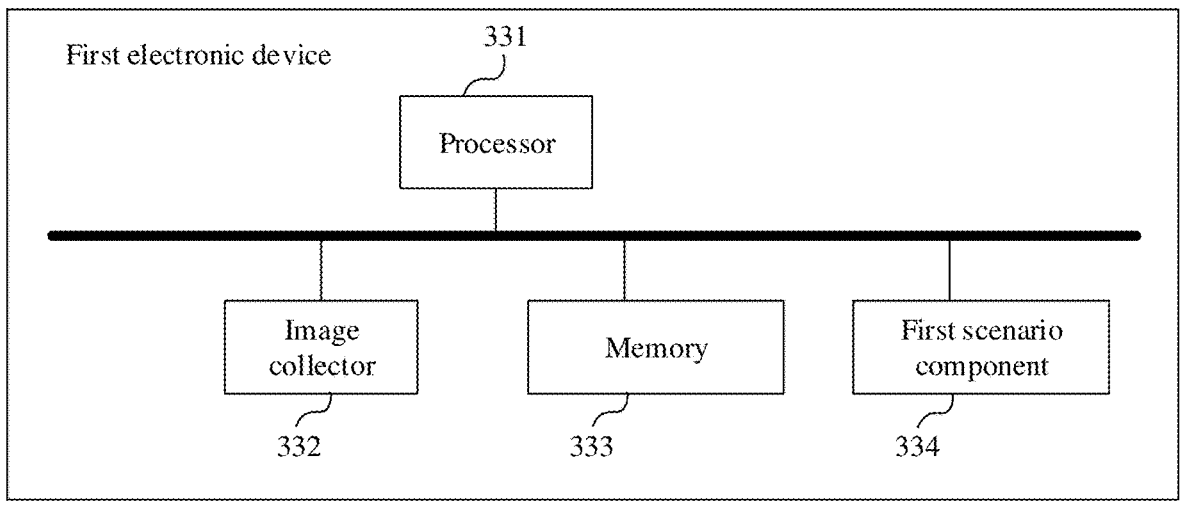
FIG. 32 is a schematic diagram of a structure of a further first electronic device according to an embodiment.

FIG. 32 is a schematic diagram of a structure of a further first electronic device according to an embodiment. In the embodiment shown in FIG. 32, it is described that the first electronic device may include a processor 331 and an image collector 332. Optionally, the first electronic device may further include a memory 333 and a first scenario component 334. As shown in FIG. 32, the first electronic device includes the processor 331, the image collector 332, the memory 333, and the first scenario component 334.

The image collector 332, the memory 333, and the first scenario component 334 may be coupled to the processor 331.

The image collector 332 is configured to collect two-dimensional code information in the method embodiments shown in FIG. 4 and FIG. 5, FIG. 7 to FIG. 9, and FIG. 20A to FIG. 22B.

The processor 331 is configured to: obtain the two-dimensional code information collected by the image collector 332, and execute instructions in computer-executable program code; and when the processor 331 executes the instructions, the instructions enable the first electronic device to perform the method embodiments shown in FIG. 4 and FIG. 5, FIG. 7 to FIG. 9, and FIG. 20A to FIG. 22B.

The first electronic device in the embodiment shown in FIG. 32 may be configured to perform the solutions in the foregoing method embodiments shown in FIG. 4 and FIG. 5, FIG. 7 to FIG. 9, and FIG. 20A to FIG. 22B, or execute programs of the units and modules in the embodiments shown in FIG. 24 to FIG. 26. Implementation principles and effects thereof are similar, and details are not described herein again. Reference may be made to each other for the foregoing embodiments. Same or similar steps and nouns are not described one by one again.

In an example, the first electronic device in the embodiment shown in FIG. 32 may further include the memory 333. The memory 333 is configured to store programs for implementing the foregoing method embodiments, or the memory 333 is configured to store the programs of the units and modules in the embodiments shown in FIG. 24 to FIG. 26, and the processor 331 invokes the programs to perform operations in the foregoing method embodiments to implement the units and modules shown in FIG. 24 to FIG. 26.

Alternatively, a part or all of the foregoing units and modules may be embedded in a chip of the first electronic device in a form of an integrated circuit for implementation. In addition, they may be separately implemented, or may be integrated together. For example, the foregoing modules may be configured as one or more integrated circuits for performing the foregoing methods, for example, one or more application-specific integrated circuits (ASICs), one or more microprocessors, or one or more field programmable gate arrays (FPGAs).

Figure 33:
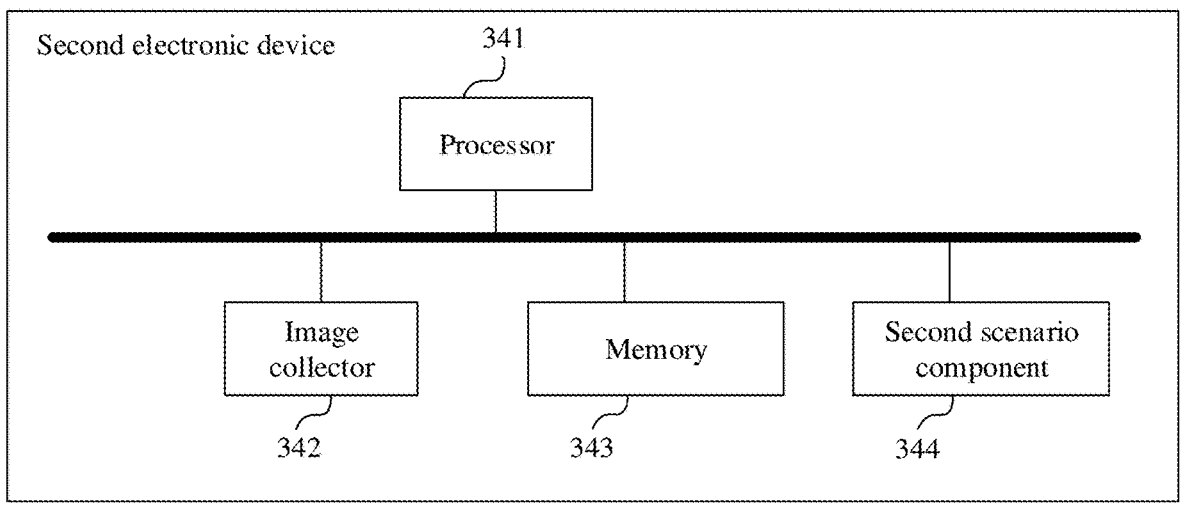
FIG. 33 is a schematic diagram of a structure of a further second electronic device according to an embodiment.

FIG. 33 is a schematic diagram of a structure of a further second electronic device according to an embodiment. In the embodiment shown in FIG. 33, it is described that the second electronic device may include a processor 341. Optionally, the second electronic device may further include an image collector 342, a memory 343, and a second scenario component 344. As shown in FIG. 33, the second electronic device includes the processor 341, the image collector 342, the memory 343, and the second scenario component 344.

The image collector 342, the memory 343, and the second scenario component 344 may be coupled to the processor 341.

The image collector 342 is configured to collect two-dimensional code information in the method embodiments shown in FIG. 14 to FIG. 17, and FIG. 20A to FIG. 22B.

The processor 341 is configured to execute instructions in computer-executable program code; and when the processor 341 executes the instructions, the instructions enable the second electronic device to perform the method embodiments shown in FIG. 14 to FIG. 17, and FIG. 20A to FIG. 22B.

The second electronic device in the embodiment shown in FIG. 33 may be configured to perform the foregoing method embodiments shown in FIG. 14 to FIG. 17, and FIG. 20A to FIG. 22B, or execute programs of the units and modules in the embodiments shown in FIG. 27 to FIG. 29. Implementation principles and effects thereof are similar, and details are not described herein again. Reference may be made to each other for the foregoing embodiments. Same or similar steps and nouns are not described one by one again.

In an example, the second electronic device in the embodiment shown in FIG. 33 may further include the memory 343. The memory 343 is configured to store programs for implementing the foregoing method embodiments, or the memory 343 is configured to store the programs of the units and modules in the embodiments shown in FIG. 27 to FIG. 29, and the processor 341 invokes the programs to perform operations in the foregoing method embodiments to implement the units and modules shown in FIG. 27 to FIG. 29.

Alternatively, a part or all of the foregoing units and modules may be embedded in a chip of the second electronic device in a form of an integrated circuit for implementation. In addition, they may be separately implemented, or may be integrated together. For example, the foregoing modules may be configured as one or more integrated circuits for performing the foregoing methods, for example, one or more application-specific integrated circuits (ASICs), one or more microprocessors (DSPs), or one or more field programmable gate arrays (FPGAs).

An embodiment provides a program, including program code. When a computer runs the computer program, the program code performs the steps of the embodiments shown in FIG. 4 and FIG. 5, FIG. 7 to FIG. 9, and FIG. 20A to FIG. 22B.

An embodiment provides a computer-readable storage medium, including instructions. When the instructions are run on a computer, the computer is enabled to perform the steps of the embodiments shown in FIG. 14 to FIG. 17, and FIG. 20A to FIG. 22B.

According to an embodiment, a computer program product includes a computer program, the computer program is stored in a readable storage medium, at least one processor of an electronic device may read the computer program from the readable storage medium, and the at least one processor executes the computer program to enable the electronic device to perform the solution provided in any one of the foregoing embodiments. The electronic device may be the foregoing first electronic device or second electronic device.

All or a part of the foregoing embodiments may be implemented by using software, hardware, firmware, or any combination thereof. When embodiments are implemented by using the software, all or a part of embodiments may be implemented in a form of a computer program product. The computer program product includes one or more computer instructions. When the computer program instructions are loaded and executed on a computer, all or a part of the procedures or functions according to embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person skilled in the art should be aware that in the foregoing one or more examples, functions described in the embodiments may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another. The storage medium may be any available medium accessible to a general-purpose or dedicated computer.

The foregoing descriptions are merely implementations, but are not intended to limit the scope of the embodiments. Any variation or replacement readily figured out by a person skilled in the art shall be within the scope of the embodiments.

What is claimed is:

1. A two-dimensional code processing method, comprising:
   obtaining two-dimensional code information displayed by a second electronic device;
   obtaining first scenario information;
   disposing a first scenario component in the first electronic device;
   determining two-dimensional code data and second scenario information based on the two-dimensional code information, wherein the first scenario information is scenario information related to a first electronic device, and the second scenario information is scenario information related to the second electronic device; and
   when determining that the first scenario information and the second scenario information meet a preset condition, performing preset processing on the two-dimensional code data.

2. The two-dimensional code processing method according to claim 1, further comprising:
   deploying a first execution environment in a system of the first electronic device; and
   obtaining the first scenario information based on the first execution environment.

3. The two-dimensional code processing method according to claim 2, further comprising:
   sending a first request message to the first scenario component based on the first execution environment, wherein the first request message is for indicating to generate the first scenario information obtained through detection by the first scenario component; and
   receiving, based on the first execution environment, the first scenario information sent by the first scenario component.

4. The two-dimensional code processing method according to claim 2, further comprising:
   deploying a second execution environment in the system of the first electronic device, wherein the second execution environment is a trusted execution environment;
   sending a second request message to the second execution environment based on the first execution environment, wherein the second request message is for indicating to generate the first scenario information; and
   receiving, based on the first execution environment, a return message returned by the second execution environment, wherein the return message is used to indicate the first scenario information, and the first scenario information is obtained by the second execution environment from the first scenario component.

5. The two-dimensional code processing method according to claim 1, further comprising:
   when determining that the first scenario information and the second scenario information do not meet the preset condition, generating and displaying prompt information.

6. The two-dimensional code processing method according to claim 1, wherein determining the two-dimensional code data and the second scenario information based on the two-dimensional code information further comprises:
   decrypting the two-dimensional code information to obtain the two-dimensional code data and the second scenario information.

7. The two-dimensional code processing method according to claim 1, wherein the first scenario information comprises at least one of the following: global positioning system information, wireless local area network information, Bluetooth information, and natural environment information; and
   the second scenario information comprises at least one of the following: global positioning system information, wireless local area network information, Bluetooth information, and natural environment information.

8. A two-dimensional code processing method, comprising:
   obtaining second scenario information, wherein the second scenario information is scenario information related to a second electronic device;
   disposing a second scenario component in the second electronic device; and
   generating and displaying two-dimensional code information based on the second scenario information and preset two-dimensional code data, wherein the two-dimensional code information is used by a first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

9. The two-dimensional code processing method according to claim 8, further comprising:
   deploying a first execution environment in a system of the second electronic device; and
   obtaining the second scenario information based on the first execution environment.

10. The two-dimensional code processing method according to claim 9, further comprising:
    sending a first request message to the second scenario component based on the first execution environment, wherein the first request message is for indicating to generate the second scenario information detected by the second scenario component; and receiving, based on the first execution environment, the second scenario information sent by the second scenario component.

11. The two-dimensional code processing method according to claim 9, further comprising:

deploying a second execution environment in the system of the second electronic device, wherein the second execution environment is a trusted execution environment;

sending a second request message to the second execution environment based on the first execution environment, wherein the second request message is for indicating to generate the second scenario information; and receiving, based on the first execution environment, the second scenario information returned by the second execution environment, wherein the second scenario information is obtained by the second execution environment from the second scenario component.

12. The two-dimensional code processing method according to claim 11, wherein the second request message is a trigger instruction detected based on the first execution environment, or the second request message comprises a trigger instruction, wherein the trigger instruction is for indicating to generate the two-dimensional code information.

13. The two-dimensional code processing method according to claim 11, wherein the second scenario information is obtained after the second execution environment sets the second scenario component to a preset configuration, and the preset configuration represents that the second scenario information of the second scenario component can be obtained only by the second execution environment.

14. The two-dimensional code processing method according to claim 8, wherein before the obtaining second scenario information, the method further comprises:

receiving a trigger instruction, wherein the trigger instruction is for indicating to generate the two-dimensional code information.

15. A first electronic device, comprising an image collector and a processor, wherein the image collector is configured to collect two-dimensional code information; and the processor is configured to obtain the two-dimensional code information collected by the image collector, and execute the following steps:

obtaining two-dimensional code information displayed by a second electronic device;

obtaining first scenario information;

disposing a first scenario component in the first electronic device;

determining two-dimensional code data and second scenario information based on the two-dimensional code information, wherein the first scenario information is scenario information related to the first electronic device, and the second scenario information is scenario information related to the second electronic device; and when determining that the first scenario information and the second scenario information meet a preset condition, performing preset processing on the two-dimensional code data.

16. The first electronic device according to claim 15, wherein the processor is further configured to execute obtaining the first scenario information based on a first execution environment deployed in a system of the first electronic device.

17. The first electronic device according to claim 15, wherein the processor is further configured to execute:

sending a first request message to a first scenario component disposed in the first electronic device based on the first execution environment, wherein the first request message is for indicating to generate the first scenario information obtained through detection by the first scenario component; and receiving, based on the first execution environment, the first scenario information sent by the first scenario component.

18. A second electronic device, comprising a memory and a processor, wherein the memory is configured to store computer-readable instructions, and the processor is configured to execute:

obtain second scenario information, wherein the second scenario information is scenario information related to the second electronic device;

disposing a second scenario component in the second electronic device; and generate and display two-dimensional code information based on the second scenario information and preset two-dimensional code data, wherein the two-dimensional code information is used by a first electronic device to perform, after the first electronic device obtains the two-dimensional code information, preset processing on the two-dimensional code data when the first electronic device determines that first scenario information and the second scenario information meet a preset condition; and the first scenario information is scenario information related to the first electronic device.

19. The second electronic device according to claim 18, wherein the processor is further configured to execute:

obtain the second scenario information based on a first execution environment deployed in a system of the second electronic device.

20. The second electronic device according to claim 19, wherein the processor is further configured to execute:

send a first request message to a second scenario component disposed in the second electronic device based on the first execution environment, wherein the first request message is for indicating to generate the second scenario information detected by the second scenario component; and receive, based on the first execution environment, the second scenario information sent by the second scenario component.

* * * * *